(12) United States Patent
Inoue et al.

(10) Patent No.: US 7,229,658 B1
(45) Date of Patent: Jun. 12, 2007

(54) COMPOSITIONS CONTAINING SUCRALOSE AND APPLICATION THEREOF

(75) Inventors: Maki Inoue, Toyonaka (JP); Kazumi Iwai, Toyonaka (JP); Naoto Ojima, Toyonaka (JP); Takuya Kawai, Toyonaka (JP); Mitsumi Kawamoto, Toyonaka (JP); Shunsuke Kuribi, Toyonaka (JP); Miho Sakaguchi, Toyonaka (JP); Chie Sasaki, Toyonaka (JP); Kazuhito Shizu, Toyonaka (JP); Mariko Shinguryou, Toyonaka (JP); Kazutaka Hirao, Toyonaka (JP); Miki Fujii, Toyonaka (JP); Yoshito Morita, Toyonaka (JP); Nobuharu Yasunami, Toyonaka (JP); Junko Yoshifuji, Toyonaka (JP)

(73) Assignee: San-Ei Gen F.F.I., Inc, Osaka (JP)

( * ) Notice: Subject to any disclaimer, the term of this patent is extended or adjusted under 35 U.S.C. 154(b) by 0 days.

(21) Appl. No.: 09/830,654

(22) PCT Filed: Oct. 28, 1999

(86) PCT No.: PCT/JP99/05962

§ 371 (c)(1),
(2), (4) Date: Aug. 17, 2001

(87) PCT Pub. No.: WO00/24273

PCT Pub. Date: May 4, 2000

(30) Foreign Application Priority Data

| Oct. 28, 1998 | (JP) | 10-307494 |
| Oct. 28, 1998 | (JP) | 10-307495 |
| Oct. 28, 1998 | (JP) | 10-307497 |
| Oct. 29, 1998 | (JP) | 10-308457 |
| Oct. 29, 1998 | (JP) | 10-308458 |
| Oct. 29, 1998 | (JP) | 10-308460 |
| Oct. 29, 1998 | (JP) | 10-308462 |
| Oct. 29, 1998 | (JP) | 10-308463 |
| Oct. 29, 1998 | (JP) | 10-308467 |
| Oct. 29, 1998 | (JP) | 10-308468 |
| Oct. 29, 1998 | (JP) | 10-308470 |
| Nov. 17, 1998 | (JP) | 10-327140 |
| Nov. 17, 1998 | (JP) | 10-327147 |
| Nov. 17, 1998 | (JP) | 10-327150 |
| Nov. 17, 1998 | (JP) | 10-327153 |
| Nov. 17, 1998 | (JP) | 10-327157 |
| Nov. 17, 1998 | (JP) | 10-327164 |
| Nov. 17, 1998 | (JP) | 10-327165 |
| Nov. 17, 1998 | (JP) | 10-327170 |
| Nov. 25, 1998 | (JP) | 10-333943 |
| Nov. 25, 1998 | (JP) | 10-333944 |
| Nov. 25, 1998 | (JP) | 10-333945 |
| Nov. 25, 1998 | (JP) | 10-333948 |
| Nov. 30, 1998 | (JP) | 10-340274 |
| Dec. 11, 1998 | (JP) | 10-353489 |
| Dec. 11, 1998 | (JP) | 10-353490 |
| Dec. 11, 1998 | (JP) | 10-353492 |
| Dec. 11, 1998 | (JP) | 10-353495 |
| Dec. 11, 1998 | (JP) | 10-353496 |
| Dec. 11, 1998 | (JP) | 10-353498 |
| Dec. 11, 1998 | (JP) | 10-353499 |
| Dec. 11, 1998 | (JP) | 10-353501 |
| Dec. 11, 1998 | (JP) | 10-353503 |
| Dec. 11, 1998 | (JP) | 10-353504 |
| Dec. 11, 1998 | (JP) | 10-353505 |
| Dec. 11, 1998 | (JP) | 10-353507 |
| Jan. 26, 1999 | (JP) | 11-016984 |
| Jan. 26, 1999 | (JP) | 11-016989 |
| Jan. 26, 1999 | (JP) | 11-016996 |
| Jun. 4, 1999 | (JP) | 11-158511 |
| Jun. 4, 1999 | (JP) | 11-158523 |
| Jun. 4, 1999 | (JP) | 11-158529 |
| Jun. 4, 1999 | (JP) | 11-158536 |
| Jun. 4, 1999 | (JP) | 11-158543 |
| Jun. 4, 1999 | (JP) | 11-158545 |
| Jun. 4, 1999 | (JP) | 11-158550 |
| Jun. 4, 1999 | (JP) | 11-158557 |
| Jun. 4, 1999 | (JP) | 11-158560 |
| Jun. 4, 1999 | (JP) | 11-158567 |
| Jul. 14, 1999 | (JP) | 11-199770 |
| Jul. 14, 1999 | (JP) | 11-199773 |
| Jul. 14, 1999 | (JP) | 11-199776 |
| Jul. 14, 1999 | (JP) | 11-199779 |
| Jul. 15, 1999 | (JP) | 11-201685 |
| Sep. 3, 1999 | (JP) | 11-249540 |
| Sep. 7, 1999 | (JP) | 11-253232 |

(51) Int. Cl.
*A23L 1/236* (2006.01)
(52) U.S. Cl. .................. 426/548; 426/804
(58) Field of Classification Search ............. 426/548, 426/321, 658, 804
See application file for complete search history.

(56) References Cited

U.S. PATENT DOCUMENTS

| 4,495,170 A | 1/1985 | Beyts et al. |
| 5,013,716 A | 5/1991 | Cherukuri et al. |
| 5,093,137 A | 3/1992 | Shazer, Jr. et al. |
| 5,139,787 A | 8/1992 | Broderick et al. |
| 5,192,563 A | 3/1993 | Patel et al. |
| 5,236,720 A | 8/1993 | Cherukuri |
| 5,345,902 A | 9/1994 | Kalail, Sr. et al. |
| 5,380,541 A | 1/1995 | Beyts et al. |
| 5,384,311 A | 1/1995 | Antenucci et al. |
| 5,409,907 A | 4/1995 | Blase et al. |
| 5,621,005 A | 4/1997 | Gowan, Jr. |
| 5,637,344 A | 6/1997 | Carpenter et al. |
| 5,693,349 A | 12/1997 | Scharfman et al. |
| 2002/0025366 A1 | 2/2002 | Jager et al. |
| 2003/0077369 A1 | 4/2003 | Tager et al. |

FOREIGN PATENT DOCUMENTS

| DE | 19653344 C | 8/1998 |
| EP | 0 064 361 A2 | 11/1982 |
| EP | 296119 A | 12/1988 |
| EP | 390438 | 3/1990 |
| EP | 371584 A | 6/1990 |
| EP | 437098 A | 7/1991 |

| | | | |
|---|---|---|---|
| EP | 0457724 A | 11/1991 | |
| EP | 0472500 A | 2/1992 | |
| EP | 0575179 A | 12/1993 | |
| EP | 0646326 A | 4/1995 | |
| EP | 633734 B | 5/1996 | |
| EP | 0759273 A | 2/1997 | |
| GB | 1299135 | * 12/1972 | |
| GB | 2185674 A | 7/1987 | |
| JP | 57-194758 A | 11/1982 | |
| JP | 425115 | 5/1991 | |
| JP | 04-94649 A | 3/1992 | |
| JP | 8-173063 | 7/1996 | |
| JP | 8-173087 | 7/1996 | |
| JP | 8-196240 | 8/1996 | |
| JP | 8-205814 | 8/1996 | |
| JP | 8-214847 | 8/1996 | |
| JP | 8-224075 | 9/1996 | |
| JP | 8-242805 | 9/1996 | |
| JP | 10-215793 A | 8/1998 | |
| JP | 10-243776 | 9/1998 | |
| JP | 10-262601 | 10/1998 | |
| WO | WO 90/07859 A | 7/1990 | |
| WO | WO 90/07864 A | 7/1990 | |
| WO | WO 91-03147 A | 3/1991 | |
| WO | WO 91/03147 A | 3/1991 | |
| WO | WO 92/11084 A | 7/1992 | |
| WO | 98/23166 | * 6/1998 | |
| WO | WO 99/26485 A | 6/1999 | |

OTHER PUBLICATIONS

Swientek, R.J., Ed., Food Processing, Dec. 1991, 52(12):38-40.*
Fennema, O.R., Ed., Food Chemistry, Third Edition, 1996, pp. 812-821, Marcel Dekker, New York.*
International Search Report, PCT/JP99/05962.
Verdi, R.J., et al, "Advantages of alternative sweetener Blends", Food Technology(1993), vol. 47, No. 6, pp. 94-101.
Fumitake Fukutomi, "Sucralose-new high-intensity sweetener", Foods, Food Ingredients J.Jpn (Jul. 1998), No. 177, p. 22-26.
Knight, I., et al., "The development and applications of sucralose, a new high-intensity sweetener", Canadian Journal of Physiology and Pharmacology (1994), vol. 72, No. 4, pp. 435-439.
European Search Report dated Mar. 11, 2005.
Miller, G A: "New Sweeteners", Changing Food Technology For A Dynamic Marketplace, pp. 107-126, 1989, XP001104824.
Wallis, K J ISBN 0-931710-27-8, "Sucralose: features and benefits." Food Australia, vol. 45, No. 12, 1993, pp. 578-580, XP008042879.
European Search Report dated Dec. 13, 2004.

* cited by examiner

*Primary Examiner*—Leslie Wong
(74) *Attorney, Agent, or Firm*—Sughrue Mion, PLLC

(57) ABSTRACT

Novel utilization of sucralose which is a high intense sweetener. Compositions containing sucralose including: sweetening compositions having excellent sweetness qualities based on the characteristics of sucralose; foods with a masked unpleasant smell and unpleasant taste; performance food compositions (viscous food compositions, gel food compositions, emulsified food compositions); foods with improved flavors; preservatives and foods with improved quality of taste; and flavor compositions with improved flavors. Novel utilization of sucralose as a sweetness improver, a masking agent for unpleasant smell/unpleasant taste, a flavor improver, a function improver (viscosity, gelling properties, emulsification properties), a taste characteristic improver, and a flavor improver/enhancer.

3 Claims, No Drawings

COMPOSITIONS CONTAINING SUCRALOSE AND APPLICATION THEREOF

TECHNICAL FIELD

The present invention relates to various novel utilizations of sucralose based on the characteristics of sucralose.

BACKGROUND ART

Sucrose have been widely used as a sweetener because of its characteristics such as good sweetness, rich (full-bodied) taste, water retentivity, ability to give thickness and the like. In recent years, however, general health-consciousness and orientation to low calorie diet are making consumers avoid sucrose which can cause obesity and decayed teeth, especially in the area of beverages, desserts and other refreshments where low-calorie products are increasing.

Thus, various high intense sweeteners have been studied and developed as substitute sweeteners for sucrose. Among the high intense sweeteners, sucralose, which is 600 times sweeter than sucrose, is attracting attention since it is non-cariogenic and non-metabolizable, i.e., having no calorie.

DISCLOSURE OF INVENTION

The present invention a composition containing sucralose which gives various properties to the composition.

More specifically, the present invention relates to the compositions having various unique properties listed below, and the applications thereof.

I. Sweetening compositions
II. Foods with a masked unpleasant smell and unpleasant taste
III. Performance food compositions
IV. Foods with improved flavors
V. Preservatives and foods with improved quality of taste
VI. Flavor compositions with improved flavors

BEST MODE FOR CARRYING OUT THE INVENTION

As represented by the formula (I), the sucralose for use in the present invention has a structure similar to sucrose, specifically, the sucrose molecule in which three hydroxy groups at 1 position and 6 position of a fructose residue and 4 position in a glucose residue are substituted by chlorine molecules (4,1',6'-trichloro-galactosucrose, chemical name: 1,6-dichloro-1,6-dideoxy-β-D-fructofuranosyl-4-chloro-4-deoxy-α-D-garactopyranoside). The sucralose is a no-calorie and non-cariogenic intense sweetener which has good and about 600 times greater sweetness than sucrose (U.K. Patent No. 1543167).

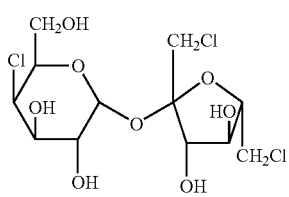

(I)

The present invention including various embodiments mentioned below is based on the finding that the above sucralose exhibits specific properties by itself or in combination with other components.

In the below, the present invention will be described referring to the embodiments carried out on the basis of such properties of sucralose.

In this specification, an oral composition means a product which is taken orally (also referred to as an edible product in this specification) and also a product which is used in the mouth. For example, seasonings, salt cured products, stewed foods and like food preparations and food including confections and beverages; oral medicines including sugar-coated tablets, drops, troches, throat sprays and syrups; and mouth sprays and like oral refreshment, mouthwashes, gargles and dentifrices and like quasi-drugs for oral sterilization or oral cleansing.

In this specification, by the term "other sweeteners" is meant sweet substances which are conventionally know or will possibly be known in the future. Examples of the sweet substances include α-glucosyltransferase-treated stevia, α-cyclodextrin, β-cyclodextrin, aspartame, acesulfame potassium, N-acetylglucosamine, arabinose, alitame, isotrehalose, isomaltitol, isomaltooligosaccharide (isomaltose, isomaltotriose, panose, etc.), erythritol, oligo-N-acetylglucosamine, galactose, galactosylsucrose, galactosyllactose, galactopyranosyl (β1-3) galactopyranosyl (β1-4) glucopyranose, galactopyranosyl (β1-3) glucopyranose, galactopyranosyl (β1-6) galactopyranosyl (β1-4) glucopyranose, galactopyranosyl (β1-6) glucopyranose, glycyrrhiza extract (glycyrrhizin), xylitol, xylose, xylooligosaccharide (xylotriose, xylobiose, etc.), glycerol, triammonium glycyrrhizinate, tripotassium glycyrrhizinate, trisodium glycyrrhizinate, diammonium glycyrrhizinate, dipotassium glycyrrhizinate, disodium glycyrrhizinate, curcurin, glucose, gentiooligosaccharide (gentiobiose, gentiotriose, gentiotetraose, etc.), saccharin, sodium saccharin, cyclamate, sucrose, stachyose, stevia extract, powdered stevia, dulcin, sorbitol, sorbose, thaumatin, Theander oligo saccharide, tenryocha extract, trehalulose trehalose, monellin, nigerooligosaccharide (nigerose, etc.), neotame, neotrehalose, palatinit, palatinose, palatinosepalatinose oligosaccharide, palatinose syrup, fucose, fructooligosaccharide (kestose, nystose, etc.), fructosyl transferase-treated stevia, fructofuranosyl nystose, Brazilian licorice extract, fructose, polydextrose, maltitol, maltose, maltosyl β-cyclodextrin, maltotetraitol, maltotriitol, maltooligosaccharide (maltotriose, tetraose, pentaose, hexaose, heptaose, etc.), mannitol, miracle fruit extract, melibiose, rakanka (Momordica grosvenori) extract, lactitol, lactulose, lactose, raffinose, rhamnose; ribose, isomerized corn syrup, reduced isomaltooligosaccharide, reduced xylooligosaccharide, reduced gentiooligosaccharide, reduced malt sugar syrup, glucose syrup, hydrogenated glucose syrup, enzymatically modified licorice, licorice hydrolysates, coupling sugar, soybean oligosaccharide, inverted sugar, glucose syrup, honey and like sweet substances.

I. Sweetening Composition

The inventions according to this embodiment was developed based on the findings that combining sucralose with specific saccharides or acids mitigates the rough tastes and lingering sweet aftertastes of the sucralose or other sweeteners and produces the sweetening composition having rich and full-bodied sweetness. Specifically, the present inventions are the sweetening compositions listed below.

(1) A sweetening composition comprising sucralose and at least one sweet substance selected from the group consisting of fructose, non-reducing disaccharide, sugar alcohol, beet oligosaccharide, licorice extract, stevia extract, rhamnose and thaumatin.

The above fructose and the like may be used singly in combination with sucralose or in any combination of two or more kinds.

(2) A sweetening composition comprising sucralose and at least one member selected from the group consisting of gluconic acid, gluconic acid salt, glucono-δ-lactone, gymnemic acid and milk serum mineral.

The above gluconic acid and the like may be used singly with sucralose or in any combination of two or more kinds. Further, the gluconic acid and the like may be used in any combination with fructose and the like mentioned in (1).

(3) A sweetening composition comprising sucralose and soybean polysaccharide.

This sweetening composition includes that which comprises one or more of the fructose and the like of the above (1) and the gluconic acid and the like of the above (2), insofar as it sucralose and soybean polysaccharide.

The Sweetening Composition of (1)

According to the present invention, by combining sucralose and one or more kinds of fructose, non-reducing disaccharide, sugar alcohol, beet oligosaccharide, licorice extract, stevia, rhamnose and thaumatin (hereinafter referred to as fructose and the like), disadvantages such as rough tastes and lingering sweet aftertastes of sucralose or various sweet substances themselves, lack of full-bodied and rich sweetness can be synergistically improved without losing the functions characteristic of the various sweet substances, and can provide a sweetening composition having good sweetness and useful functions.

(1-1) Sweetening Composition Comprising Fructose and Sucralose

Fructose is a natural sweetener which is found in fruits, especially in pear, watermelon and the like, and honey and the like. Fructose can be obtained by reducing sucrose and inulin, or by isomerization of glucose with alkali or enzymes at low cost in large quantities. Fructose is 1.3–1.7 times as sweet as sucrose and the sweetest among saccharides. Fructose has a characteristic of becoming sweeter at low temperatures. Its sweetness, however, is clear, light and has little aftertaste, and therefore fructose can not impart rich sweetness when it is required. As mentioned in the above, sucralose also is high in sweetness, but its sweetness is light, lacking a body and richness.

According to the present invention, combined use of sucralose and fructose can significantly improve the lack of full-bodied and rich sweetness and provide a sweetening composition having high sweetness, good sweetness quality with a body, richness and the advantageous properties of fructose such as resistance to crystallizing and high water retentiveness.

The sweetening composition of the present invention should comprise at least fructose and sucralose in the composition, and may be in any form such as a powder, granules, a solid and a liquid. The sweetening composition may be a powdery mixture of fructose and sucralose; a mixture prepared by spraying a sucralose solution to a fructose powder; or a mixture prepared by spraying a fructose solution to a sucralose powder. The sweetening composition may be also a mixture prepared by drying a mixture of a fructose solution and a sucralose solution. The method for drying the mixture is not critical, and may be spray drying, drum drying, freeze drying and various other methods.

The content of fructose and sucralose in the sweetening composition is not particularly limited and may be suitably selected within the range which can produce the effects of the present invention. Specifically, the concentration of sucralose in the food, when served, may be 0.0002% by weight or higher, regardless of the content of fructose. It is presumed that, within the possible concentration range of fructose used as a sweetener, the features of the human gustory sense make fructose taste rich and sweet when it is together with the above-specified amount or more of sucralose in the oral cavity. The amount of sucralose to be added for improving the sweetness of fructose does not have particular higher limit. However, addition of sucralose in a large amount makes the sweetness of sucralose dominant since sucralose itself is an high intense sweetener. Accordingly, sucralose is preferably used in a concentration of 0.00165% by weight or lower of the food. More preferably, a sweetening composition is prepared so that sucralose is contained in the food in a proportion of 0.0005% by weight to 0.0008% by weight.

The sweetening composition according to the present invention may contain, for example, other sweeteners than sucralose and fructose, flavors, preservatives, stabilizers and other components insofar as they do not deteriorate the effects of the present invention.

The sweetening composition of the invention can be itself used as a cooking sweetener or table sweetener in place of the sugar commonly used as a sweetener and other sweeteners, and can be also contained in various oral compositions as a sweetener therefor.

The sweetening composition of the invention has low calories, high sweetness and good full-bodied sweetness quality. The sweetening composition also has characteristics of resistance to crystallization and high water retentiveness. Therefore, the sweetening composition is useful for the food whose sweetness increases its tastiness (deliciousness); the foods which use highly concentrated sweetener and the foods for which moistness is required (kasutera (Castilla cake), sponge cake, yokan (azuki bean jelly) and like confectionary).

The foods which are the subject of the present invention are not particularly limited insofar as they can use a sweetener. Examples of such foods include the above-mentioned confections and like confectioneries, and wide variety of beverages, cold sweets, processed foods, fishery foods, meat foods and the like.

The foods which are the subject of the present invention include not only those which at first contain fructose and sucralose as a mixture, but also those of which fructose and sucralose are combined in the mouth when taken. Examples of the latter include soft cream in which fructose (or sucralose) is contained in the cream, and sucralose (fructose) is contained in its toppings and cone cup.

Considering the effects of the invention, that is, the effect of improving the sweetness quality of fructose, a natural sweetener, by using sucralose in combination, the food composition of the invention includes, for example, the foods which originally contain fructose (fruits, processed fruit products (purees, fruit juices, etc.), honey and its processed foods) with sucralose added.

The amount of the sweetening composition of the invention used for these oral compositions may be an amount effective in giving a desired sweetness to the oral composition, and is not particularly limited. More specifically, the sweetness is variable depending on the kind of the oral compositions to which the sweetener is applied, other components contained in the composition, individual preference of sweetness and other factors. Thus, the content of the sweetening composition of the invention may be optionally selected within the ordinary skill level in the art so that the desired sweetness can be obtained.

(1-2) Sweetening Composition Comprising Non-Reducing Disaccharide and Sucralose

The non-reducing disaccharide for use in the invention is not particularly limited insofar as it is a non-reducing disaccharide which can be used for foods. Examples of the non-reducing disaccharide include trehalose, neotrehalose, isotrehalose, sucrose and the like. Among them, trehalose is preferable.

Trehalose is a non-reducing disaccharide having 1,1 bonding of two glucose molecules. Trehalose has isomers of α,α-type trehalose (α-D-glucopyranosyl α-D-glucopyranoside), α,β-type (neotrehalose) and β,β type (isotrehalose). Among them, α,α type trehalose is preferable.

Having sophisticated sweetness like sugar, trehalose is drawing attention for the following excellent features: (1) non-reducing saccharide which does not cause Maillard reaction; (2) stable to acids and alkalis, resistant to heat decomposition particularly in an acidic condition; (3) resistant to moisture absorption, substantially free from moisture absorption at a relative humidity (RH) 90% or lower; (4) excellent in preventing starch retrogradation; (5) excellent in preventing protein modification caused by freezing, cold storage and drying; (6) having non-cariogenicity, among others.

However, the sweetness of trehalose is low and about 40 to 45% of sugar. Therefore, 2.5 times as much trehalose as sugar, roughly calculated, is necessary for achieving the same sweetness by using trehalose instead of sugar, which is not cost-effective. In addition, the sweetness of trehalose is relatively clear and lacking a full-body taste. Hence, required is a method for increasing and improving the sweetness of trehalose, while retaining the functions of trehalose.

The present invention can provide a sweetening composition having little lingering sweet aftertaste but having a body, richness and advantageous properties characteristic of trehalose by combining non-reducing disaccharides, particularly trehalose and sucralose, to improve the low sweetness of trehalose and obtain high sweetness.

The sweetening composition of the present invention should comprise at least sucralose and a non-reducing disaccharide, particularly trehalose, in the composition, and may be in any form such as a powder, granules, a solid (tablet, pill) and a liquid. The sweetening composition may be a powdery mixture of the non-reducing disaccharide and sucralose; a mixture prepared by spraying a sucralose solution to a non-reducing disaccharide powder; or a mixture prepared by spraying a non-reducing disaccharide solution to a sucralose powder. The sweetening composition may be also a mixture prepared by drying a mixture of a non-reducing disaccharide solution and a sucralose solution. The method for drying the mixture is not critical, and may be spray drying, drum drying, freeze drying and various other methods.

The content of the non-reducing disaccharide and sucralose in the sweetening composition is not particularly limited, and may be suitably selected within the range which can achieve the effects of the present invention, depending on the kinds of the foods to which the composition is applied. The content of trehalose and sucralose may be, for example, 10 to 10000 parts by weight, preferably 100 to 10000 parts by weight, more preferably 500 to 5000 parts by weight of trehalose, per part by weight of sucralose. However, these amounts is to be suitably selected according to individual preference of sweetness and the types of products to which the sweetener is applied, and are not limited to the above specified ranges.

The sweetening composition of the invention should comprise at least the above two components, while it may contain, for example, other sweeteners than sucralose and non-reducing disaccharide, flavors, preservatives, stabilizers and the like unless they lessens the effects of the present invention.

The sweetening composition of the invention can be used itself as a cooking sweetener or table sweetener in place of sugar and other sweeteners commonly used as sweeteners and also as a sweetener, and can be added to various oral compositions as the sweeteners therefor.

The sweetening composition of the invention has low calories, high sweetness and highly taste good sweetness which can not be obtained by the non-reducing disaccharide (particularly trehalose) singly or in combination with sugar or other saccharides. Hence, the sweetening composition is particularly useful for the foods in which sweetness increases their tastiness (deliciousness). The sweetening composition is also useful for the oral compositions, particularly foods, in which sweetness increases their tastiness and which require moistness, heat buring color resistance, frozen storage stability, discoloration (browning) resistance, syneresis resistance, starch retrogradation resistance, low calories, non-cariogenicity and the like.

Such foods are not particularly limited, and preferable examples include citrus juices, vegetable juices and like fruit beverages and vegetable juices, cola drinks, ginger ales, soda waters and like carbonated beverages, sport drinks and like soft drinks, coffee, black tea, maccha (powdered green tea) and like tea-based beverages, cocoa, lactic acid bacteria beverages and like milk beverages and other general beverages; yogurt, jellies, puddings, mousse and like desserts; baked confections and steamed confections including cakes, manju (steamed yeast bun with filling) and like Western confections and Japanese sweets and other confectioneries; ice creams, sherbets and like cold sweets and other ice confectioneries; chewing gums, hard candies, nougat candies, jelly beans and like general confections; fruit flavored sauces, chocolate sauce and like sauces; butter cream, raw cream and like creams; strawberry jam, marmalade and like jams; breads including kashi-pan (pastry with fillings and flavors) and the like; sauces used for yakiniku (Japanese- or Korean-style barbecue), yakitori (skewered and grilled chicken), unagi-kabayaki (grilled eel) and the like and tomato ketchup; kamaboko (loaf of pureed, steamed fish) and like surimi-based products, retort pouched foods, pickles, tsukuda-ni (preserved food boiled in soy sauce), food preparations, frozen foods and wide variety of processed farm and aquatic products.

The amount of the sweetening composition of the invention used for these oral compositions may be an amount effective in giving a desired sweetness to the oral composition, and is not particularly limited. More specifically, the sweetness is variable depending on the kind of oral compositions to which the sweetener is applied, other components contained in the composition, individual preference of sweetness and other factors. Thus, the content of the sweetening composition of the invention may be optionally selected so that the desired sweetness can be provided in the final product within the ordinary skill level in the art.

The sweetening composition of the invention is especially useful as a sweetener for the foods which are heated at a high temperature.

Favorable examples of such foods include the hard candies for which coloration and caramelization by heating are problematic (possibly problematic), particularly the hard candies whose low-calorie and anti-cariogenic characteristic are important commercial values. For such hard candies are preferably used trehalose as a non-reducing disaccharide. Sugar alcohols may be used in addition to the non-reducing disaccharide. As the sugar alcohol can be used those mentioned in the above. Among them, preferable are maltitol, lactitol and hydrogenated palatinose, and particularly preferable are lactitol and hydrogenated palatinose. These substances may be used singly, or in any combination of two or more kinds.

The amount of sucralose and non-reducing disaccharide (total amount of sucralose, non-reducing disaccharide and sugar alcohol, when used in combination) added to the hard candies is not particularly limited, and may be 100 to 10000 parts by weight, preferably 1000 to 10000 parts by weight of the non-reducing disaccharide, per part by weight of sucralose. The amount of sucralose to be added to the hard candies is not limited either, and may typically be 0.001 to 0.1% by weight, preferably 0.01 to 0.1% by weight.

Basically, sucralose is an excellent sweetener which is free from heavy sweetness or rough taste as of sucrose, and has clean, refreshing sweetness. However, sucralose can be used to prepare the hard candies with rich and yet clear, refreshing sweetness by adding the non-reducing disaccharide (or further with sugar alcohol) thereto in an amount within the above-specified range, and the hard candies with high transparency. In particular, the hard candies having very crispy and light eating characteristics can be prepared by using trehalose as the non-reducing disaccharide.

Such hard candies may be those which comprises the above components as essential ingredients, and may also contain, as other ingredients, food additives which are commonly added to hard candies, for example, flavors (including essential oils) and pigments without any restriction.

The method for preparing the hard candies is not particularly limited, and may be any of various conventional methods. Specific example of the preparation method include that comprising the steps of adding a glucose syrup, sucralose and non-reducing disaccharide, optionally with sugar alcohol, to water, heating the mixture to about 140 to 165° C., and pouring the mixture in molds, followed by cooling.

(1-3) Sweetening Composition Comprising Sugar Alcohol and Sucralose

The sugar alcohol for use in the present invention may be any of those used commonly used for foods whether it is derived from monosaccharide, disaccharide or other saccharides such as oligosaccharide. Among them, preferable are maltitol, lactitol and hydrogenated palatinose, and more preferable are lactitol and hydrogenated palatinose. These saccharides may be used singly or in any combination of two or more kinds.

The sweetening composition of the invention should contain at least sucralose and sugar alcohol therein, and may be in any form such as a powder, granules, a solid (tablet, pill) and a liquid. The sweetening composition may be a powdery mixture of sugar alcohol and sucralose; a mixture prepared by spraying a sucralose solution to a sugar alcohol powder; or a mixture prepared by spraying a sugar alcohol solution to a sucralose powder. The sweetening composition may be also a mixture prepared by drying a mixture of a sugar alcohol solution and a sucralose solution. The method for drying the mixture is not critical, and may be spray drying, drum drying, freeze drying and various other methods.

According to the present invention, combined use of sucralose and sugar alcohol, optionally with trehalose and like non-reducing disaccharides, can provide a sweetening composition with rich and yet very clear, refreshing sweetness.

The content of sugar alcohol and sucralose in the sweetening composition of the invention is not particularly limited, and may be suitably selected depending on the types of the foods to which the sweetening composition is applied, within the range which can achieve the effects of the present invention. For example, 100 to 10000 parts by weight, preferably 1000 to 10000 parts by weight of sugar alcohol (when using non-reducing disaccharide in combination, the total of the sugar alcohol and non-reducing disaccharide) is used per part by weight of sucralose. However, these amounts are variable according to individual preference of sweetness and the types of products to which the sweetener is applied, and are not limited to the above-specified ranges.

The sweetening composition of the present invention may contain, for example, other sweeteners than sucralose and sugar alcohol, flavors, preservatives, stabilizers and other components, unless they lessen the effects of the present invention.

The sweetening composition of the invention can be used itself as a cooking sweetener or table sweetener in place of sugar and other sweeteners commonly used as sweeteners and also as a sweetener to be added to various oral compositions. Preferable examples of such oral compositions include hard candies.

(1-4) Sweetening Composition Comprising Beet Oligosaccharide and Sucralose

The beet oligosaccharide for use in the present invention comprises, as a main component, raffinose (trisaccharide having a D-galactose molecule, a D-glucose molecule and a D-fructose molecule, i.e., a trisaccharide having the structure of sucrose with D-galactose bonding thereto.). The beet oligosaccharide may contain stachyose (oligosaccharide having two molecules of D-galactose, a molecule of D-glucose and a molecule of D-fructose bonding to each other.) which has a similar structure to the beet oligosaccharide to raffinose.

Beet oligosaccharide is called so since it is a oligosaccharide occurring in beet. The beet oligosaccharide for use in the present invention may be any oligosaccharide insofar as it has the above-described structure, whether it is derived from beet, eucalyptus sap or soybeans.

According to the present invention, combined use of sucralose and beet oligosaccharide gives a body which is short with sucralose and can provides a sweetening composition with richness and good sweetness.

The sweetening composition of the invention should contain at least sucralose and beet oligosaccharide therein, and may be in any form such as a powder, granules, a solid (tablet, pill) and a liquid. The sweetening composition may be a powdery mixture of beet oligosaccharide and sucralose; a mixture prepared by spraying a sucralose solution to a beet oligosaccharide powder; or a mixture prepared by spraying a beet oligosaccharide solution to a sucralose powder. The sweetening composition may be also a mixture prepared by drying a mixture of a beet oligosaccharide solution and a sucralose solution. The method for drying the mixture is not critical, and may be spray drying, drum drying, freeze drying and various other methods.

The content of the beet oligosaccharide and sucralose in the sweetening composition is not particularly limited, and may be suitably selected within the range which can achieve the effects of the present invention, depending on the kinds of the foods to which the composition is applied. The content of beet oligosaccharide is typically selected from the range of 0.1 to 1000 parts by weight, preferably 1 to 100 parts by weight, per part by weight of sucralose.

The sweetening composition according to the present invention may contain, for example, other sweeteners than sucralose and beet oligosaccharide, flavors, preservatives, stabilizer and other components unless they lessen the effects of the present invention.

The sweetening composition of the invention can be used itself as a cooking sweetener or table sweetener in place of sugar and other sweeteners commonly used as sweeteners and also as a sweetener to be added to various oral compositions.

According to the sweetening composition of the invention, one of five basic taste qualities, sweetness, can be qualitatively improved by giving richness (body, volume feeling) which is not found in the sweetness of sucralose. Therefore, the sweetening composition is especially useful for the foods requiring tastiness (sweetness) which increases their commercial values, in particular confectioneries including desserts and confections, beverages and like refreshment foods.

Preferable examples of such foods, although not particularly limited, include citrus juices, vegetable juices and like fruit beverages and vegetable juices, cola drinks, ginger ales, soda water and like carbonated beverages, sport drinks and like soft drinks, coffee, black tea, maccha and like tea-based beverages, cocoa, lactic acid bacteria beverages and like milk beverages and other general beverages; yogurt, jellies, puddings, mousse and like desserts; baked confectioneries, steamed confection and like confections including cake, manju and like Western sweets and Japanese sweets; sauces including fruit flavored sauces, chocolate sauces and the like; creams including butter cream, raw cream and the like; strawberry jam, marmalade and like jams; ice creams, sherbets and like ice confectioneries; chewing gums, hard candies, nougat candies, jelly beans and like confections.

The amount of the sweetening composition of the invention used for these oral compositions may be an amount effective in giving a desired sweetness to the oral composition, and is not particularly limited. More specifically, the sweetness is variable depending on the kind of oral compositions to which the sweetener is applied, other components contained in the composition, individual preference of sweetness and other factors. Thus, the content of the sweetening composition of the invention may be optionally selected within the ordinary skill level in the art so that the desired sweetness can be provided in the final product, considering the type of the used high intense sweetener and its sweetness.

(1-5) Sweetening Composition Comprising Licorice Extract and Sucralose

The licorice extract for use in the present invention is extracted from roots or rhizomes of licorice (*Glycyrrhiza uralensis* FISCH, *Glycyrrhiza inflata* BATALIN, or *Glycyrrhiza glabra* LINNE) with hot water or with a room-temperature or lukewarm alkaline aqueous solution, and optionally by puficification. The licorice extract contains glycyrrhizinic acid or its salt as a main component. In the present invention, the licorice extract is not limited in its degree of purification. The form of the licorice extract include an extract prepared by graduation of the extracted liquid of a licorice root, a powder or granules prepared by freeze-drying the extract, and glycyrrhizinic acid or its salt isolated from the licorice extract. Examples of the salt of glycyrrhizinic acid include sodium, potassium and like alkali metal salts or ammonium salts of glycyrrhizinic acid, preferable sodium salts of glycyrrhizinic acid.

The sweetening composition of the invention should contain at least sucralose and licorice extract therein, and may be in any form such as a powder, granules, a solid (tablet, pill) and a liquid. The sweetening composition may be a powdery mixture of licorice extract and sucralose; a mixture prepared by spraying a sucralose solution to a licorice extract powder; or a mixture prepared by spraying a licorice extract solution to a sucralose powder. The sweetening composition may be also a mixture prepared by drying a mixture of a licorice extract solution and a sucralose solution. The method for drying the mixture is not critical, and may be spray drying, drum drying, freeze drying and various other methods.

Although the content of sucralose and licorice extract is variable according to the kind of product to which the sweetening composition is applied, usually, the amount of licorice extract to be used is suitably selected from the range of 0.001 to 100 parts by weight, per part by weight of sucralose.

Although sucralose itself is an excellent sweetener with little rough taste as sodium saccharin and like conventional high intense sweeteners have, and clean, refreshing sweetness, adding the licorice extract within the above-specified range gives to sucralose produces a body with deepness and richness in addition to the refreshing sweetness. The addition of the licorice extract also reduces the lingering sweet aftertaste and gives clear aftertaste, providing a better sweetening composition similar to sucrose. The sweetening composition is useful as a non-cariogenic and low-calorie or no-calorie sweetener due to the properties of sucralose. Further, sucralose contained in the sweetener significantly increases saltiness tendering effect of the licorice extract. Thus, it is useful to enhance the tastiness of foods, particularly for the foods with a relatively high salt content such as miso, soy sauce and like seasonings, pickles, tsukuda-ni and like salt cured products, snacks and like salty confections.

The sweetening composition according to the present invention may contain, for example, other sweeteners than sucralose and licorice extract, flavors, preservatives, stabilizers and like components unless they lessen the effects of the present invention.

The sweetening composition of the invention can be used itself as a cooking sweetener or table sweetener in place of sugar and other sweeteners commonly used as sweeteners and also as a sweetener to be added to various oral compositions.

Since the sweetening composition of the invention has the aforementioned various properties, it is useful for the foods in which good sweetness and tastiness based on sweetness or deliciousness based on saltiness tendering effect increase the commercial values of the food, the foods in which low-calorie characteristics and non-cariogenicity are advantageous, and for diet foods.

Examples of such foods are not limited and include wide variety of foods. Preferable examples of such foods include marines such as vegetables, fish, shellfish and red meats steeped in soy sauce, miso, salt, sake lees and the like; soy sauce, miso, sauce, ketchup and like seasonings; tsukuda-ni of vegetables, fish, shellfish, mushrooms, seaweeds, red meat and the like boiled in soy sauce, mirin (sweet cooking rice wine) and like seasonings; shiokara (squid strips in innards sauce) and like delicacies; dry snacks, okaki (rice cracker) and like confections and salty foods.

The amount of the sweetening composition of the invention used for these oral compositions may be an amount effective in giving a desired sweetness, and preferably saltiness tendering effect, to the oral composition, and is not particularly limited. More specifically, the sweetness is variable depending on the kind of oral compositions to which the sweetener is applied, other components contained in the composition, individual preference of sweetness and other factors. Thus, the content of the sweetening composition of the invention may be optionally selected within the ordinary skill level in the art so that the desired sweetness can be provided in the final product, considering the type of the used high intense sweetener and its sweetness.

(1-6) Sweetening Composition Comprising Stevia Extract, Rhamnose and Sucralose

The stevia extract for use in the present invention is one or more members selected from the group consisting of an extract containing steviol glycoside extracted from leaves of stevia (*Stevia rebaudiana* BERTONI) as a main component, one or more sweet substances contained in the extract, these extracts and sweet components with glucose or fructose added to their sugar chains by treating with enzyme ($\alpha$-glucosyltransferase and/or $\alpha$-fructosyl transferase).

The stevia extract is an high intense sweetener which is about 100 to 300 times as sweet as sugar, and sweetness quality similar to sugar. The stevia extract has been used as a substitute for sugar because of its advantage of having no calorie. In general, the stevia extract contains stebioside in a concentration of 70 to 80% and rebaudioside in a concentration of 20 to 30%. In the present invention, the content of stebioside and rebaudioside in the stevia extract is not limited, and the stevia extract may contain stebioside or rebaudioside singly.

L-Rhamnose for use in the present invention is a conventionally known sweetener which is a reducing sugar found in rutin (extract) or peels, barks or flowers of *Citrus sinensis* OSBECK or *Citrus unshiu* MARCOV. The content of the stevia extract, sucralose and L-rhamnose in the sweetening composition of the invention is variable according to the types of the foods to which the sweetening composition is applied, but can be suitably selected from the range of the ratio of stevia extract:sucralose:L-rhamnose (by weight) =0.1 to 100:0.1 to 50:0.1 to 100.

Sucralose itself is an excellent sweetener having clean, refreshing sweetness and little rough taste as sodium saccharin and like conventional high intense sweeteners have. The stevia extract and L-rhamnose added within the above-specified range gives a body with deepness and richness to the sucralose, in addition to refreshing sweetness. Further, the combination of the above three components improves the lingering sweet and bitter aftertaste of the stevia extract characteristic of the high intense sweetener, giving an excellent sweetening composition similar to sucrose.

The sweetening composition according to the present invention may contain, for example, other sweeteners than sucralose, stevia extract and rhamnose, flavors, preservatives, stabilizers and other components, unless they lessen the effects of the present invention.

The form of the sweetening composition of the invention are not particularly limited, and may be a solution diluted with water and the like, a powder or granules dried by spray drying or like method, or a tablet prepared by molding these powder and granules.

The sweetening composition of the invention can be used itself as a cooking sweetener or table sweetener in place of sugar and other sweeteners commonly used as sweeteners and also as a sweetener to be added to various oral compositions.

The present invention can provide a sweetener having one of five basic taste qualities, sweetness, which is qualitatively improved and similar to that of sugar by giving richness (body, volume feeling) which is scarcely found in the sweetness of conventional high intense sweeteners and mitigating an unpleasant lingering sweet aftertaste and increasing smoothness. The present invention can also provide a low-calorie or no-calorie sweetener. Thus, the present invention can be useful especially for the foods in which tastiness (sweetness, umami taste, etc.) is required to increase their commercial values, the foods in which low-calorie characteristics is advantageous and diet foods.

Such foods are not particularly limited, and preferable examples include citrus juices, vegetable juices and like fruit beverages and vegetable juices, cola drinks, ginger ales, soda waters and like carbonated beverages, sport drinks and like soft drinks, coffee, black tea, maccha and like tea-based beverages, cocoa, lactic acid bacteria beverages and like milk beverages and other general beverages; yogurt, jellies, puddings, mousse and like desserts; baked confections and steamed confections including cakes, manju and like Western Western confections and Japanese sweets and other confectioneries; ice creams, sherbets and like cold sweets and other ice confectioneries; chewing gums, hard candies, nougat candies, jelly beans and like general confections; fruit flavored sauces, chocolate sauce and like sauces; butter cream, raw cream and like creams; strawberry jam, marmalade and like jams; breads including kashi-pan and the like; sauces used for yakiniku, yakitori, unagi-kabayaki and the like, tomato ketchup and like sauces; kamaboko and like surimi-based products, retort pouched foods, pickles, tsukuda-ni, food preparations, frozen foods and wide variety of processed farm and aquatic products.

The amount of the sweetening composition of the invention used for these oral compositions may be an amount effective in giving a desired sweetness to the oral composition, and is not particularly limited. More specifically, the sweetness is variable depending on the kind of oral compositions to which the sweetener is applied, other components contained in the composition, individual preference of sweetness and other factors. Thus, the content of the sweetening composition of the invention may be optionally selected within the ordinary skill level in the art so that the desired sweetness can be provided in the final product.

(1-7) Sweetening Composition Comprising Thaumatin and Sucralose

Thaumatin for use in the present invention is a protein extracted from the fruits of the plant *Thaumatococcus danielli* BENTH. and an high intense sweetener having a sweetness concentration equivalent to a 6 to 8% aqueous solution of sucrose 2000 to 3000 times as high as sucrose.

The content of sucralose and thaumatin is variable according to the types of the products to which the sweetening composition is applied, but can be suitably selected from the range of the ratio of sucralose and thaumatin=1000:1 to 50:1, preferably 500:1 to 100:1 (by weight).

When the ratio of thaumatin to sucralose is too low, the taste quality of sucralose becomes dominant, whereas in case the ratio is too high, the lingering sweet aftertaste derived from thaumatin becomes noticeable. Therefore, either case can not produce sufficient sweetness improving effect. However, these amount ratios are variable according to individual preference of sweetness and the types of products to which the sweetener is applied, and are not limited to the above-specified ranges.

Furthermore, the sucralose sweetening composition comprising sucralose and thaumatin of the present invention may be the sweetening composition as a whole comprising sucralose and thaumatin, and may be in any form such as a powder, granules, a solid or a liquid. The sweetening composition may be in a single portion, or in two portion. The sweetening composition may be a powdery mixture of thaumatin and sucralose; a mixture prepared by spraying a sucralose solution to a thaumatin powder; or a mixture prepared by spraying a thaumatin solution to a sucralose powder. The sweetening composition may be also a mixture prepared by drying a mixture of a sucralose solution and a thaumatin solution. The method for drying the mixture is not critical, and may be spray drying, drum drying, freeze drying and various other methods.

The sweetening composition according to the present invention may contain, for example, other sweeteners than sucralose and thaumatin, flavors, preservatives, stabilizers and other components, unless they lessen the effects of the present invention.

According to the sweetening composition of the invention, the sweetness of sucralose itself, that is, cleans and excellent sweetness free from rough taste and lingering sweet aftertaste, can be qualitatively improved in one of five basic taste qualities, sweetness by adding thereto the body (richness, volume feeling) which is scarcely found in sucralose. Therefore, the sweetening composition is particularly useful for the foods in which sweetness increases their tastiness and commercial values.

The foods which can be the subject of the present invention are not particularly limited, and preferable examples include citrus juices, vegetable juices and like fruit beverages and vegetable juices, cola drinks, ginger ales, soda waters and like carbonated beverages, sport drinks and like soft drinks, coffee, black tea, maccha and like tea-based beverages, cocoa, lactic acid bacteria beverages and like milk beverages and other general beverages; yogurt, jellies, puddings, mousse and like desserts; baked confections and steamed confections including cakes, manju and like Western Western confections and Japanese sweets and other confectioneries; ice creams, sherbets and like cold sweets and other ice confectioneries; chewing gums, hard candies, nougat candies, jelly beans and like general confections; fruit flavored sauces, chocolate sauce and like sauces; butter cream, raw cream and like creams; strawberry jam, marmalade and like jams; breads including kashi-pan and the like; sauces used for yakiniku, yakitori, unagi-kabayaki and the like, tomato ketchup and like sauces; kamaboko and like surimi-based products, retort pouched foods, pickles, tsukuda-ni, food preparations, frozen foods and wide variety of processed farm and aquatic products.

It is necessary to achieve the effects of the present invention that the food comprises sucralose and thaumatin eventually. The timing and order of combining sucralose and thaumatin are not critical. It is not necessary that sucralose and thaumatin are present in the same food. Even in case that sucralose and thaumatin are each contained in different foods, it is only necessary for sucralose and thaumatin to be present together when eaten, for example, in such case that soft cream contains sucralose, while its toppings and cone cups contain thaumatin.

To achieve the effects of the present invention, the ratio of sucralose to thaumatin, when the food is taken, may be 1000:1 to 50:1, more preferably 500:1 to 100:1 (by weight). In particular, when sucralose and thaumatin are present at this ratio, the taste quality of the food can be improved to be favorable taste quality which suits the features of the food, the inherent taste quality of the food is enhanced and increased, unfavorable taste quality of the food can be diminished, and tastiness of the food can be increased generally.

In the present invention, the content of sucralose and thaumatin in the food may be suitably adjusted in the final food, and are not particularly limited. For example, when the food is a beverage, the total amount of sucralose and thaumatin may be 0.003 to 0.03 parts by weight, based on 100 parts by weight of the beverage contained in the final food, and the ratio of sucralose:thaumatin may be 1000:5 (by weight).

However, since the optimal concentration of sucralose and thaumatin may vary depending on the desired sweetness, sweetness quality, kinds of the foods and the temperature of the foods when taken, it can be suitably adjusted by a person of skill in the art. For this reason, the concentration of sucralose and thaumatin is not restricted to the above-specified range as far as they are combined at such a ratio that can achieve the effects of the present invention.

Sweetening Composition of (2)

The present invention characteristically uses gluconic acid, gluconic acid salt, glucono-δ-lactone (hereinafter collectively referred to as gluconic acids), gymnemic acid or milk serum mineral as a sweetness quality improving agent or auxiliary sweetener for sucralose.

(2-1) Sweetening Composition Comprising Gluconic Acids and Sucralose

The gluconic acid, gluconic acid salt and glucono-δ-lactone for use in the present invention have been conventionally used as pH adjustors, solidifying agents, baking powders or acidulant and the like for a wide variety of foods, drugs, quasi-drugs and the like. All of these are commercially available. Herein, gluconic acid salt includes potassium gluconate, sodium gluconate and like alkali metal salts of gluconic acid and calcium gluconate and like alkali earth metal salts of gluconic acid. Among them, preferable are potassium gluconate, sodium gluconate and like alkali metal salts of gluconic acid.

In the present invention, the above gluconic acids used in combination with sucralose may be any of gluconic acid, gluconic acid salt (e.g., potassium salt, sodium salt, calcium salt, etc.) and glucono-δ-lactone. These are used singly or in any combination of two or more kinds, together with sucralose.

The content of sucralose and gluconic acids is variable depending on the kinds of used gluconic acids and the kinds of products to which the sweetening composition is applied, usually 0.01 to 10000 parts by weight of gluconic acids may be used per part by weight of sucralose. More specifically, for example, in case potassium gluconate is used as the gluconic acid, the preferable amount of potassium gluconate may be 0.02 to 10000 parts by weight, more preferably 0.2 to 5000 parts by weight, per part by weight of sucralose. In case of using sodium gluconate, the amount of sodium gluconate may be 0.01 to 5000 parts by weight, preferably 0.1 to 2000 parts by weight, per part by weight of sucralose.

However, these contents are variable according to individual preference of sweetness and the types of products to which the sweetener is applied, and are not limited to the above-specified ranges.

The sweetening composition according to the present invention may contain, for example, other sweeteners than sucralose, gluconic acid, gluconic acid salt and glucono-δ-lactone, flavors, preservatives, stabilizers and other components, unless they lessen the effects of the present invention.

The form of the sweetening composition of the invention are not particularly limited, and may be a solution diluted with water and the like, a powder or granules dried by spray drying or like method, or a tablet prepared by molding these powder and granules.

The sweetening composition of the invention can be used itself as a cooking sweetener or table sweetener in place of sugar and other sweeteners commonly used as sweeteners and also as a sweetener to be added to various oral compositions.

The sweetening composition of the invention can qualitatively improve one of the five basic taste qualities, sweetness, by producing richness (body, volume feeling), which is scarcely found in the sweetness of the sweetener of sucralose itself and reducing the unpleasant lingering sweet aftertaste. Therefore, the sweetening composition is especially useful for the foods in which sweetness increases their tastiness and commercial values.

Such foods are not particularly limited, and preferable examples include citrus juices, vegetable juices and like fruit beverages and vegetable juices, cola drinks, ginger ales, soda waters and like carbonated beverages, sport drinks and like soft drinks, coffee, black tea, maccha and like tea-based beverages, cocoa, lactic acid bacteria beverages and like milk beverages and other general beverages; yogurt, jellies, puddings, mousse and like desserts; baked confections and steamed confections including cakes, manju and like Western Western confections and Japanese sweets and other confectioneries; ice creams, sherbets and like cold sweets and other ice confectioneries; chewing gums, hard candies, nougat candies, jelly beans and like general confections; fruit flavored sauces, chocolate sauce and like sauces; butter cream, raw cream and like creams; strawberry jam, marmalade and like jams; breads including kashi-pan and the like; sauces used for yakiniku, yakitori, unagi-kabayaki and like, tomato ketchup and like sauces; kamaboko and like surimi-based products, retort pouched foods, pickles, tsukuda-ni, food preparations, frozen foods and wide variety of processed farm and aquatic products.

The amount of the sweetening composition of the invention used for these oral compositions may be an amount effective in giving a desired sweetness to the oral composition, and is not particularly limited. More specifically, the sweetness is variable depending on the kind of oral compositions to which the sweetener is applied, other components contained in the composition, individual preference of sweetness and other factors. Thus, the content of the sweetening composition of the invention may be optionally selected within the ordinary skill level in the art so that the desired sweetness can be provided in the final product, considering the type of the used high intense sweetener and its sweetness.

(2-2) Sweetening Composition Comprising Gymnemic Acid and Sucralose

The gymnemic acid for use in the present invention is triterpene glycoside contained in the leaves of a plant (*Gymnema sylvestre*) which belongs to the family Asclepiadaceae. Recently, gymnemic acid was found to have the effects of selectively reducing sweetness sensation and slowing down the absorption of sugar by intestine. Hence, gymnemic acid is attracting attention as a substance which is useful for diet foods and effective in inhibiting the rise in the blood-sugar level of diabetic patients after eating foods.

The content of the sucralose and gymnemic acid is variable depending on the kinds of the products to which the sweetening composition is applied. Usually, the gymnemic acid may be used in an amount of 0.00001 to 1 parts by weight, preferably 0.00005 to 0.5 parts by weight, per part by weight of sucralose.

Sucralose itself is an excellent sweetener which has clean, refreshing sweetness and little rough taste and lingering sweet aftertaste as sodium saccharin and like conventional high intense sweeteners. However, addition of the gymnemic acid in the above-specified range imparts sucralose refreshing sweetness and a body with deepness and richness, providing an excellent sweetening composition similar to sucrose. In addition, although sucralose itself is about 600 times as sweet as sucrose and is a low-calorie sweetener, it can prepared as a substantially no-calorie sweetening composition when it is combined with gymnemic acid which inhibits the absorption of sucralose by intestine.

The sweetening composition according to the present invention may contain, for example, other sweeteners than sucralose and gymnemic acid, flavors, preservatives, stabilizers and other components, unless they lessen the effects of the present invention.

The form of the sweetening composition of the invention are not particularly limited, and may be a solution diluted with water and the like, a powder or granules dried by spray drying or like method, or a tablet prepared by molding these powder and granules.

The sweetening composition of the invention can be used itself as a cooking sweetener or table sweetener in place of sugar and other sweeteners commonly used as sweeteners and also as a sweetener to be added to various oral compositions.

On the basis of the above described properties, the sweetening composition of the invention is particularly useful for the foods in which high sweetness and good sweetness quality increase their tastiness and commercial values and the foods in which low-calorie characteristics and non-cariogenicity are advantageous, e.g., desserts and confections and like confectioneries and beverages and like refreshment foods, diabetic foods and diet foods.

Such foods are not particularly limited, and preferable examples include citrus juices, vegetable juices and like fruit beverages and vegetable juices, cola drinks, ginger ales, soda waters and like carbonated beverages, sport drinks and like soft drinks, coffee, black tea, maccha and like tea-based beverages, cocoa, lactic acid bacteria beverages and like milk beverages and other general beverages; yogurt, jellies, puddings, mousse and like desserts; baked confections and steamed confections including cakes, manju and like Western confections and Japanese sweets and other confectioneries; fruit flavored sauces, chocolate sauce and like sauces; butter cream, raw cream and like creams; strawberry jam, marmalade and like jams; ice creams, sherbets and like ice confectioneries; chewing gums, hard candies, nougat candies, jelly beans and like confections.

The amount of the sweetening composition of the invention used for these oral compositions may be an amount effective in giving a desired sweetness to the oral composition, and is not particularly limited. More specifically, the sweetness is variable depending on the kind of oral compositions to which the sweetener is applied, other components contained in the composition, individual preference of sweetness and other factors. Thus, the content of the sweetening composition of the invention may be optionally selected within the ordinary skill level in the art so that the desired sweetness can be provided in the final product (2-3) Sweetening Composition Comprising Milk Serum Mineral and Sucralose The milk serum mineral for use in the present invention is a mineral component contained in a yellow-green liquid (whey, milk serum) obtained by adding acid or a milk coagulating enzyme to milk or skim milk and removing the resulting coagulation (curd) therefrom. The milk serum usually contains milk sugar, soluble protein (lactoalbumin, lactoglobulin), water-soluble vitamin (B1, B2, nicotinic acid, C, etc.), salts and about 0.7% of mineral components. The milk serum mineral, which can be separated from a raw material of milk serum by ultrafiltration or like methods, are commercially available.

The present invention may use, in addition to milk serum mineral itself, whey products containing milk serum mineral, e.g., whey, condensed whey, cheese whey powder, acid whey powder and these products in combinations.

The content of sucralose and milk serum mineral is variable depending on the kind of the products to which the sweetening composition is applied. Usually, milk serum mineral may be used in an amount of 0.1 to 100 parts by weight, preferably 1 to 60 parts by weight, per part by weight of sucralose.

Although sucralose itself is an excellent sweetener with clean, refreshing sweetness and little rough taste as sodium saccharin and like conventional high intense sweeteners have, addition of milk serum mineral thereto in the above-specified range adds a body with deepness and richness to the refreshing sweetness of the sucralose, providing an better sweetening composition similar to sucrose. Additionally, minerals are constituents of the body and are important substances which are responsible for physiological effects and metabolic regulation effects necessary for vital activities. Mineral are also useful as activators of enzymes. As mentioned in the above, since the sweetening composition of the invention contains a relatively large amount of milk serum mineral, it is useful not only as a sweetener which imparts sweetness, but also as a functional additive which supplies substances beneficial to organisms and helps the functions of the organisms.

The sweetening composition according to the present invention may contain, for example other sweeteners than sucralose and milk serum mineral, flavors, preservatives, stabilizers and other components, unless they lessen the effects of the present invention.

The form of the sweetening composition of the invention are not particularly limited, and may be a solution diluted with water and the like, a powder or granules dried by spray drying or like method, or a tablet prepared by molding these powder and granules.

The sweetening composition of the invention can be used itself as a cooking sweetener or table sweetener in place of sugar and other sweeteners commonly used as sweeteners and also as a sweetener to be added to various oral compositions.

On the basis of the above described properties, the sweetening composition of the invention is useful particularly for the foods in which high sweetness and good sweetness quality increase their tastiness, smoothness and commercial values and the foods in which low-calorie characteristics and non-cariogenicity are advantageous, e.g., desserts, sweets and like confections, beverages and like refreshment foods, diabetic foods and diet foods.

Such foods are not particularly limited, and preferable examples include citrus juices, vegetable juices and like fruit beverages and vegetable juices, cola drinks, ginger ales, soda waters and like carbonated beverages, sport drinks and like soft drinks, coffee, black tea, maccha and like tea-based beverages, cocoa, lactic acid bacteria beverages, whey beverages, milk beverages and other general beverages; yogurt, jellies, puddings, mousse and like desserts; baked confections and steamed confections including cakes, manju and like Western confections and Japanese sweets and other confectioneries; fruit flavored sauces, chocolate sauce and like sauces; butter cream, raw cream and like creams; strawberry jam, marmalade and like jams; ice creams, sherbets and other ice confectioneries; chewing gums, hard candies, nougat candies, jelly beans and like confections; pickles, kamaboko and like processed farm products and aquatic products.

The amount of the sweetening composition of the invention used for these oral compositions may be an amount effective in giving a desired sweetness to the oral composition, and is not particularly limited. More specifically, the sweetness is variable depending on the kind of oral compositions to which the sweetener is applied, other components contained in the composition, individual preference of sweetness and other factors. Thus, the content of the sweetening composition of the invention may be optionally selected within the ordinary skill level in the art, considering the sweetness in the final product.

Sweetening Composition of (3)

The present invention is characterized by the use of soybean polysaccharide as a physical property improver (anti-moisture agent, anticaking agent, anti-deliquescence agent) and sweetness quality improving agent as a sweetening composition containing sucralose.

The soybean polysaccharide for use in the present invention is a water-soluble polysaccharide derived from soybeans, and includes, but is not limited to, so-called soybean dietary fiber or water-soluble soybean hemicellulose and the like. The soybean polysaccharide is usually extracted and purified from insoluble dietary fibers which are produced in the course of the preparation of soy protein isolate from soybeans, optionally with sterilization. Alternatively, it is commercially available from FUJI OIL CO., LTD. by the product name SOYA FIVE-S, or from San-Ei Gen F.F.I., Inc. by the product name of Water-Soluble Soybean Polysaccharide SM700.

The soybean polysaccharide may be preperably applied, for example, to such sweeteners or sweetening compositions that are inherently highly hygroscopic and are prone to degradation and alteration of quality, caking and deliquescence, or such sweeteners or sweetening compositions that are powdery and hard to handle because they can be electrically charged. Examples of such sweeteners include a wide variety of conventional sucrose, low intense sweetener and high intense sweeteners. Among them, sucralose is preferable. The combined use of sucralose and soybean polysaccharide lowers the hygroscopicity of sucralose and prevents caking or deliquescence, thereby stabilizing the quality of the sweetener, improving the sweetness quality of sucralose and providing a better-tasting sweetening composition.

The present invention is a sweetening composition comprising sucralose and soybean polysaccharide.

The sweetening composition according to the present invention may contain, for example, other sweeteners than sucralose and soybean polysaccharide, flavors, preservatives, stabilizers and other components, unless they lessen the effects of the present invention. Examples of such components include those which exhibit remarkable effects when used in combination with sucralose, such as the above-mentioned fructose, non-reducing disaccharides, sugar alcohols, beet oligosaccharide, licorice extract, stevia, rhamnose, thaumatin and like various sweeteners, gluconic acid, gluconic acid salts, glucono-δ-lactone, gymnemic acid, milk serum mineral and the like.

The ratio of the soybean polysaccharide and sucralose to achieve the effects of the present invention may be, but is not limited to, typically soybean polysaccharide:sucralose=1:10 to 200000:1, preferably 1:10 to 10000:1 (by weight).

The sweetening composition of the invention can be widely used as a sweetener for foods in general, drugs and quasi-drugs taken orally or used in the oral cavity. Preferably, the sweetening composition of the invention is used as a sweetener for foods.

Such foods to which the sweetening composition can be applied are not particularly limited, and preferable examples include citrus juices, vegetable juices and like fruit beverages and vegetable juices, cola drinks, ginger ales, soda waters and like carbonated beverages, sport drinks and like soft drinks, coffee, black tea, maccha and like tea-based beverages, cocoa, lactic acid bacteria beverages and like milk beverages and other general beverages; yogurt (including drink yogurt, jellies, puddings, mousse and like desserts; baked confections and steamed confections including cakes (including sponge cake), cookies, manju and like Western confections and Japanese sweets and other confectioneries; ice creams, sherbets and like cold sweets and other ice confectioneries; chewing gums, hard candies, nougat candies, jelly beans and like general confections; fruit flavored sauces, chocolate sauce and like sauces; butter cream, raw cream and like creams; strawberry jam, marmalade and like jams; breads including kashi-pan and the like; sauces used for yakiniku, yakitori, unagi-kabayaki and like, tomato ketchup and like sauces; kamaboko and like surimi-based products, frozen pilaf and like processed rice foods, retort pouched foods, pickles, tsukuda-ni, food preparations, frozen foods and wide variety of processed farm and aquatic products.

The content of soybean polysaccharide and sucralose which are added to foods are not particularly limited, and may be suitably selected depending on the physical properties of the foods and individual preference. For example, soybean polysaccharide may be usually used in an concentration of 0.01 to 20% by weight, preferably 0.05 to 20% by weight, and sucralose in a concentration of 0.0001 to 0.1% by weight. Within these ranges, soybean polysaccharide and sucralose may be suitable used at the aforementioned ratio. Because the sweetness of sucralose itself becomes prominent in a concentration of about 0.0006% by weight or higher, when it is used also as a sweetener to impart sweetness, sucralose may be used in the above concentration or higher, while it may be used below the above concentration when a low sweetness is desired. Such amount can be optionally adjusted by a person of skill in the art within the ordinary skill level in the art.

II. Foods with a Masked Unpleasant Smell and Taste

The invention according to this embodiment was developed on the basis of the finding that sucralose is effective in mitigating or masking an unpleasant smell or unpleasant lingering aftertaste (remaining feeling) derived from a specific foodstuff, or bitterness and like unpleasant taste.

The present invention are the foods with masked unpleasant smells listed below at (1).

(1) The following foods ① to ⑫ containing sucralose in an amount effective in masking unpleasant smells derived from the foodstuffs shown below:
- ① food containing docosahexaenoic acid
- ② food containing a protein ingredient
- ③ edible product containing collagen
- ④ soybean milk food
- ⑤ natto food
- ⑥ processed vegetable food
- ⑦ oral composition containing vitamin
- ⑧ processed aquatic product
- ⑨ processed flour food
- ⑩ meat food
- ⑪ retort pouched food
- ⑫ canned product or canned food Further, the present invention relates to the masking agents for the smells listed below, the masking agents using sucralose as an active ingredients: ① raw smell of docosahexaenoic acid, ② protein ingredient smell, ③ collagen smell, ④ bean smell, ⑤ natto smell, ⑥ raw smell of vegetables, ⑦ vitamin smell, ⑧ raw smell of fish and shellfish, ⑨ floury odor, ⑩ meat odor, ⑪ retort pouch odor and ⑫ can odor. Furthermore, the present invention relates to methods for masking the smells listed below, the methods comprising adding sucralose to the source objects of the smells: ① raw smell of docosahexaenoic acid, ② protein ingredient smell, ③ collagen smell, ④ bean smell, ⑤ natto smell, ⑥ raw smell of vegetables, ⑦ vitamin smell, ⑧ raw smell of fish and shellfish, ⑨ floury odor, ⑩ meat odor, ⑪ retort pouch odor and ⑫ can odor.

The present invention relates to the foods listed below at (2) and having masked unpleasant tastes.

(2) The foods ① to ④ below containing sucralose in an amount effective in masking the unpleasant tastes derived from the following foodstuffs:
- ① galenical-containing composition
- ② oral composition containing amino acid or peptide
- ③ oral composition containing vitamin
- ④ collagen-containing food Further, the present invention relates to the masking agents, containing sucralose as an active ingredient, for the unpleasant tastes derived from ① galenical, ② amino acid or peptide, ③ vitamin and ④ Collagen. Further, the present invention relates to the method for masking unpleasant tastes derived from ① galenical, ② amino acid or peptide, ③ vitamin and ④ Collagen, the method comprising adding sucralose to the source objects of these unpleasant tastes.

(1) Foods with Masked Unpleasant Smell, Uses of Sucralose as a Masking Agent for Unpleasant Smells According to the present invention, the use of sucralose in combination with docosahexaenoic acid, fish and shellfish, processed flour foods, retort pouched foods, canned products, protein ingredients, collagen, soybean milk, natto, processed vegetable foods, processed meat products, vitamins and like foodstuffs can mitigate or mask the unpleasant smells and unpleasant lingering aftertastes (remaining unpleasantness such as a raw smell) which are noticeable when taken without losing the tastiness of these foodstuffs. The present invention provides the foods with mitigated or masked unpleasant smells derived from various foodstuffs, and the novel uses of sucralose as a masking agent for various unpleasant smells.

(1-1) Food Containing Docosahexaenoic Acid (DHA)

Recently, it was found that docosahexaenoic acid (DHA) and like highly unsaturated fatty acid which are largely contained in fish lower the level of blood cholesterol, prevents thrombotic disease and play important roles in the functions of cerebrum and retina. Thus, these components have been added to foods.

However, these components have raw smells characteristic of fish and shellfish, whereby the range of their application are limited. Among these raw smells, pungent raw smell can be mitigated by arranging the processing method of the foods. However, the problem of the raw smell remaining after the food is taken, that is, the raw aftertaste occurring after the food is taken stills remains to be solved.

The present invention provides especially the DHA-containing foods in which such raw smells characteristic of DHA occurring when taken are mitigated or alleviated.

The DHA to which the present invention is directed are polyunsaturated fatty acids having 22 carbon atoms and 6 double bonds, which are largely contained in fish oils and other marine animal fats.

The DHA-containing foods for which the present invention is to be used widely include the general foods containing DHA. Examples of such foods include those containing DHA as a main ingredient (e.g., DHA-containing tablets and capsules, powdery, granular or liquid health foods or nutrition enrichments), the foods and beverages prepared by artificially adding DHA to other nutrients or food compositions as a nutrition enrichments (for example, health foods, nutrition supplement foods, powdered milk, nutritional supplement beverages, the foods with DHA added to increase their DHA content (for example, processed aquatic products), the foods which inherently contains DHA (for example, processed aquatic products made from Japanese anchovies, chubmackerel, Pacific saury, Japanese jack mackerel and the like as raw materials).

The above processed aquatic products may be the processed foods produced using fish and shellfish caught in seas, rivers, lakes and the like as raw materials by any processing, regardless of the kinds of the fish and shellfish and the types of processing. Examples of the processed aquatic products include frozen products (frozen products, frozen food), dried products, salt cured products, processed foods with seasoning? (boiled and aged foods with seasoning, seasoned and dried products), fish cakes, canned or bottled products, marinated seafood (kasuzuke: foods marinated in sake lee, misozuke: foods marinated in miso, suzuke: foods marinated in vinegar, etc.), fermented aquatic products (narezushi (fermented sushi), izushi (mussel flesh marinated in vinegar), fish sauces), extract products and like general goods, more specifically, kamaboko, chikuwa (pureed and steamed fish cake), fish ham and fish sausage and like surimi-based products, salted mackerel, salted salmon and like various salted fish and shiokara and like salt cured products, shigure-ni (sweet cooked clams) or ame-ni (food boiled in starch syrup) of small fish, squid, clams and the like or and like preserved foods boiled in soy sauce, smoked foods, marinated seafood, delicacies (for example, konowata (fermented sea cucumber intestines), uruka (salted intestines or roes of sweetfish), shuto (bonito marinated in innards sauce), etc.), canned or bottled fish and shellfish boiled in water, seasoned, marinated in oil, marinated in miso or boiled in soy sauce, seafood-based seasonings such as shottsuru (Japanese fish sauce), ishiru (Japanese fish sauce), nam pla (Thai fish sauce) and like salted and fermented seafood.

It is necessary for obtaining the DHA-containing food with masked raw smell of DHA according to the present invention that at least the final product contains sucralose, and the timing and order of adding sucralose are not critical. The method for adding sucralose is not critical either. Thus, sucralose in a solid state, e.g., a powder or granules may be used, or sucralose in a form of a solution may be used.

The content of sucralose in the DHA-containing food is not particularly limited and may be suitably selected depending on the kinds of food and other conditions within the range which is effective in masking the raw smell of DHA. Usually, the amount of sucralose is suitably selected from 0.01 to 10 parts by weight, preferably 0.01 to 1 parts by weight, per part by weight of DHA contained in the food.

The sweetness of sucralose itself becomes prominent in a concentration of about 0.0006% by weight or higher. Accordingly, when it is used also as a sweetener to impart sweetness, sucralose may be used in the above concentration or higher, while it may be used below the above concentration when a low sweetness is desired. Such amount can be optionally adjusted by a person of skill in the art within the ordinary skill level in the art.

According to the present invention, the addition of sucralose can significantly mask the raw smell of DHA, particularly remaining raw smell, whereby the foods having enhanced physiological functions and enriched nutrition can be prepared without giving unpleasantness caused by the smell.

Hence, from a different point of view, the present invention relates to a masking agent for a raw aftertaste of DHA containing sucralose as an active ingredient, and to a method for masking a raw aftertaste of DHA by adding sucralose to an object containing DHA.

The masking agent of the present invention should contain at least sucralose. The masking agent may also contain, for example, other sweeteners, flavors, preservatives, stabilizers and other components, unless they lessen the effects of the present invention.

The masking agent for unpleasant smells (raw smells) the present invention may be in the form of a solid such as a powder, granules and the like, or in the form of a solution. The masking agent is added in any of these forms to the above-mentioned various foods and beverages at any step of their preparation. The addition of the masking agent can significantly mask the raw aftertaste caused by DHA contained in foods, thereby providing the foods which are high in nutritive value and acceptable for more consumers.

It is not critical when to add the masking agent. The amount of the masking agent to be added to the foods can be suitably selected based on the aforementioned amount of sucralose to be added to the foods of the present invention.

(1-2) Food Containing a Protein Ingredient

Milk, egg, soybean, wheat and the like are the everyday foods which contain excellent protein and are consumed broadly. However, these foods have characteristic smells derived from the protein ingredients contained therein. The smells of the protein ingredients sometimes spoil the tastiness of the processed foods and food preparations (including beverages) including the above-mentioned foods. Moreover, the smells disadvantageously limit the use and application range of the foods. For these reasons, various attempts have been made to mask the smell of the protein ingredients derived from the protein contained in these foods or its decomposition products without losing their nutrients.

The present invention provides a food containing a protein ingredient with reduced and alleviated smell of protein ingredients.

In the present invention, the protein ingredients widely denote proteins and their decomposition products, and include, but are not limited to, proteins derived from eggs, milk, soybeans, wheat, rice and the like, or their decomposition products. Specific examples of the proteins include, but are not limited to, animal proteins including egg proteins (albumin and like egg yolk proteins, vitellin and like egg white proteins, and their decomposition products), milk proteins (milk serum proteins such as casein or its salt, lactoalbumin, lactoglobulin and like and their decomposition products); and vegetable proteins including glycinin and like soybean protein and their decomposition products, gliadin, glutenin and like wheat proteins and their decomposition products, oryzenin and like rice proteins and their decomposition products.

The smell of protein ingredient which is the subject of the present invention include the smells derived from the above protein ingredients. Preferably, the present invention is particularly directed to the smells of protein ingredient derived from egg white protein, casein or its salt, milk serum proteins, soybean protein or wheat proteins, and their decomposition products. The salts of casein include sodium salt, calcium salt and the like. Preferable examples of the decomposition products of various proteins include soybean peptide, casein-derived peptide and decomposition products of milk serum proteins.

The soybean peptide is a peptide derived from soybean protein, and is not particularly limited. Usually, the soybean peptide includes polypeptide having a molecular weight of about 300 to 10000, prepared by hydrolyzing the soybean protein with protease (pepsin, etc.) or a dilute acid (as of hydrochloric acid). Such soybean peptide exhibits the ability to lower the level of blood cholesterol, and has a characteristic smell called soybean smell.

Casein-derived peptide is a peptide derived from casein which is a main component of milk protein, and is not particularly limited. Specific examples of the casein-derived peptide include casein phosphopeptide ($\alpha$-CPP, $\beta$-CPP) prepared by decomposing casein with trypsin, casein macropeptide prepared by decomposing casein with chymosin, casein decapeptide prepared by decomposing casein with pepsin and the like. Among them, casein phosphopeptide (CPP) has an advantageous function of helping the absorption of calcium and like by preliminary bonding with dissolved calcium to prevent bonding of calcium and dietary fibers and the like which prevents absorption of calcium by intestine. Therefore, casein phosphopeptide (CPP) is used as an ingredient for the foods for specified health use. Casein decapeptide has an ability to lower blood pressure. However, both of them have the characteristic smell called milky smell.

The foods containing a protein ingredient which are the subject of the present invention widely include the foods containing the preceding proteins and their decomposition products. The food containing a protein ingredient may contain one of the above proteins and their decomposition products, or two or more in any combinations.

Within the above-specified range, the kinds of the foods are not particularly limited. Examples of the foods include a wide range of carbonated beverages, coffee, soft drinks, milk coffee, milk tea, cocoa and like milk beverages, lactic acid bacteria beverages, nutrition supplement beverages, soybean milk beverages, beverages enrich with calcium and like minerals and like beverages; candies, chewing gums, tablet snacks, gummy candies, dry snacks and like confections, jellies, annin dofu (almond jelly), mousse, yogurt and like dessert foods, cakes, cookies and manju prepared from wheat flour, rice flour and the like Western and Japanese sweets, ice creams, sherbets and like cold sweets and like general refreshment foods; breads; rice-based dishes such as rice cakes, ready-to-eat rice and the like; udon (thick white wheat noodle), ramen, pastas and like noodles; instant soups, potages and like soups and their powdered instant foods; tofu or abura-age (thin or thick fried tofu), ganmodoki (tofu-based fried dish), yuba (soybean curd film) and like tofu processed foods; kinako (roasted soybean powder), soybean flour, soybean meal and like soybean flour products and flour products of wheat flour, rice flour and like and various products prepared from these flour products; creamer (cream for coffee); cheeses, cheese food, butter and like dairy product. The foods which are the subject of the present invention include foods for specified health use.

It is necessary to obtain the foods with masked smell of protein ingredient of the present invention that at least the final product contains sucralose. The time or order of adding sucralose is not critical. The method for adding sucralose is not critical either. Hence, sucralose in the form of a solid such as a powder and granules may be used, or sucralose in the form of a solution or a suspension may be used.

The amount of sucralose to be added to the food containing a protein ingredient is not limited insofar as it is effective in masking the unpleasant smell of the protein ingredient, and may be suitably selected depending on the kinds of the foods and the like. Usually, the amount of the sucralose may be suitably selected from 0.0001 to 0.01% by weight, relative to the food. The sweetness of sucralose itself becomes prominent in a concentration of about 0.0006% by weight or higher. Accordingly, when it is used also as a sweetener to impart sweetness, sucralose may be used in the above concentration or higher, while it may be used below the above concentration when a low sweetness is desired. Such amount can be optionally adjusted by a person of skill in the art within the ordinary skill level in the art.

According to the present invention, addition of sucralose to foods can significantly mask the smell of protein ingredient derived from the protein contained in the foods without losing vitamins, mineral and like nutrients contained in the foods and nutritive value of the foods, thereby providing agreeable foods having high nutritive value.

Consequently, from a different point of view, the present invention provides a masking agent for the smell of protein ingredient containing sucralose which is an high intense sweetener as an active ingredient, and the method for masking the smell of protein ingredient in the foods for which the smell of protein ingredient is disadvantageous (can be disadvantageous), the method comprising adding sucralose to, for example, the above-mentioned foods (subjects).

The masking agent of the present invention should contain at least sucralose, and may contain other sweeteners, flavors, preservatives, stabilizers and other components, unless they lessen the effects of the present invention.

The masking agent for the smell of protein ingredient of the present invention may be in the form of a solid such as a powder, granules and the like, or in the form of a solution. The masking agent in any of these forms is added to the above various foods at any step of their preparation. The addition of such masking agent can significantly mask the smells characteristic of various proteins or their decomposition products contained in foods. Accordingly, the protein ingredients can be added to various foods including desserts and beverages without any restriction owing to the smell of protein ingredients characteristic of various proteins and like ingredients, providing foods and refreshment foods which meet the needs of health-conscious consumers.

It is not critical when to add the masking agent to the foods. The amount of the masking agent to be added to the foods can be suitably selected on the basis of the above-described amount of sucralose to be added to the foods.

(1-3) Edible Product Containing Collagen

Collagen has been conventionally used as gelatin for various processed foods, as well as for a wide range of applications including edible package materials of foods, cosmetic bases and like biomaterials. Since collagen is the chief constituent of corium and connective tissues, its cosmetic effects have been attracting attention and many collagen-containing foods have been developed. However, collagen has an unpleasant smell and an unpleasant taste characteristic of collagen as gelatin. Thus, collagen added to foods may spoil the tastiness of the foods themselves, and its unpleasant smell and characteristic taste disadvantageously limit the range of use and application of collagen.

The present invention provides an edible product containing collagen whose unpleasant smell characteristic of collagen is mitigated and alleviated.

The present invention is directed to a wide variation of edible products containing collagen which are taken or possibly taken orally, for example, foods, oral drugs or quasi-drugs, lipsticks, lip balms and like products which do not cause problems if they get in the mount.

Specific examples of the products include, but are not limited to, the foods including fruit beverages, tea-based beverages, coffee beverages, soft drinks, powdered beverages, milk beverages, lactic acid bacteria beverages, carbonated beverages, nutrition supplement beverages and like beverages; candies, chewing gums, tablet snacks, gummy candies, dry snacks and like confections, jellies, annin dofu, mousse, yogurt and like dessert foods, cakes, cookies or manju and like Western and Japanese sweets, ice creams, sherbets and like cold sweets and like general refreshment foods; rice cakes, ready-to-eat rice and like rice-based dishes; udon, ramen, pastas and like noodles; instant soups, potage and like soups and their powdered instant foods; ketchup, mayonnaise, Worcestershire sauce, tonkatsu sauce, dressings, tartar sauce and like sauces and seasonings; collagen casings, sausages produced by using the casings and like foods: medical capsule bases using collagen and capsules having the bases and like drugs: lipsticks, lip balm and like quasi-drugs and cosmetics containing collagen.

It is necessary to prepare the edible product with masked collagen smell or unpleasant taste of collagen according to the present invention that at least the final product contains sucralose. The timing and order of adding sucralose are not critical. The method for adding sucralose is not particularly limited either, and sucralose may be used in the form of a solid such as a powder, granules and the like, or in the form of a solution.

The amount of sucralose to be added to the edible product containing collagen is not particularly limited insofar as it is effective in masking the collagen smell or unpleasant taste of collagen. The amount may be suitably selected depending on the kinds of the subject product and the like. Although not restricted, the amount of sucralose may be suitably selected from the following ranges. For example, a product containing 3% by weight of collagen may contain 0.0001 to 0.05% by weight, preferably 0.0001 to 0.01% by weight of sucralose, based on 100% by weight of the food. The sweetness of sucralose itself becomes prominent in a concentration of about 0.0006% by weight or higher. Accordingly, when it is used also as a sweetener to impart sweetness, sucralose may be used in the above concentration or higher, while it may be used below the above concentration when a low sweetness is desired. Such amount can be optionally adjusted by a person of skill in the art within the ordinary skill level in the art.

According to the present invention, collagen smell and unpleasant taste of collagen characteristic of collagen can be significantly masked by addition of sucralose without spoiling the tastiness of foods and aroma of products, and products good for health and cosmetic can be provided.

From a different point of view, the present invention a masking agent for a collagen smell or an unpleasant taste of collagen containing sucralose as an active ingredient, and a method for masking a collagen smell or unpleasant taste of collagen by adding sucralose to an edible product containing collagen (subject) for which the smell and unpleasant taste derived from collagen are disadvantageous (or can be disadvantageous).

The masking agent of the present invention should contain at least sucralose, and may also contain, for example, other sweeteners, flavors, preservatives, stabilizers and other components, unless they lessen the effects of the present invention.

The masking agent of the present invention may be in the form of a solid such as a powder, granules and the like, or in the form of a solution. The masking agent in any of these forms is added to the above various products at any step of their preparation. The subject of such masking agent is not particularly limited insofar as it contains collagen. Preferable subject includes that which collagen smell or taste characteristic of collagen affect its product value, for example, the above-mentioned foods, drugs, quasi-drugs, lotions, emulsions, foundations and like cosmetics.

It is not critical when to add the masking agent to the subject. The amount of the masking agent to be added to various products may be suitably selected on the basis of the amount of the sucralose to be added to the above edible product containing collagen of the present invention.

(1-4) Soybean Milk Food

Soybean milk has been attracting attention as a food which comprises soybean protein as a main constituent and is high in nutritive value and nutrients. However, its bean smell is raised as one of its disadvantages. Various attempts for alleviating the smell have been conducted, for example, heating soybean milk to deactivate lipoxygenase therein, physico-chemical treatment, microbiological treatment, adding flavors, lactic acid bacteria and the like, development of lipoxygenase-deficient soybean, etc.

The present invention provides a soybean milk food with mitigated and alleviated unpleasant smell characteristic of soybean milk.

The soybean milk food which is the subject of the present invention broadly include soybean milk and like soybean milk products and the general foods prepared by processing soybean milk. Examples of the soybean milk products include soybean milk, modified soybean milk, soybean milk beverages, soybean protein beverages and the like. Examples of the processed soybean milk foods include atsu-age, ganmodoki, yuba, tofu and like processed tofu products (e.g., tofu kamaboko, tofu chikuwa, tofu jellies, etc.).

It is necessary to prepare the soybean milk food with a mitigated bean smell according to the present invention that the food contains sucralose eventually. The timing and order of adding sucralose are not critical. The method for adding sucralose is not critical either, and sucralose may be used in the form of a solid such as a powder, granules and the like, or in the form of a solution.

The amount of sucralose to be added to the soybean milk food is not particularly limited insofar as it is effective in masking the bean smell characteristic of beans, and may be suitably selected depending on the kinds of the applied foods and other conditions. Although not restricted, the amount of sucralose may be suitably selected from the following ranges. For example, soybean milk may contain 0.00001 to 0.1% by weight, preferably 0.0001 to 0.1% by weight of sucralose. The sweetness of sucralose itself becomes prominent in a concentration of about 0.0006% by weight or higher. Accordingly, it may be used below the above concentration when a low sweetness is desired. Such amount can be optionally adjusted considering the overall taste balance of the produced product.

The present invention can provide the soybean milk food whose leafy smell, fishy smell, hay smell and like soybean milk smells characteristic of soybean milk or flavors characteristic of soybeans (bean smell) are significantly inhibited, mitigated and alleviated by adding sucralose.

Thus, from a different point of view, the present invention provides a masking agent for a bean smell using sucralose as an active ingredient, and a method for masking the bean smell by adding sucralose to a soybean milk food (subject) for which the bean smell is disadvantageous (or can be disadvantageous).

The masking agent of the present invention should contain at least sucralose, and may also contain, for example, other sweeteners, flavors, preservatives, stabilizers and other components, unless they lessen the effects of the present invention.

The masking agent of the present invention may be in the form of a solid such as a powder, granules and the like, or in the form of a solution. The masking agent in any of these forms is added to the above soybean milk foods at any step of their preparation. The addition of such masking agent can significantly mitigate the smell of soybeans and soybean milks characteristic of soybean milk foods, providing soybean milk foods which are with alleviated bean smell and high agreeability for many consumers.

The timing of the addition of the bean smell masking agent to the soybean milk food is not particularly limited. The amount of the masking agent to be added to the soybean milk food can be suitably selected based on the above-mentioned amount of sucralose to be added to the soybean milk.

(1-5) Natto Food

Natto is a food which has soybean protein as a main component and attracts attention for its high nutritive value and rich nutrients. Because of its characteristic flavor and taste (referred to as natto smell in the present invention), it is consumed mainly in limited regions of eastern and northern part of Japan. Therefore, various attempts have been conducted to reduce the characteristic natto smell, for example, improvement of natto *bacillus* itself.

The present invention provides a natto food with mitigated and alleviated unpleasant smell (natto smell) characteristic of natto.

The natto foods which are the subject of the present invention broadly include natto itself, food containing natto (natto-containing foods) and the general foods prepared using natto as a material (processed natto foods). Natto are classified into itohiki-natto (soft, sticky natto) and tera-natto (firm, unsticky natto) according to their preparation methods and constituents, both of which are included by the present invention. Examples of the natto-containing foods and processed natto foods include, but are not limited to, natto-duke (food steeped in natto-based mixture), natto-soba (buckwheat noodles in natto-based sauce), natto-jiru (natto soup), natto bread, dried natto, natto-ae (food mixed with natto-based sauce), natto-yaki (fried tofu with natto stuffing) and the like.

It is necessary to prepare the natto food with a mitigated natto smell according to the present invention that the food contains sucralose eventually. The timing and order of adding sucralose are not critical. For example, sucralose may be added to the raw material, soybeans, to the natto after being fermented, or to natto product itself. The method for adding sucralose is not critical either, and sucralose may be used in the form of a solid such as a powder, granules and the like, or in the form of a solution, depending on the stage of the preparation.

The amount of sucralose to be added to the natto food is not particularly limited insofar as it is effective in masking the smell characteristic of natto, and may be suitably selected depending on the kinds of the subject natto foods and other conditions. Although not restricted, the amount of sucralose may be suitably selected from the following ranges. For example, natto may contain 0.00001 to 0.1% by weight, preferably 0.0005 to 0.1% by weight of sucralose. The sweetness of sucralose itself becomes prominent in a concentration of about 0.0006% by weight or higher. Accordingly, it may be used below the above concentration when a low sweetness is desired. Such amount can be optionally adjusted considering the overall taste balance of the produced product.

According to the present invention, the smell characteristic of natto can be significantly reduced and mitigated without losing the flavor of natto and a natto food with reduced natto smell can be prepared by adding sucralose.

From a different point of view, the present invention provides a masking agent for a natto smell using sucralose as an active ingredient, and a method for masking the natto smell by adding sucralose to a natto food (subject) for which the natto smell is disadvantageous (or can be disadvantageous).

The masking agent of the present invention should contain at least sucralose, and may also contain, for example, other sweeteners, flavors, preservatives, stabilizers and other components, unless they lessen the effects of the present invention.

The masking agent for natto smell of the present invention may be in the form of a solid such as a powder, granules and the like, or in the form of a solution. The masking agent in any of these forms is added to the above natto foods at any step of their preparation. The addition of such masking agent can significantly mitigate the natto smell characteristic of natto foods, providing natto foods which can be consumed without minding the smell and highly acceptable to consumers.

The timing of the addition of the masking agent to the natto food is not particularly limited. The amount of the masking agent to be added to the natto food can be suitably selected based on the above-mentioned amount of sucralose to be added to the natto.

(1-6) Processed Vegetable Food

Recently, health-conscious consumers tend to prefer taking vitamins, minerals and like nutrients in more natural forms from natural foods such as vegetables, fruits and the like or processed foods of these foods to taking from artificial vitamin tables, drugs and quasi-drugs. Therefore, the attentions of more consumers are attracted to aojiru, which contains vegetable juice as a major constituent, vegetable juice, desserts containing vegetable ingredients and other processed vegetable foods. Although the vegetables such as carrots, spinach, celery, green pepper and like root vegetables and leaf vegetables are rich in vitamins, minerals and like nutrients and fibers, they have green leafy smells characteristic of vegetables. Thus, various attempts have been conducted to mask the leafy smell characteristic of vegetables without losing their nutrients and attract more consumers.

The present invention provides a processed vegetable food with mitigated and alleviated unpleasant smell (leafy smell) characteristic of vegetables.

The processed vegetable foods which are the subject of the present invention widely include the foods prepared by using vegetables as raw materials and processing the vegetables. Examples of the processed vegetable food include, but are not limited to, aojiru, vegetable juices, vegetable juices with fruit juice and like soft drinks, powdered beverages, milk beverages, lactic acid bacteria beverages, nutrition supplement beverages and like beverages; candies, chewing gums, tablet confectioneries, gummy candies, dry snacks and like confections, jellies, annin dofu, mousse, yogurt and like dessert foods, cakes, cookies or manju and like Western and Japanese sweets, ice creams, sherbets and like cold sweets and like general refreshment foods; udon, ramen, pastas and like noodles; instant soups, potage and like soups and the powdered instant foods of the soups; dressings, tartar sauce and like sauces and seasonings, vegetable salad, fried vegetable, stewed vegetable foods and like food preparations, vegetable pastes, frozen vegetables and like processed farm products in general.

The kinds of vegetables are not particularly limited, and may be any kind of vegetables which have leafy smells. As the source of the raw smell of vegetables are known leaf alcohol and leaf aldehyde. However, examples of the source of the raw smell of vegetables are not limited to these and include asparagus and like stem vegetables; Chinese cabbage, cabbage, spinach, komatsuna (*Brassica rapa* var.), syungiku (*Chrysanthemum coronarium*), Jey's mallow, kale, lettuce and like leaf vegetables; carrot, radish and like root vegetables; Chinese chive, Japanese bunching onion and like bulbous vegetables; cauliflower, broccoli and like flower vegetables; tomato, green pepper, *capsicum*, gourds, pumpkin, cucumber, kidney bean, young soybean pod, green pea, broadbean and like fruit vegetables; celery, parsley and like herbs. Particularly leafy-smelling vegetables include spinach, Jey's mallow, kale, carrot, green pepper, tomato, celery and parsley.

It is necessary to prepare the food with a masked raw smell of vegetables according to the present invention that the food contains sucralose eventually. The timing and order of adding sucralose are not critical. The method for adding sucralose is not critical either, and sucralose may be used in the form of a solid such as a powder, granules and the like, or in the form of a solution.

The amount of sucralose to be added to the processed vegetable food is not particularly limited insofar as it is effective in masking the leafy smell characteristic of vegetables, and may be suitably selected depending on the kinds of the applied foods and other conditions. Although not restricted, the amount of sucralose may be suitably selected from the following ranges. For example, a processed vegetable food may contain 0.0001 to 0.01% by weight of sucralose. The sweetness of sucralose itself becomes prominent in a concentration of about 0.0006% by weight or higher. Accordingly, when it is used also as a sweetener to impart sweetness, sucralose may be used in the above concentration or higher, while it may be used below the above concentration when a low sweetness is desired. Such amount can be optionally adjusted by a person of skill in the art within the ordinary skill level in the art.

According to the present invention, the leafy smell characteristic of vegetables can be significantly masked by adding sucralose without losing the vitamins, minerals and like nutrients contained in the vegetables, and thus the foods with high nutritive value and agreeability can be prepared.

Thus, from a different point of view, the present invention provides a masking agent for a leafy smell of vegetables using sucralose as an active ingredient, and a method for masking the leafy smell of vegetables by adding sucralose to a processed vegetable food (subject) for which the leafy smell characteristic of vegetables is disadvantageous (or can be disadvantageous).

The masking agent of the present invention should contain at least sucralose, and may also contain, for example, other sweeteners, flavors, preservatives, stabilizers and other components, unless they lessen the effects of the present invention.

The masking agent of the present invention may be in the form of a solid such as a powder, granules and the like, or in the form of a solution. The masking agent in any of these forms is added to the above processed vegetable foods at any step of their preparation. The addition of such masking agent can significantly mask the leafy smell characteristic of vegetables contained in the foods. Accordingly, various vegetables rich in vitamins, minerals and fibers and their components can be added to desserts, beverages and like various foods without being restrict by the leafy smell of the vegetables, and the foods and refreshment foods which attract health-conscious consumers can be prepared or obtained.

The timing of the addition of the masking agent to the processed vegetable food is not particularly limited. The amount of the masking agent to be added to the processed vegetable food can be suitably selected based on the above-mentioned amount of sucralose to be added to the processed vegetable food of the present invention.

(1-7) Oral Composition Containing Vitamin

Due to increased health consciousness of today's consumers, vitamins have been added not only to drugs but also to quasi-drugs and foods relatively in large amounts. However, the vitamins have characteristic smells and chemical odors, and some have bitter tastes. Therefore, vitamins added particularly to the compositions taken orally such as foods may impair the flavors and swallowing feeling of the oral compositions themselves. For this reason, may attempts have been carried out to mask the unpleasant smell and unpleasant taste derived from vitamins.

The present invention provides an oral composition containing vitamin with reduced and alleviated unpleasant smell (vitamin smell) characteristic of the vitamins.

In the present invention, the oral compositions widely include the compositions which are taken orally and used in the oral cavity. Examples of the oral composition include various foods including beverages, orally administered drugs, drugs for the oral cavity and like drugs, oral refreshment, lip balms, dentifrices, tooth pastes and like drugs and quasi-drugs. In particular, the present invention is useful for the foods of which smells and flavors are important; the vitamin preparations, nutritional supplements, syrups, oral liquid medicine and like drugs requiring good swallowing feeling, foaming agents containing vitamins and like quasi-drugs.

Examples of the foods include any foods containing vitamins such as vitamin-enriched foods, vitamin-containing beverages, vitamin-enriched beverages, vitamin-enriched milks and the like. The drugs or quasi-drugs are not particularly limited insofar as they are drugs for internal use containing vitamins as well as the foods, for example, vitamin preparations, tonics, nutritional supplements, various pharmaceutical preparations containing vitamins. All of these may be in any form such as tablets, foaming agents, liquids, syrups and the like. The amount of vitamins contained in these oral compositions is not limited, and may be the normal amount added to the above foods, drugs and the like.

The vitamins which are the subject of the present invention may be water-soluble or oil-soluble, natural or synthetic, including various substances used as vitamin preparations. Examples of natural water-soluble vitamins include vitamin B1, B2, B6, B12, niacin, pantothenic acid, biotin, folic acid, lipoic acid, inositol, vitamin C and the like. Examples of natural oil-soluble vitamins include vitamin A, vitamin D, vitamin E, vitamin K and the like.

Examples of the vitamin preparations commonly used as synthetic vitamins include vitamin A preparations such as retinol, vitamin D preparations such as ergocalciferol and dihydrotachysterol; vitamin B1 preparations such as thiamine hydrochloride and thiamine nitrate; vitamin B1 derivative preparations such as octothiamine, dicethiamine hydrochloride, thiamine disulfide, bisbentiamine, fursultiamine and benfotiamine; vitamin B2 preparations such as flavin adenine dinucleotide, riboflavin butyrate, riboflavin and riboflavin sodium phosphate; vitamin B6 preparations such as pyridoxine hydrochloride, pyridoxine phosphate and pyridoxal phosphate; vitamin B12 preparations such as cobamamide, cyanocobalamin, hydroxocobalamin acetate, mecobalamin; vitamin E preparations such as tocopherol calcium succinate and tocopherol acetate; vitamin K preparations such as phyionadione, and menatetrenone.

Among them, preferable are vitamin C, vitamin B group and like water-soluble vitamins, thiamine hydrochloride, thiamine nitrate and like vitamin B1 preparations.

The oral composition of the present invention contains one or more vitamins.

It is necessary to prepare the oral composition with masked unpleasant smell and unpleasant taste derived from vitamins according to the present invention that the oral composition contains sucralose eventually. The timing and order of adding sucralose are not critical. The method for adding sucralose is not critical either, and sucralose may be used in the form of a solid such as a powder, granules and the like, or in the form of a solution.

The amount of sucralose to be added to the oral composition is not particularly limited insofar as it is effective in masking the characteristic unpleasant smell and unpleasant taste derived from vitamins. The amount may be suitably selected depending on the kinds and forms of the subject oral compositions (drugs, quasi-drugs and foods) and the kinds and amounts of vitamins contained therein. Although not restricted, the amount of sucralose may be suitably selected from, for example, 0.00001 to 0.5% by weight, preferably 0.0001 to 0.5% by weight, based on 100% by weight of the oral composition, considering the balance of the flavor and taste of the oral composition itself. The sweetness of sucralose itself becomes prominent in a concentration of about 0.0006% by weight or higher. Accordingly, sucralose may be used below the above concentration when a low sweetness is desired. Such amount can be optionally adjusted by a person of skill in the art within the ordinary skill level in the art.

According to the present invention, unpleasant smell or unpleasant smell or taste derived from vitamins can be significantly masked by adding sucralose, whereby the smell or unpleasant taste of the vitamins is mitigated even when a large amount of vitamins is contained. Therefore, an oral composition having the flavor and taste of the food itself and a drug or a quasi-drug having good swallowing feeling can be prepared.

Thus, from a different point of view, the present invention provides a masking agent for an unpleasant smell or unpleasant taste derived from vitamins using sucralose as an active ingredient, and a method for masking the unpleasant taste and unpleasant taste derived from vitamins by adding sucralose to an oral composition containing vitamin (subject) for which the unpleasant smell and unpleasant taste characteristic of vitamins are disadvantageous (or can be disadvantageous).

The masking agent of the present invention should contain at least sucralose, and may also contain, for example, other sweeteners, flavors, preservatives, stabilizers and other components, unless they lessen the effects of the present invention.

The masking agent of the present invention may be in the form of a solid such as a powder, granules and the like, or in the form of a solution. The masking agent in any of these forms is added to the above oral composition at any step of their preparation. The addition of such masking agent can significantly mitigate and mask the unpleasant smell or unpleasant taste derived from vitamins of the oral composition containing vitamins.

The timing of the addition of the masking agent to the oral composition is not particularly limited. The amount of the masking agent to be added to the oral composition can be suitably selected based on the above-mentioned amount of sucralose to be added to the oral composition.

(1-8) Processed Aquatic Products

The annual consumption of fish and shellfish in Japan is about 1.7 times the consumption of red meat, indicating that fish and shellfish are important sources of animal proteins. Recently, eicosapentaenoic acid (EPA), docosahexaenoic acid (DHA) and like highly unsaturated fatty acids found in fish in large amounts have come to be known to lower the level of blood cholesterol, prevent thrombotic diseases and play an important role in cerebrum and retina functions. As these facts becomes known, fish and shellfish have been reevaluated as foods. However, fish and shellfish have a characteristic raw smell which is one of the reasons for the decreased fish consumption by younger generation. The smell also limits the variety and applications of the foods using fish and shellfish. Therefore, may attempt have been made to mask the raw smell of fish and shellfish.

The present invention provides a processed aquatic product with a reduced and mitigated unpleasant smell (raw smell) characteristic of fish and shellfish.

In the present invention, the processed aquatic product is produced from raw materials of fish and shellfish caught in seas, rivers, lakes and the like by any processing treatment.

Such processed aquatic product includes all kinds of products regardless of the kinds of fish and shellfish and types of processed products. The processed aquatic products are classified into frozen products (frozen foods), dried products, salt cured products, processed foods with seasonings (boiled and aged foods with seasoning, seasoned and dried products), fish cakes, canned or bottled products, marinated seafoods (kasu-zuke (foods marinated in sake lees), miso-zuke (foods marinated in miso), su-zuke (foods marinated in vinegar), etc.), fermented aquatic products (fermented sushi, izushi, salted fish sauce), extract products and like general foods; feeds and fertilizers (fishmeal, fish solubles, fish flakes, etc.), aquatic animal fats, aquatic animal leathers, craftworks made of aquatic products, fats and oils used for cosmetic or medical purpose (squalene, etc.) and like industrial products. The present invention is preferably directed to the processed aquatic products used in the fields of foods, cosmetics and medicine.

More preferably, the present invention is directed to processed aquatic foods. Examples of the processed aquatic foods include, but are not limited to, kamaboko, chikuwa, fish ham and fish sausage and like surimi-based products, shioboshi (salted and dried food), niboshi (boiled and dried food) and like dried products, salted mackerel, salted salmon and like various salted fish and shiokara and like salt cured products, shigure-ni or ame-ni as of small fish, squid, clams and like preserved foods boiled in soy sauce, smoked foods, marinated seafood, delicacies (e.g., konowata, uruka, shuto, etc.), canned or bottled aquatic products boiled in water, seasoned, marinated in oil, marinated in miso or boiled in soy sauce, seafood-based seasonings such as shottsuru, ishiru and nam pla and like salted and fermented seafood.

It is necessary to prepare the food with a masked raw smell of fish and shellfish according to the present invention that the food contains sucralose eventually. The timing and order of adding sucralose are not critical. The method for adding sucralose is not critical either, and sucralose may be used in the form of a solid such as a powder, granules and the like, or in the form of a solution.

The amount of sucralose to be added to the processed aquatic food is not particularly limited insofar as it is effective in masking the raw smell characteristic of fish and shellfish, and may be suitably selected depending on the kinds of the applied foods and other conditions. Although not restricted, the amount of sucralose may be suitably selected from the following ranges. For example, a food may contain 0.0001 to 0.5% by weight, preferably 0.0001–0.1% by weight of sucralose. The sweetness of sucralose itself becomes prominent in a concentration of about 0.0006% by weight or higher. Accordingly, when it is used also as a sweetener to impart sweetness, sucralose may be used in the above concentration or higher, while it may be used below the above concentration when a low sweetness is desired. Such amount can be optionally adjusted by a person of skill in the art within the ordinary skill level in the art.

According to the present invention, the raw smell characteristic of fish and shellfish can be significantly masked by adding sucralose, whereby a food which does not give unpleasantness to consumer can be prepared without losing the tastiness of the processed aquatic product.

Thus, from a different point of view, the present invention provides a masking agent for a raw smell of fish and shellfish using sucralose as an active ingredient, and a method for masking the raw smell of fish and shellfish by adding sucralose to a processed aquatic food (subject) for which the raw smell of fish and shellfish is disadvantageous (or can be disadvantageous).

The masking agent of the present invention should contain at least sucralose, and may also contain, for example, other sweeteners, flavors, preservatives, stabilizers and other components, unless they lessen the effects of the present invention.

The masking agent for the raw smell of the present invention may be in the form of a solid such as a powder and granules, or in the form of a solution. The masking agent in any of these forms is added to the above processed aquatic products (including foods, drugs, cosmetics and like industrial products) at any step of their preparation. The masking agent can significantly mask the raw smell emitted by the components of the fish and shellfish which are contained the foods, whereby the food which can be accepted by more consumers can be prepared or obtained. This can also contribute to enlarge the range of the application and use of fish and shellfish.

The timing of the addition of the masking agent to the processed aquatic food is not particularly limited. The amount of the masking agent to be added to the processed aquatic food can be suitably selected based on the above-mentioned amount of sucralose to be added to the processed aquatic food of the present invention.

(1-9) Processed Flour Product

Grains include rice, soybeans, corns and the like, which undergo heat processing to be served as granular foods, and wheat flour, which is finely ground and processed into foods such as breads, noodles, etc. The former grains can be also ground and processed into various foods. However, such foods prepared from flours (referred to as a processed flour food in the present invention) sometime have floury odors which spoil the tastiness of the foods. Therefore, various attempts have been made to mask the floury odors.

The present invention provides a processed flour food with reduced and mitigated unpleasant smell (floury odor) characteristic of the flours of grains and like.

The processed flour food to which the present invention is directed may be floury foods or processed foods using the floury foods as raw materials. The foods may be made of any kind of flours. Examples of the materials of the flours include, but are not limited to, wheat, rye, barley and the like, buckwheat, corn, soybean and like beans, rice and the like, among other grains.

Specific examples include the floury foods prepared by grinding the grains and processed foods prepared using these floury foods, such as wheat flour and foods prepared from wheat flour such as okonomi-yaki (pan cake with vegetables, meat or seafood), tako-yaki (spherical fried batter containing a diced pieces of octopus), cakes, cookies, breads, nan and like baked and steamed products, udon, Chinese noodle, pastas and like noodle products; buckwheat flour, soba (buckwheat noodle) and confections prepared from buckwheat flour and like buckwheat products; corn flour, cornstarch and cornflakes prepared using corn flour as a raw material and like baked or steamed products; kinako prepared using soybean as a raw material, powdered soybean milk and breads prepared from the powdered soybean milk, confections and beverages; rye flour, breads prepared using rye flour as a raw material and like baked or steamed products; rice flours (joshinko (rice flour), shiratamako (non-glutinous white rice flour), kanbaiko (ground toasted rice cake), etc.) Japanese sweets prepared using these flours as raw materials and like baked or steamed products. Moreover, also included are powdered beverages and like beverages; powdered miso soups, powdered soups and like soups; powdered butter, powdered shortening and like fats and oils;

powdered miso, powdered soy sauce, powdered mustard, powdered wasabi (Japanese horse radish) and like seasonings.

It is necessary to prepare the food with a masked floury smell according to the present invention that the food contains sucralose eventually. The timing and order of adding sucralose are not critical. The method for adding sucralose is not critical either, and sucralose may be used in the form of a solid such as a powder, granules and the like, or in the form of a solution.

The amount of sucralose to be added to the processed flour food is not particularly limited insofar as it is effective in masking the unpleasant smell (floury smell) characteristic of flours, and may be suitably selected depending on the kinds of the applied foods and other raw materials. Although not restricted, the amount of sucralose may be suitably selected from the following ranges. For example, a processed flour food may contain 0.00001 to 0.5% by weight, preferably 0.0001–0.1% by weight of sucralose. The sweetness of sucralose itself becomes prominent in a concentration of about 0.0006% by weight or higher. Accordingly, when it is used also as a sweetener to impart sweetness, sucralose may be used in the above concentration or higher, while it may be used below the above concentration when a low sweetness is desired. Such amount can be optionally adjusted by a person of skill in the art within the ordinary skill level in the art.

According to the present invention, the floury odor characteristic of the foods prepared using floury foods as raw materials can be significantly masked by adding sucralose, whereby a food which does not give unpleasantness of the floury odor to consumers can be prepared without losing the tastiness of the foods.

Thus, from a different point of view, the present invention provides a masking agent for a floury smell using sucralose as an active ingredient, and a method for masking the floury smell by adding sucralose to a processed flour food (subject) for which the floury smell is disadvantageous (or can be disadvantageous).

The masking agent of the present invention should contain at least sucralose, and may also contain, for example, other sweeteners, flavors, preservatives, stabilizers and other components, unless they lessen the effects of the present invention.

The masking agent for the floury smell of the present invention may be in the form of a solid such as a powder, granules and the like, or in the form of a solution. The masking agent in any of these forms is added to the above foods at any step of their preparation. The addition of such masking agent can significantly mask the floury smell caused by their preparation and storage, thereby enlarging the range and the variety of the foods to which the flours can be applied.

The timing of the addition of the masking agent to the processed flour food is not particularly limited. The amount of the masking agent to be added to the food can be suitably selected based on the above-mentioned amount of sucralose to be added to the processed food of the present invention.

(1-10) Meat Food

Recently, an animal odor and meat odor characteristic of meats or their processed products are tend to be avoided and those with relatively little odor are preferred. Therefore, various attempts have been carried out to mask the meat odor.

The present invention provides a meat food with mitigated and alleviated unpleasant smell (meat odor) characteristic of meats.

The foods which are the subject of the present invention widely include the foods having the smell characteristic of the meats of poultry, wild birds and mammals, for example, meats of poultry, wild birds and mammals and the processed meat products using these as raw materials. Examples of the meats of poultry, wild birds and mammals include beef, pork, chicken, mutton, lamb, the meats of goat, horse, rabbit, duck, turkey, mallard, dove, pigeon and the like. Examples of the processed meat products include the foods which are prepared by processing these meats of poultry, wild birds and mammals, such as beacons, hams, pressed hams, sausages, mixed and pressed ham, mixed sausage, chilled Hamburg steaks, chilled meatballs, canned products and bottled products containing meats as main ingredients, frozen products containing meats as main ingredients, retort-pouch foods containing meats as main ingredients, Hamburg steaks, yakibuta (roasted and steamed pork), tonkatsu (pork cutlet), gyoza (fried or boiled dumpling), shao-mai (steamed meat dumpling) and like food preparations containing meats of poultry, wild birds and mammals.

It is necessary to prepare the food with a masked meat smell according to the present invention that the food contains sucralose eventually. The timing and order of adding sucralose are not critical. The method for adding sucralose is not critical either, and sucralose may be used in the form of a solid such as a powder, granules and the like, or in the form of a solution.

The amount of sucralose to be added to the meat food is not particularly limited insofar as it is effective in masking the unpleasant smell (meat smell) characteristic of meats, and may be suitably selected depending on the kinds of the subject meat foods, the kinds of the meats (animal species) and the like. Although not restricted, the amount of sucralose may be suitably selected from the following ranges. For example, a meat food may contain 0.00001 to 0.1% by weight, preferably 0.0001 to 0.1% by weight of sucralose. The sweetness of sucralose itself becomes prominent in a concentration of about 0.0006% by weight or higher. Accordingly, it may be used below the above concentration when a low sweetness is desired. Such amount can be optionally adjusted considering the overall taste balance of the produced product.

According to the present invention, the flavor and smell characteristic of the meats of various poultry, wild birds and mammals can be significantly reduced and mitigated by adding sucralose, and a food with masked smell can be prepared.

Thus, from a different point of view, the present invention provides a masking agent for a meat smell using sucralose as an active ingredient, and a method for masking the meat smell by adding sucralose to a meat food (subject) for which the meat smell is disadvantageous (or can be disadvantageous).

The masking agent of the present invention should contain at least sucralose, and may also contain, for example, other sweeteners, flavors, preservatives, stabilizers and other components, unless they lessen the effects of the present invention.

The masking agent of the present invention may be in the form of a solid such as a powder, granules and the like, or in the form of a solution. The masking agent in any of these forms is added to the above foods as a cooking flavor and an odor improver (meat smell masking agent) during the preparation of the foods, or added to the above foods at any step of their preparation. The addition of such masking agent can significantly mask the smell characteristic of poultry, wild birds and mammals, and a food with a reduced meat smell can be prepared.

The timing of the addition of the masking agent to the meat food is not particularly limited. The amount of the masking agent to be added to the meat food can be suitably selected based on the above-mentioned amount of sucralose to be added.

(1-11) Retort Pouched Food

Retort pouched foods are advantageous in that (i) they can be heated faster than conventional canned and bottled products; (ii) the thin and light container is easy to transport, (iii) they have wide variety of foods, (iv) they have good qualities, (v) opening and discarding of the container is easy, among others. The demand of the retort pouched foods by the consumers has been increasing year by year. The annual production of the foods has been increasing according to the demand, and currently over 200,000 tons of the retort pouched foods are produced per year. However, some of the materials of the container (pouch) or retort sterilizing of these retort pouched foods produce a retort pouch odor which may spoil the tastiness of the foods and give unpleasantness to consumers. Therefore, many attempts have been made to develop an odorless pouch and to mask the retort pouch odor of these retort pouched foods.

The present invention provides a retort pouched food with mitigated and alleviated unpleasant smell (retort pouch odor) characteristic of the retort pouched food.

The present invention is directed to any food referred to as retort food or retort-pouch food, regardless of their kinds. The retort pouched food include the foods prepared by placing a food in a bag or molded container produced using a light-intercepting plastic film with an aluminium foil laminated thereon or a transparent plastic film with low oxygen permeability and the like, heat-sealing the bag or container and retort-sterilizing the food and can be distributed as room-temperature products (the foods which are pressure- and heat-sterilized in containers).

Examples of the major retort pouched foods include curry, curry with rice, hayashi (hashed beef stew) and hayashi with rice, stew, gyudon (beef and onion stew on a bowl of rice), seasoning mix for donburi (rise-based dishes served in a bowl) such as chuka-don (pork and vegetable stew on a bowl of rice), oyako-don (fried chicken and egg on a bowl of rice) and like donburi and these donburi with rice, oden (fish cake stew), stewed food, shao-mai, meat sauce, consomme, potage, soups and like ready-made meals; meat sauce, white sauce and like sauce mix, mix for ma po tofu (tofu stewed in meat sauce), mix for kamameshi (Japanese pilaf cooked in a small pot) and like seasoning materials; Hamburg steaks, meatballs and like processed meat products; fish cooked in soy sauce and like aquatic foods; plain steamed rice, sekihan (rice boiled with red beans), gomoku-meshi (Japanese pilaf), fried rice, pilaf, porridge and like rice-based dishes.

It is necessary to prepare the food with a masked retort pouch odor according to the present invention that at least the final product contains sucralose. The timing and order of adding sucralose are not critical. Preferably, sucralose is added to the food before it is placed in a container and retort-sterilized, in the same manner as seasonings. The method for adding sucralose is not critical either, and sucralose may be used in the form of a solid such as a powder, granules and the like, or in the form of a solution.

The amount of sucralose to be added to the retort pouched food is not particularly limited insofar as it is effective in masking the unpleasant smell (retort pouch odor) characteristic of retort pouch foods, and may be suitably selected depending on the kinds of the applied foods, the kinds of the used pouches and other conditions. Although not restricted, the amount of sucralose may be suitably selected from the following ranges. For example, a food may contain 0.0001 to 0.1% by weight of sucralose. The sweetness of sucralose itself becomes prominent in a concentration of about 0.0006% by weight or higher. Accordingly, when it is used also as a sweetener to impart sweetness, sucralose may be used in the above concentration or higher, while it may be used below the above concentration when a low sweetness is desired. Such amount can be optionally adjusted by a person of skill in the art within the ordinary skill level in the art.

According to the present invention, the retort pouch odor characteristic of retort pouched foods can be significantly masked by adding sucralose, whereby a food which does not give unpleasantness to consumers can be prepared without losing the tastiness of the retort pouched foods.

Thus, from a different point of view, the present invention provides a masking agent for a retort pouch odor using sucralose as an active ingredient, and a method for masking the retort pouch odor by adding sucralose to a retort pouch food (subject) for which the retort pouch odor is disadvantageous (or can be disadvantageous).

The masking agent of the present invention should contain at least sucralose, and may also contain, for example, other sweeteners, flavors, preservatives, stabilizers and other components, unless they lessen the effects of the present invention.

The masking agent for the retort pouch odor of the present invention may be in the form of a solid such as a powder, granules and the like, or in the form of a solution. The masking agent in any of these forms is added to the above retort pouched foods at any step of their preparation. The addition of such masking agent can significantly mask the retort pouch odor caused by their preparation and storage, thereby enlarging the application range and the variety of the retort pouched foods. In addition, this enables the preparation of the retort pouched foods which are accepted by more consumers as convenience foods.

The timing of the addition of the masking agent to the retort pouched food is not particularly limited. The amount of the masking agent to be added to the food can be suitably selected based on the above-mentioned amount of sucralose to be added to the retort pouched food of the present invention.

(1-12) Canned Product, Canned Food

Currently, canned products of almost every kind of food are sold, such as mizu-ni (food boiled in water), foods boiled in salt water, foods steeped in oil, seasoned foods, foods steeped in tomato sauce, cooked foods, canned soups, canned sauces, canned rice-based dishes, canned smoked fish, among many other kinds of foods. Further, many kinds of beverages are available as canned beverages contained in the cans made of tin plates, aluminum, TFS and like. However, these canned products and canned foods are sometimes given a metallic odor and can odor when they are stored for a long period or at relatively high temperatures. These odors spoil the tastiness of the canned products and canned foods and give unpleasantness to consumers. Therefore, various attempts have been made to mask the can odor of these canned products and canned foods.

The present invention provides a canned product or canned food with mitigated and alleviated unpleasant smell (can odor) characteristic of the canned products and canned foods.

The present invention is directed to any canned products and canned foods of any kind (farm products, dairy product, aquatic products, beverages) in the cans made of any materials such as such as tin plate, aluminum, TFS and the like.

Examples of the canned products and canned foods include various foods such as canned fruit products and like foods in syrups, canned tuna, canned sardine and like oil marinated foods, vegetable mizu-ni and like water-boiled foods, foods in tomato sauce, jam and like canned products, foods boiled in salt water, canned ready-made foods, plane steamed rice, sekihan and like canned rice products and like, fruit beverages, coffee beverages, black tea beverages, tea-based beverages, soft drinks, milk beverages, lactic acid bacteria beverages, nutrition supplement beverages, soybean milk beverages, sport beverages, beer, chu-hai (cocktails based on liquors made from sweet potato or rice) and like alcoholic beverages and like various beverages.

It is necessary to prepare the food with a masked can odor according to the present invention that at least the final product contains sucralose. The timing and order of adding sucralose are not critical. Preferably, sucralose is added to the food before it is placed in a can, in the same manner as seasonings. The method for adding sucralose is not critical either, and sucralose may be used in the form of a solid such as a powder, granules and the like, or in the form of a solution.

The amount of sucralose to be added to the food is not particularly limited insofar as it is effective in masking the unpleasant smell (can odor) characteristic of canned products, and may be suitably selected depending on the kinds of the applied foods, the kinds of the materials used for the cans and other conditions. Although not restricted, the amount of sucralose may be suitably selected from the following ranges. For example, a food may contain 0.0005 to 0.1% by weight of sucralose. The sweetness of sucralose itself becomes prominent in a concentration of about 0.0006% by weight or higher. Accordingly, when it is used also as a sweetener to impart sweetness, sucralose may be used in the above concentration or higher, while it may be used below the above concentration when a low sweetness is desired. Such amount can be optionally adjusted by a person of skill in the art within the ordinary skill level in the art.

According to the present invention, the can odor characteristic of canned products can be significantly masked by adding sucralose, whereby a food which does not give unpleasantness to consumers can be prepared without losing the tastiness of the canned products and canned foods.

Thus, from a different point of view, the present invention provides a masking agent for a can smell using sucralose as an active ingredient, and a method for masking the can smell by adding sucralose to a canned product or a canned food for which the can smell is disadvantageous (or can be disadvantageous).

The masking agent of the present invention should contain at least sucralose, and may also contain, for example, other sweeteners, flavors, preservatives, stabilizers and other components, unless they lessen the effects of the present invention.

The masking agent for a can smell of the present invention may be in the form of a solid such as a powder, granules and the like, or in the form of a solution. The masking agent in any of these forms is added to the above canned products and canned foods at any step of their preparation. The addition of such masking agent can significantly mask the metallic can smell caused by their preparation and storage, thereby providing the canned product or canned food which are accepted and preferred by more consumers as a convenience food.

The timing of the addition of the masking agent to the food is not particularly limited. The amount of the masking agent to be added to the food can be suitably selected based on the above-mentioned amount of sucralose to be added to the food of the present invention.

(2) Food with Masked Unpleasant Taste, Use of Sucralose as Masking Agent for Unpleasant Taste According to the present invention, using sucralose in combination with various galenical, amino acid or peptide, collagen, vitamin and like foodstuffs can mitigate or mask the unpleasant taste (bitter taste, astringent taste, etc.) which are felt when taking these foodstuffs without impairing the inherent functions of these foodstuffs. The present invention provides a food with reduced and masked unpleasant taste derived from the above foodstuff, and a novel use of sucralose as a masking agent for various unpleasant tastes. The description of the masking agent for the smell of collagen and vitamin and the method for masking the smell of collagen and vitamins are as mentioned in the above.

(2-1) Galenical-Containing Composition

Chinese medicine formulations have been used since ancient times. Although Western medicine has now become mainstream, Chinese medicine formulations tend to be preferred for older people, children, pregnant women and like people because of the possible side effects of chemical preparations. However, many of the galenical which are the components of Chinese medicine formulations have harsh tastes including a bitter taste. Therefore, the Chinese medicine formulations containing various galenicals have characteristic mixed unpleasant tastes such as bitter taste, astringent taste, raw smell, sour taste and the like produced by the galenicals. These unpleasant tastes lead to considerably unpleasant swallowing feeling which induces poor compliance and failure in producing the desired therapeutic effects even the formulations have excellent pharmaceutical effects. Usually in case of oral preparations, sucrose and like sweeteners or taste developers are added to the formulation, or they are prepared as capsules or sugar-coated tablets to mask the unpleasant smell of the medicines. However, the former method requires a large amount of sucrose to reduce the bitterness and involves the disadvantages of unpleasant aftertaste and excessive intake of sugar. Further, the latter method is not suitable for aged people and children with poor swallowing ability.

The present invention provides a galenical-containing composition with mitigated and alleviated unpleasant smell characteristic of Chinese medical formulations (hereinafter referred to as galenicals).

The present invention is directed to the galenicals including *mallotus* bark, gambir aloe, benzoin, *artemisia capillaris* flower, fennel, bearberry leaf, rose fruit, *corydalis* tuber, *sctellaria* root, *phellodendron* bark, *coptis* rhizome, *polygala* root, zedoary, Japanese valerian, *trichosanthes* root, *platycodon* root, *catalpa* fruit, immature orange, apricot kernel, *sophora* root, cinnamon bark, *cassia* seed, *pharbitis* seed, gentian, *geranium* herb, safflower, red ginseng, *cyperus* rhizome, *magnolia* bark, oriental bezoar, *evodia* fruit, *schisandra* fruit, calumba, condurango, *bupleurum* root, *asiasarum* root, saffron, *gardenia* fruit, *cornus* fruit, *zanthoxylum* fruit, *rehmannia* root, *digitalis*, peony root, *plantago* seed, *amomum* seed, ginger, cardamon, *cimicifuga* rhizome, senega, *cnidium* rhizome, *nuphar* rhizome, toad venom, *senna* leaf, *swertia* herb, *atractylodes lancea* rhizome, mulberry bark, *perilla* herb, rhubarb, *alisma* rhizome, *panax* rhizome, *anemarrhena* rhizome, clove, *citrus unshiu* peel, *capsicum*, Japanese *angelica* root, peach kernel, bitter orange peel, ipecac, *picrasma* wood, *pinellia* tuber, *angelica dahurica* root, *atractylodes* rhizome, *areca*, belladonna root, *sinomenium* stem, moutan bark, nux vomica, *ephedra* herb, digenea, *akebia* stem, *saussurea* root, bitter cardamon, bear bile, Japanese Gentian, *ipecacscopolia* rhizome, Turmeric, smoked plum, *Lindera strychnifolia*, isodonis herba, *Polygonatum falcatum*, Pruni cortex, mugwort (japanese), Chinese wax-gourd seed, *Polygonum multiflorum*, patchouli leaf, German chamomile, Trichosanthis Semen, *Chrysanthemum morifolium, Citrus aurantium, notopterygium*, Japanese *notopterygium*, jin yin, Chinese matrimony vine seed, Chinese matrimony vine leaf, *Scrophularia ningpoensis*, Ligustici Chinensis, burdock seed, hawthorn, *cornus* fruit, *Sophora subprostrata, rehmannia* root powder, *Aster tataricus* Linne fil., *Tribulus terrestris, magnolia* flower, TurmericAcorus gramineus, Qian Hu (*Peucedanum* Root), *Arisaema serratum*, Asparagus root, pubescent *angelica*, Heavenly-bamboo fruit, nutmeg, ginseng powder, Japanese honeysuckle, *Fritillaria thunbergii* mig., *Carica papaya* L., motherwort, smoked plumbayberry bark, and the like.

The galenical-containing composition of the present invention may contain one of the above galenicals singly, or two or more in any combinations. The composition may also contain, for example, other galenicals which do not have bitter tastes or like unpleasant tastes as other components.

Examples of the combinations of the galenicals are those recognized as common Chinese medicine formulations, and include, but are not limited to, Ge Gen Tang, Chai Hu Gui Zhi Tang, Xiang Zheng Qi San, Xiang Sheng Po Di Wan, Xiang Su San, Xiao Chai Hu Tang, among others.

These formulations may be in any form such as powders, granules, extracts, liquids, syrups and the like.

The amount of the galenicals contained in these galenical-containing compositions is not limited, and may be that normally added as drugs (Chinese medicine).

It is necessary to prepare the galenical-containing composition with masked unpleasant taste according to the present invention that the composition contains sucralose eventually. The timing and order of adding sucralose are not critical. The method for adding sucralose is not critical either, and sucralose may be used in the form of a solid such as a powder, granules and the like, or in the form of a solution and suspension.

The amount of sucralose to be added to the galenical-containing composition is not particularly limited insofar as it is effective in masking the unpleasant taste (bitterness, etc.) derived from various galenicals. The amount may be suitably selected depending on the kind and amount of the galenicals contained in the composition and forms of the subject compositions. Although not restricted, the amount of sucralose may be suitably selected from, for example, 0.001 to 0.01% by weight, preferably 0.0025 to 0.005% by weight, based on the galenical-containing composition, considering the balance of the flavor and taste of the oral composition itself. The sweetness of sucralose itself becomes prominent in a concentration of about 0.0006% by weight or higher. Accordingly, sucralose may be used below the above concentration when a low sweetness is desired. Such amount can be optionally adjusted by a person of skill in the art within the ordinary skill level in the art.

According to the present invention, the unpleasant taste derived from galenicals can be significantly masked by adding sucralose, and a drug with an improved flavor, taste and swallowing feeling can be prepared.

From a different point of view, the present invention provides a masking agent for the unpleasant taste derived from galenicals using sucralose as an active component and a method for masking the unpleasant taste of galenicals by adding sucralose to a galenical-containing composition (subject) for which the unpleasant taste derived from galenicals is disadvantageous (or can be disadvantageous).

The masking agent of the present invention should contain at least sucralose, and may also contain, for example, other sweeteners, flavors, preservatives, stabilizers and other components, unless they lessen the effects of the present invention.

The masking agent of the present invention may be in the form of a solid such as a powder, granules and the like, or in the form of a solution. The masking agent in any of these forms is added to the above oral composition at any step of their preparation. The addition of such masking agent can significantly mitigate and mask the smell of the unpleasant taste derived from various galenicals of the galenical-containing composition.

The timing of the addition of the masking agent to the galenical-containing composition is not particularly limited. The amount of the masking agent to be added to the composition can be suitably selected based on the above-mentioned amount of sucralose to be added to the composition.

(2-2) Oral Composition Containing Amino Acid/Peptide

Conventionally, to supply amino acids which are necessary for the foods of humans and animals, various amino acids and peptides have been used and studied as enrichments. However, some amino acids and peptides have bitter tastes which disadvantageously limit the kind and amount of the amino acids and peptides to be used in spite of their effectiveness in improving health and their other advantages when added to foods, drugs, quasi-drugs and the like. Therefore, various attempts have been conducted to reduce the bitter taste characteristic of the amino acids and peptides so that they can be used in wider variety.

The present invention provides an oral composition containing amino acids and peptides with mitigated and alleviated unpleasant taste characteristic of the amino acids and peptides.

The present invention is directed to the oral composition which contains amino acids or peptides, can be orally taken or used in the oral cavity and have a bitter taste, and may be any kind of foods, foods for specified health use and drugs and quasi-drugs. Examples of the oral composition include not only those which can be taken orally such as foods, oral drugs and quasi-drugs, but also ointments and like drugs for the oral cavity and those which are possibly taken orally such as lip balms and like quasi-drugs.

The kind of the amino acids and peptides are not particularly limited insofar as they themselves have bitter tastes. It is known that the bitter taste of an amino acid increases when the molecular weight of the amino acid increases. For example, valine has sweet and bitter taste (weak taste), while leucine, methionine, hystidine, phenylalanine and tryptophan have bitter tastes (slight taste) and isoleucine has a relatively strong bitter taste.

The bitter taste of the peptides can be derived from their constituents, amino acids, and the oligopeptide having one or more of the above valine, leucine, methionine, hystidine, phenylalanine, tryptophan or leucineisoleucine tends to have a bitter taste.

Examples of the bitter-tasting peptides include soybean peptide, wheat peptide, casein-derived peptide, milk serum peptide, egg white peptide, plasma peptide and the like.

Herein, the soybean peptide is not particularly limited insofar as it is a peptide derived from soybean protein, including the polypeptide which is typically prepared by decomposing the soybean protein with protease (such as pepsin), a dilute hydrochloric acid or like acids and having a molecular weight of about 300 to 20000. Such soybean peptide is useful as a foodstuff because of its physical properties and effective in lowering serum cholesterol. However, the soybean peptide has a characteristic odor called a soybean odor.

The casein-derived peptide in the present invention is not particularly limited insofar as it is a peptide derived from casein which is a main constituent of milk protein. Examples of the casein-derived peptide include casein phosphopeptide (α-CPP, ?-CPP) which is prepared by decomposing casein with trypsin, casein macropeptide which is prepared by decomposing casein with chymosin, casein decapeptide which is prepared by decomposing casein with pepsin, lacto tripeptide which is prepared by decomposing milk serum protein and the like. Among them, casein phosphopeptide (CPP) has an advantageous function of helping the absorption of calcium and like by preliminary bonding with dissolved calcium to prevent bonding of calcium and dietary fibers and the like which prevents, absorption of calcium by intestine. However, the CPP has the characteristic smell called milky smell.

An object of the present invention is to mask the bitter taste of such amino acids and peptides. The oral composition of the present invention may be of any kind and for any application insofar as they contain such amino acids or peptides.

Examples of the oral composition include, but are not limited to, the foods such as fruit beverages, tea-based beverages, coffee beverages, soft drinks, powdered beverages, milk beverages, lactic acid bacteria beverages, carbonated beverages, nutrition supplement beverages, beverages enriched with minerals such as calcium; general refreshment foods such as candies, chewing gums, tablet snacks, gummy candies, dry snacks and like confections, jellies, annin dofu, mousse, yogurt and like dessert foods, cakes, cookies, manju and like Western and Japanese sweets, ice creams, sherbets and like cold sweets; rice cakes, ready-to-eat rice and like rice-based dishes; udon, ramen, pasta and like noodles; instant soups, potage and like soups and their powdered instant foods; ketchup, mayonnaise, Worcestershire sauce, tonkatsu sauce, dressings, tartar sauce and like sauces and seasonings; kamaboko, chikuwa, ham, sausage and like processed meat and aquatic products and the like. The foods which are the subject of the present invention include the foods for specified health use.

Examples of the oral composition of the invention also include vitamin preparations, nutritional supplements and like drugs, oral refreshments, dentifrices, lip balms and like quasi-drugs.

It is necessary to prepare the oral composition with a masked unpleasant taste according to the present invention that at least the final product contains sucralose. The timing and order of adding sucralose are not critical. The method for adding sucralose is not critical either, and sucralose may be used in the form of a solid such as a powder, granules and the like, or in the form of a solution.

The amount of sucralose to be added to the oral composition is not particularly limited insofar as it is effective in masking the unpleasant taste (bitter taste, etc.) derived from amino acid or peptides, and may be suitably selected depending on the kind and amount of the amino acids and peptide contained in the applied composition, the form of the composition and other conditions. Although not restricted, the amount of sucralose may be suitably selected from the following ranges. For example, sucralose may be used in a concentration of 0.0001 to 0.5% by weight, preferably 0.0001–0.1% by weight, based on 100% by weight of a oral composition. The sweetness of sucralose itself becomes prominent in a concentration of about 0.0006% by weight or higher. Accordingly, when it is used also as a sweetener to impart sweetness, sucralose may be used in the above concentration or higher, while it may be used below the above concentration when a low sweetness is desired. Such amount can be optionally adjusted by a person of skill in the art within the ordinary skill level in the art.

According to the present invention, the unpleasant taste derived from the amino acids or peptides can be significantly masked by adding sucralose, and a product which can be easily taken and swallowed can be prepared without spoiling the tastiness of the food.

Thus, from a different point of view, the present invention provides a masking agent for the unpleasant taste derived from amino acids or peptides by using sucralose as an active ingredient, and a method for masking the unpleasant taste derived from the amino acids or peptides by adding sucralose to an oral composition containing amino acids or peptides for which the unpleasant taste derived from the amino acids or peptides is disadvantageous (or can be disadvantageous).

The masking agent of the present invention should contain at least sucralose, and may also contain, for example, other sweeteners, flavors, preservatives, stabilizers and other components, unless they lessen the effects of the present invention.

The masking agent for the unpleasant taste of the amino acids of the present invention may be in the form of a solid such as a powder, granules and the like, or in the form of a solution and suspension. The masking agent in any of these forms is added to the above oral composition at any step of their preparation. Such masking agent may be added to any products (oral compositions) which contain the amino acids or peptides having the unpleasant taste derived from.

The timing of the addition of the masking agent to the oral compositions is not particularly limited. The amount of the masking agent to be added to the products can be suitably selected based on the above-mentioned amount of sucralose to be added to the oral compositions of the present invention.

III. Performance Food Composition (1) Sucralose and Hydrocolloid

This aspect of the invention was accomplished based on the findings that a combination of sucralose and a specific hydrocolloid imparts, to a food composition, desired physical properties such as viscosity, gel-like texture or emulsifiability; and that the physical properties can be easily adjusted by modifying the ratio of these ingredients suitably according to the type of food composition. The invention provides the following performance food compositions comprising sucralose and at least one hydrocolloid.

(1-1). A viscous food composition comprising sucralose and at least one hydrocolloid selected from the group consisting of locust bean gum, λ-carrageenan and soybean polysaccharides.

(1-2). A gel food composition comprising sucralose and at least one hydrocolloid selected from the group consisting of agar, gellan gum, native gellan gum, gelatin, κ-carrageenan, ι-carrageenan, pectin, tamarind seed polysaccharides, alginic acid, alginic acid salts, tara gum, furcellaran and curdlan, in particular at least one hydrocolloid selected from the group consisting of agar, gellan gum, native gellan gum and κ-carrageenan.

(1-3). An emulsified food composition comprising sucralose and at least one hydrocolloid selected from the group consisting of gum arabic and xanthan gum.

(1-1). Viscous Food Composition

Various hydrocolloids have been conventionally used as a thickening agent, a stabilizer, a gelling agent or the like for preparation of viscous foods. However, many hydrocolloids are liable to give heavy eating characteristics, when used in combination with sugar. Thus, it has been difficult to prepare a food having desired degree of sweetness and viscosity.

The present invention provides a variety of food compositions having a good sweetness and a viscosity desirable for the type of food. Specifically, the present invention employs sucralose in combination with guar gum, locust bean gum, λ-carrageenan or soybean polysaccharide to obtain well-balanced sweetness and viscosity, so that a viscous food composition having both of a good sweetness and a desired viscosity can be easily prepared. These hydrocolloids may be used either singly or in combination.

The amount of sucralose to be used for achieving the effects of the invention is usually 0.0001 to 1 wt. %, preferably 0.0005 to 0.5 wt. %, based on the viscous food composition. Since the sweetness of sucralose is clearly felt when sucralose is contained in a concentration of 0.0006 wt. % or more, a concentration less than 0.0006 wt. % can be employed when a reduced sweetness is desired. Suitable adjustment of the amount is well within the ordinary skill level in the art. Further, the effects of the invention The amount of hydrocolloid to be used for achieving the effects of the invention is usually 0.01 to 10 wt. %, preferably 0.5 to 5 wt. %, based on the viscous food composition.

The composition of the invention may contain, in addition to the sucralose and hydrocolloid, another sweetener, a flavor, a preservative, a stabilizer or like ingredient, within the range that does not adversely affect the effects of the invention.

Viscous food compositions according to the invention include a variety of hydrous foods having such viscosity that the foods are collapsible by its own weight. Thus, the food composition of the invention may be a low viscosity composition such as a soft drink or a carbonated beverage, or a relatively high viscosity food such as shiruko (azuki bean soup), as long as it has such viscosity.

More specifically, examples of the viscous food composition of the invention include cocoa beverages, coffee beverages, calcium-enriched beverages, powdered green tea beverages, vegetable or fruit juice-containing beverages, soybean milk beverages, drinks, jelly beverages, shiruko drinks, milk beverages such as yogurt beverages and lactic acid bacteria beverages, and various other beverages; corn soups, potages and other soups; dressings, tare (Japanese style sauce), sauces and other liquid seasonings.

The food composition of the invention having a good viscosity can be prepared by a variety of processes for preparing foods, as long as the final product comprises sucralose and the hydrocolloid. Thus, there is no limitation on the timing, method, order and other factors of addition of sucralose and the hydrocolloid. For example, sucralose may be used in the form of a solid such as a powder or granules, or in the form of a solution. The hydrocolloid can be prepared in consideration of their properties (e.g., melting point). For example, it is used as dissolved or dispersed in water and then heated at about 70 to 95° C.

(1-2). Gel Food Composition

Various hydrocolloids have been conventionally used as a gelling agent for preparing a gel food. However, many hydrocolloids are liable to give heavy eating characteristics, when used in combination with sugar. Thus, it has been difficult to prepare a food having a desired sweetness and desired gel food eating characteristics (e.g., texture and chewing characteristics).

The present invention provides a variety of food compositions having a suitable sweetness and good eating characteristics (e.g., texture and chewing characteristics) desirable for the type of food. Specifically, the present invention utilizes sucralose in combination with a specific hydrocolloid to obtain well-balanced sweetness and eating characteristics, so that a gel food composition having both of a good sweetness and desired eating characteristics (texture, chewing characteristics, etc.) can be easily prepared.

Examples of hydrocolloids for use in the invention include agar, gellan gum, native gellan gum, gelatin, κ-carrageenan, λ-carrageenan, ι-carrageenan, locust bean gum, pectin, tamarind seed polysaccharides, alginic acid, alginic acid salts, guar gum, tara gum, furcellaran and curdlan. These hydrocolloids can be used either singly or in combination. Among them, particularly preferable are agar, gellan gum, native gellan gum and κ-carrageenan. Use of at least one of these hydrocolloids in combination with sucralose enables preparation of a gel food composition having a suitable sweetness and light eating characteristics.

Agar, gellan gum, gelatin, κ-carrageenan, λ-carrageenan, ι-carrageenan, pectin, locust bean gum, tamarind seed polysaccharides, alginic acid, alginic acid salts, guar gum, tara gum, furcellaran and curdlan are those conventionally used as a gelling agent for foods.

Native gellan gum for use in the present invention is a macromolecular polysaccharide of the microbial origin which is available as the pre-deacylation precursor of gellan gum. This native gellan gum is generally produced by culture of microorganisms. Specifically, a typical production technology comprises inoculating *Pseudomonas elodea* (ATCC31461) or an equivalent strain in a liquid medium containing 3% of glucose, 0.05% of $KH_4NO_3$, 0.01% of $MgSO_4.7H_2O$, 0.09% of $NH_4NO_3$, and a minor proportion of organic nitrogenous matter, growing the strain at about 30° C. under aerobic conditions for about 50 hours, and isolating and recovering a mucilaginous substance produced on the cell surface from the resulting culture broth without deacylation (Unexamined Japanese Patent Publication No. 79397/1980).

Since native gellan gum is of the natural origin, its structure may vary subtly according to the producer strain used and purification conditions. In this sense, the native gellan gum for use in the invention is not categorically defined by any chemical formula (Sanderson, G. R., Food Gels, ed. Peter Harris, Elsevier Science Publishers Ltd., England, 1990, p. 204) but may be any substance having the properties of the native gellan gum produced by the above-mentioned technology using said stain of microorganism (ATCC31461).

The amount of sucralose to be used for achieving the effects of the invention is usually 0.0001 to 1 wt. %, preferably 0.0005 to 0.5 wt. %, based on the viscous food composition. The sweetness of sucralose itself is clearly felt when sucralose is contained in a concentration of 0.0006 wt. % or more. Therefore, when a reduced sweetness is desired, a concentration less than 0.0006 wt. % can be employed, according to the type of targeted food and desired taste. Suitable adjustment of the amount is well within the ordinary skill level in the art. The amount of hydrocolloid to be used for achieving the effects of the invention is usually 0.01 to 10 wt. %, preferably 0.5 to 5 wt. %, based on the viscous food composition.

The composition of the invention may contain, in addition to the sucralose and hydrocolloid, another sweetener, a flavor, a preservative, a stabilizer or like ingredient, within the range that does not adversely affect the effects of the invention.

Gel food compositions according to the invention include a variety of hydrous foods having such viscosity that the foods are not collapsible by its own weight. The food composition of the invention may be a food with low gel strength, such as pudding, or a food with high gel strength, such as yokan (sweet jelled bean paste), as long as it has such viscosity.

More specifically, examples of gel food composition according to the invention include puddings, bavaroises, jellies, mousses, annin dofu (almond jelly), gummy candies, marshmallows, yokan and other Japanese or Western confections, konjac (jellylike food made from the root of a bulbous herb), tofu (bean curd), rice cakes, hams, sausages and terrines.

The present invention also encompasses, in its scope, foods containing the above gel food composition as a part.

Preferred examples of such foods include, but not limited to, foods comprising a gel portion made of a gel food composition such as pudding, bavaros, jelly or mousse, and a cream portion containing fat and oil. The cream portion may be any of a variety of creams described hereinafter ((1-3). Emulsified food composition).

Combinations of the gel portion and the cream portion are not limited, as long as the gel and cream portions can be tasted together when eaten. For example, the food may comprise cream portion(s) on the top of, in the middle of and/or under the bottom of the gel portion(s), or may comprise continuous or discontinuous layers of gel portion(s) and cream portion(s).

In the food of the invention, the cream portion may contain sucralose so that the cream has smoother eating characteristics, which, in combination with good eating characteristics (texture and chewing characteristics) of the gel portion, give the food a more palatable taste. Further, when the cream contain a milk fat, addition of sucralose will bring out the milk flavor and produces a cream having enhanced milky characteristics. The amount of sucralose to be added to the cream portion is not limited, and may be 0.00001 to 0.5 wt. %, preferably 0.0001 to 0.5 wt. %, per 100 wt. % of the cream.

The gel food composition with good eating characteristics of the invention can be prepared by a variety of processes for preparing foods, as long as the final product comprises the sucralose and hydrocolloid. Thus, there is no limitation on the timing, method, order and other factors of addition of the sucralose and hydrocolloid. For example, sucralose may be used in the form of a solid such as a powder or granules, or in the form of a solution. The hydrocolloid can be prepared in consideration of the properties (physicochemical properties). For example, the hydrocolloid is used as dissolved or dispersed in water and then heated at about 70 to 95° C.

(1-3). Emulsified Food Composition

Conventionally, emulsifiers have been widely used to ensure good emulsification in preparation of emulsified foods such as mayonnaises, dressings, margarines and whipped creams. Generally used emulsifiers are lecithin and fatty acid esters such as glycerin fatty acid esters and sucrose fatty acid esters. However, many of these emulsifiers have limitations regarding type of targeted food and amount to be used, owing to their influence on the taste of foods.

The present invention was achieved based on the findings that sucralose as such has emulsifying power, and that combined use of sucralose and a specific hydrocolloid enhances the emulsifying power and produces an emulsified food composition having smooth eating characteristics and a good taste, without influence on the taste of the food. The present invention provides an emulsified food composition having delicate and smooth eating characteristics, without impairing the taste of the food itself.

Sucralose for use in the emulsified food composition of the invention shows emulsion stabilizing effects by itself, and can be used in a wide variety of emulsified foods.

According to the invention, the emulsified foods or emulsified food compositions are foods comprising, as the whole or a part, a monolayer mixture of water and fat and/or oil. Such foods include not only dressings, mayonnaises and like foods, but also foods prepared using milk, butter and the like.

Fats and oils usable in the invention include, for example, corn oil, rapeseed oil, soybean oil, cotton seed oil, safflower oil, rice oil, palm oil, coconut oil and other vegetable oils, and fish oil, animal fats and oils and hydrogenated fats and oils, fractionated fats and oils, transesterified fats and oils prepared from the above fats and oils. These fats and oils can be used either singly or in combination.

The amount of sucralose to be used for achieving the effects of the invention is usually 0.0001 to 1 wt. %, preferably 0.0005 to 0.5 wt. %, based on the emulsified food composition. The sweetness of sucralose is clearly felt when sucralose is contained in a concentration of 0.0006 wt. % or more. Therefore, when a reduced sweetness is desired, a concentration less than 0.0006 wt. % can be employed according to the type of food and desired taste. Suitable adjustment of the amount is well within the ordinary skill level in the art.

Sucralose, even used alone, has high emulsion stabilizing effects, but it imparts higher emulsion stability and delicate, smooth eating characteristics to an emulsified composition, when used in combination with a hydrocolloid.

Hydrocolloids for use in the invention include, for example, gum arabic and xanthan gum. They can be used either singly or in combination. The amount of hydrocolloid to be used for achieving the effects of the invention is usually 0.01 to 10 wt. %, preferably 0.5 to 5 wt. %, based on the emulsified food composition.

For preparation of emulsified compositions, emulsification operation is performed. A wide variety of conventional emulsification methods can be employed. Examples of such methods include methods using emulsifying machines such as homogenizers, colloid mills, texture analyzersvacuum emulsifying machines, votators, onlator and like emulsifying machines generally used for preparation of emulsified foods.

The emulsified food composition of the invention having good eating characteristics can be prepared by a variety of processes for preparing emulsified foods, as long as the final product comprises sucralose and hydrocolloid. Thus, there is no limitation on the timing, method, order and other factors of addition of sucralose and hydrocolloid. For example, sucralose may be used in the form of a solid such as a powder or granules, or in the form of a solution. The hydrocolloid can be prepared in consideration of properties (physicochemical properties). For example, the hydrocolloid can be used as dissolved or dispersed in water and then heated at about 70 to 95° C.

The composition of the invention may contain, in addition to the sucralose and hydrocolloid, another sweetener, a flavor, a preservative, a stabilizer or like ingredient, within the range that does not adversely affect the effects of the invention.

The composition of the invention may be a food containing the above gel food composition as a part, and such an embodiment is encompassed within the scope of the invention.

Preferred examples of such foods include, but not limited to, foods comprising a cream portion made of the emulsified food composition described above, and a gel food composition described hereinbefore, such as pudding, bavarois, jelly or mousse (see (1-2). Gel food composition).

The cream portion may comprise any of a variety of creams such as: animal creams containing milk fat and prepared using raw milk, market milk, specialized milk or like milk product as a raw material; and vegetable creams containing coconut oil, palm kernel oil, cacao butter or like vegetable fat or oil. The fat or oil content is not limited, and the cream may be, for example, half-and-half cream with a milk fat content of 10 to 18 wt. %, light cream with a milk fat content of about 19 wt. %, whipping cream with a milk fat content of 30 to 40 wt. %, double cream with a milk fat content of at least 45 wt. %, or heavy cream with a milk fat content of 60 to 80 wt. %; cream containing 10 to 30 wt. % of vegetable oil, or whipping cream containing 30 to 50 wt. % of vegetable oil; etc. These creams are used as coffee whitener, whipping cream, butter cream, ice cream or the like, according to the fat or oil content.

Combinations of the gel portion and the cream portion are not limited, as long as the gel and cream portions can be tasted together when eaten. For example, the food may comprise cream portion(s) on the top of, in the middle of and/or under the bottom of gel portion(s), or may comprise continuous or discontinuous layers of gel portion(s) and cream portion(s).

(2) Sucralose and Starch

This aspect of the invention was accomplished based on the following findings: sucralose, when used in combination with any of various starches, allows the starches to show their specific functions more remarkably, making it possible to prepare a starch-containing food with good eating characteristics by using no agent for imparting properties; and even when using a property imparting agent, the necessary amount is significantly smaller than the amount required in the prior art. The present invention provides a performance food composition comprising sucralose and starch.

(2-1). Food Composition Comprising Starch and Sucralose

Starch-containing foods with unique eating characteristics have been developed utilizing various functions of starch such as thickening effect, gelling effect, water retention effect, oil encapsulation effect, etc. However, starch foods containing starch and sugar are liable to have heavy eating characteristics, and are difficult to show desired functions of starch. Conventionally, therefore, various agents for imparting properties are added to allow starch to show desired functions.

The present invention provides a starch food that shows desired good eating characteristics owing to functions of starch, using no or a slight amount of property imparting agent. The invention also provides a starch food that exhibits a good sweetness without hindering the functions of starch.

Starches for use in the invention are not limited and include, for example, potato starch, sweet potato starch, corn starch, waxy corn starch, wheat starch, rice starch, glutinous rice starch, tapioca starch, green gram starch, kuzu (arrowroot) starch, saga starch, amaranth and modified starch. Preferred are potato starch, sweet potato starch, cornstarch, waxy corn starch, wheat starch and rice starch. These starches generally have high water retentivity and are capable of being thickened or gelled by incorporation of water. Further, they have high affinity to oils and are likely to encapsulate oils.

Starch foods according to the invention include a variety of foods containing any of the above starches. Preferred is a food containing starch in an amount of usually 0.01 to 50 wt. % of the starch so as to achieve specific desired eating characteristics, such as body, richness, viscosity, softness, glutinousness, tenderness, elasticity, etc.

Specific examples of starch foods include, but not limited to, wheat starch-containing foods such as baked or steamed products including okonomi-yaki (pan cake with vegetables, meat or seafood), tako-yaki (spherical fried batter containing a diced pieces of octopus), cakes, cookies, breads and nans, and noodle products including udon (thick white wheat noodle), Chinese noodles and pastas; corn starch-containing baked or steamed products and creams; baked or steamed Japanese confections or rice confections, containing rice starch or glutinous rice starch [e.g., joshinko (rice flour), shiratamako (non-glutinous white rice flour) and kanbaiko (ground toasted rice flour)] or sweet potato starch; fish paste products containing potato starch, such as kamaboko (loaf of pureed, steamed fish).

The amount of sucralose to be used for achieving the effects of the invention varies depending on the type of food, desired eating characteristics and like factors, and can not be generalized. Usually, the starch food of the invention may contain sucralose in a concentration of 0.0001 to 1 wt. %, preferably 0.0005 to 0.1 wt. %. The sweetness of sucralose is clearly felt when sucralose is contained in a concentration of 0.0006 wt. % or more, a concentration more than 0.0006 wt. % can be employed when sucralose is intended to serve also as a sweetener, or a concentration less than 0.0006 wt. % can be employed when a reduced sweetness is desired. Suitable adjustment of the amount is well within the ordinary skill level in the art.

For preparation of the starch food of the invention, there is no limitation on the timing, order and other factors of addition of sucralose, as long as the final product comprises sucralose and starch. Also, sucralose can be added by any method without limitation, and may be added in the form of a solid such as a powder or granules, or in the form of a solution.

The starch food of the invention may contain, in addition to sucralose and starch, another sweetener, a flavor, a preservative, a stabilizer or like ingredient, within the range that does not adversely affect the effects of the invention.

According to the invention, sucralose is added to a starch food so that the food significantly retains and shows properties unique to starch foods (e.g., viscosity, body, richness, softness, glutinousness, tenderness and elasticity) which can be attained by the functions of starch, such as water retention, thickening and gelling.

IV. Food with Improved Flavor

This aspect of the invention was developed based on the finding that addition of sucralose improves or enhances flavors of materials contained in foods. The present invention provides the following flavor-improved foods:

(1). An alcoholic beverage comprising sucralose
(2). A refreshment beverage comprising sucralose
(3). A tea beverage and a tea-containing food each comprising sucralose
(4). A fruit juice- or fruit pulp-containing food comprising sucralose
(5). A milk-containing food comprising sucralose
(6). A confection comprising sucralose
(7). A processed food comprising sucralose (1). Alcoholic Beverage The present invention was accomplished based on the finding that addition of a specific amount of sucralose to an alcoholic beverage brings out the inherent flavor of the alcoholic beverage, and produces an alcoholic beverage having an excellent flavor and mellowness.

Alcoholic beverages according to the invention include a wide variety of alcoholic beverages such as refined sake, beer, wine and like fermented alcoholic beverages; shochu (Japanese distilled spirit), whisky, brandy, spirit and like distilled alcoholic beverages; and liqueur (including fruit juice-containing liqueur), mirin (sweet sake for cooking), synthesized refined sake, umeshu (ume-plum liqueur), toso (spiced sake) and like mixed alcoholic beverages. These alcoholic beverages include not only those to be drunk as such, but also alcohols to be diluted, dissolved or infused for use in food.

For preparation of the alcoholic beverage of the invention, there is no limitation on the timing or method of addition of sucralose, as long as the beverage contains sucralose in a concentration of 0.0001 to 0.1 wt. % when ingested. The alcoholic beverage can be prepared by conventional processes.

The sweetness of sucralose is felt when sucralose is contained in a concentration of 0.001 wt. % or more, although depending on individual palate and conditions and the type of food. Therefore, when sweetness of sucralose is not desired, a concentration of 0.0001 to 0.001% can be employed, so that an alcoholic beverage with a suppressed sweetness and a good flavor can be prepared.

The invention also provides a method for improving (enhancing) a flavor of an alcoholic beverage by adding the above specified amount of sucralose to the alcoholic beverage; and a process for preparing a flavor-improved (enhanced) alcoholic beverage, comprising the step of adding sucralose in the above specified amount.

(2). Refreshment Beverage

The present invention was accomplished based on the finding that addition of sucralose to a refreshment beverage brings out the inherent flavor of the refreshment beverage, and produces a beverage having an excellent flavor.

Refreshment beverages according to the invention include a wide variety of beverages such as coffee, cocoa, siruko, zenzai (thick azuki bean soup), nut (e.g., almond or peanut) beverages, malt beverages, hop beverages, oolong tea, tea-like beverages prepared from plants other than tea (barley tea, herb tea, Chinese matrimoneyvine tea, tochu (*Eucommia ulmoides*) tea), carbonated beverages, fruit beverages, fruit-flavored beverages, milk ingredient-containing beverages, soymilk and soymilk-containing beverages. These refreshment beverages include those to be drunk as such, and those to be drunk as diluted, dissolved or infused.

The fruit beverages include a wide variety of foods containing fruit juices, such as fruit juices themselves, fruit juice-containing soft drinks prepared by diluting fruit juices with water or syrups, fruit juice-containing mixed beverages, fruit juice-containing carbonated beverages, fruit juice-containing milk beverages, fruit juice-containing thick syrups and other beverages.

The fruit-flavored beverages are beverages prepared using fruity flavor ingredients such as fruit flavors, in combination with or without fruit juices, purees, pulps or other fruit ingredients.

The milk ingredient-containing beverages include a wide variety of beverages prepared using milk or milk-derived material as an ingredient, such as milk beverages, drinkable fermented milk, lactic acid bacteria beverages, milk protein beverages and milk-containing carbonated beverages.

The order and method of addition of sucralose are not limited as long as the refreshment beverage contains sucralose when ingested. The refreshment beverage can be prepared by various processes for preparing beverages.

For achieving the effect of the invention, the refreshment beverage contains sucralose in a concentration of 0.0001 to 0.1 wt. %, when drunk. The sweetness of sucralose is felt when sucralose is contained in a concentration of 0.001 wt. % or more, although depending on individual palate and conditions and the type of food. Therefore, when sweetness of sucralose is not desired, a concentration of 0.0001 to 0.001% can be employed, so that a refreshment beverage with a suppressed sweetness and a desired good flavor can be prepared.

The invention also provides a method for improving (enhancing) a flavor of a refreshment beverage by adding the above specified amount of sucralose to the refreshment beverage; and a process for preparing a flavor-improved (enhanced) refreshment beverage, comprising the step of adding the above-specified amount of sucralose.

(3). Tea Beverage and Tea-Containing Food

The present invention was accomplished based on the finding that sucralose, when added to tea, brings out the inherent flavor of the tea, and produces tea with a good flavor.

Teas according to the invention include non-fermented tea and fermented tea.

As used herein, the term "tea" is intended to mean drinkable tea obtained from a various types of tea leaves (for example, tea beverages in cans, PET bottles or other containers); drinkable or edible solid tea, such as pulverized or granulated tea leaves, or powder or granules prepared from the drinkable tea by lyophilization or like treatment; or tea leaves as such.

(a) Non-Fermented Tea

Non-fermented tea is tea produced without a fermentation step, such as sen-cha (ordinary green tea), gyokuro (high-quality green tea), ban-cha (coarse tea), powdered green tea prepared from ten-cha or the like, and other green teas. These teas may be produced by any processes without limitation, and include steamed tea and pot-roasted tea, wherein enzymes have been inactivated by steaming or pot-roasting. Preferred non-fermented teas include sen-cha, gyokuro and powdered green tea, among which powdered green tea is particularly preferred.

The non-fermented tea of the invention is characterized by containing sucralose. The amount of sucralose to be added is not limited as long as the amount is effective in enhancing or increasing a flavor of non-fermented tea. Usually, in the case of a beverage, the final tea beverage product may contain sucralose in a concentration of 0.00001 to 0.5 wt. %, preferably 0.0001 to 0.1 wt. %. Since the sweetness of sucralose is clearly felt when sucralose is contained in a concentration of 0.0006 wt. % or more, a concentration less than 0.0006 wt. % can be employed when a reduced sweetness is desired. Suitable adjustment of the concentration is well within the ordinary skill level in the art. In the case of tea leaves as such, a powdered green tea or an instant powdered tea, the concentration of sucralose is selected so that a drinkable tea prepared by adding an ordinary amount of hot water or cold water contain sucralose in the concentration specified above.

The non-fermented tea of the invention does not need to be produced in the presence of sucralose, as long as the final product contains sucralose. Thus, the timing, order and other factors of addition of sucralose are not limited. Also, the method of addition of sucralose is not limited, and sucralose may be added in the form of a solid such as a powder or granules, or in the form of a solution.

Generally, preferred sen-cha has balanced bitterness and savoriness, and a cool aftertaste. Preferred gyokuro has a deep savoriness, a light bitterness and a round and rich aftertaste. For ban-cha or medium-quality sen-cha, a light and cool bitterness is preferred to savoriness. Further, preferred powdered green tea has a deep aroma, a light bitterness and a high savoriness. According to the invention, sucralose is added to emphasize aroma and flavor unique to each type of non-fermented tea, thereby giving a non-fermented tea with a good flavor excellent in roundness, richness, etc.

The present invention also provides a food containing a non-fermented tea comprising sucralose. Non-fermented tea-containing foods mean foods containing a non-fermented tea at least as a part, or foods prepared using a non-fermented tea. Usable non-fermented teas include not only the above-mentioned tea leaves, drinkable teas, edible solid teas and solid teas for drinks (such as instant powdered tea), but also other tea products containing tea ingredients such as sen-cha, gyokuro, powdered green tea or ban-cha. The non-fermented tea-containing foods include, but not limited to, puddings and jellies, ice creams and other cold sweets, candies, an (azuki bean jam), senbei (rice cracker), cookies, manju (steamed azuki bean jam-filled bun), cakes and other confections containing non-fermented tea; milk beverages, carbonated beverages, soft drinks and other beverages containing non-fermented tea; and liqueurs, sake and other alcoholic beverages containing non-fermented tea, such as green tea liqueur.

The present invention also provides a novel use of sucralose, which has been used as an high intense sweetener, as a flavor enhancer for non-fermented tea. The non-fermented tea flavor enhancer may contain, in addition to sucralose, another sweetener, a flavor, a preservative, a stabilizer or like ingredient, within the range that does not adversely affect the effects of the invention.

The non-fermented tea flavor enhancer of the invention may be in the form of a solid such as a powder or granules or in the form of a solution. The flavor enhancer in any of these forms can be used as a non-fermented tea (green tea) flavor enhancer on, for example, the table, or used as added to tea leaves of non-fermented tea, tea beverages, powdery or granular instant teas or edible teas, or the non-fermented tea-containing foods mentioned above.

Addition of the enhancer brings out a flavor of non-fermented tea, in particular sen-cha, gyokuro or powdered green tea, so that non-fermented tea or non-fermented tea-containing food with a high aroma can be prepared or obtained.

The timing of addition of the non-fermented tea flavor enhancer is not limited. The amount of the flavor enhancer to be added to the non-fermented tea-containing food varies according to the type of non-fermented tea-containing food and the concentration of non-fermented tea in the food, and thus cannot be generalized. However, those having ordinary skill in the art would be able to suitably select the amount of the flavor enhancer based on the concentration of sucralose in the tea beverage specified above.

The present invention also provides a method for improving (enhancing or increasing) a tea flavor of a non-fermented tea beverage or food by adding the above-specified amount of sucralose to non-fermented tea; and a process for preparing a non-fermented tea beverage or food with an improved tea flavor, comprising the step of adding sucralose in the above amount.

(b) Fermented Tea

Fermented tea is tea produced through a fermentation step, and includes black tea, oolong tea and the like, among which black tea is preferred.

The amount of sucralose to be added to fermented tea such as black tea is not limited as long as the amount is effective in enhancing or improving a flavor of the fermented tea. In the case of a beverage, the final tea beverage product may contain 0.00001 to 0.5 wt. %, preferably 0.0001 to 0.1 wt. % of sucralose, although this range is not limitative. Since the sweetness of sucralose is clearly felt when sucralose is contained in a concentration of 0.0006 wt. % or more, a concentration less than 0.0006 wt. % can be employed when a reduced sweetness is desired. Suitable adjustment of the amount is well within the ordinary skill level in the art. In the case of tea leaves or instant black tea powder, the concentration of sucralose is selected so that the drinkable tea prepared by adding an ordinary amount of hot water or cold water contains sucralose in the concentration specified above.

The fermented tea of the invention does not need to be produced by processing tea leaves in the presence of sucralose, as long as the final product contains sucralose. Thus, the timing, order and other factors of addition of sucralose are not limited. Also, the method of addition of sucralose is not limited, and sucralose may be used in the form of a solid such as a powder or granules, or in the form of a solution.

According to the invention, sucralose is added to fermented tea so as to emphasize an aroma and flavor unique to each type of fermented tea, so that a sweet-smelling fermented tea with a rich aroma and good flavor can be prepared.

The invention also provides a food containing fermented tea comprising sucralose. The food containing fermented tea means a food containing fermented tea at least as a part, or a food prepared using fermented tea. Usable fermented teas include not only the drinkable teas, edible solid teas, solid teas for drinks (such as instant powdered tea) mentioned above, but also other tea products containing black tea ingredients. The fermented tea-containing foods include, but not limited to, soft drinks, milk beverages, carbonated beverages and like beverages containing fermented tea (in particular black tea) such as lemon tea, milk tea, brandied tea or flavored tea (for example, apple flavored tea or orange flavored tea); puddings, jellies, ice creams and like cold sweets, candies, an (azuki bean jam), senbei, cookies, manju, cakes and other confections containing black teas; and liqueurs, sake and other alcoholic beverages containing black tea.

The present invention further provides a novel use of sucralose, which has been used as an high intense sweetener, as a flavor enhancer for fermented tea, in particular black tea. The fermented tea flavor enhancer comprises at least sucralose, and may contain, in addition to sucralose, another sweetener, a flavor, a preservative, a stabilizer or like ingredient, within the range that does not adversely affect the effects of the invention. The fermented tea flavor enhancer of the invention may be in the form of a solid such as a powder or granules or in the form of a solution. The fermented tea flavor enhancer in any of these forms can be used as a fermented tea flavor enhancer on, for example, the table, or used as added to tea leaves of fermented tea, tea beverages, powdery or granular instant teas or edible teas, or the fermented tea-containing foods mentioned above.

Addition of the enhancer brings out a flavor of fermented tea such as black tea, so that a fermented tea or fermented tea-containing food with a high aroma can be prepared or obtained.

The timing of addition of the flavor enhancer is not limited. The amount of flavor enhancer to be added to the tea-containing food varies according to the type and fermented tea content of the tea-containing food, and cannot be generalized. However, the amount can be suitably selected based on the concentration of sucralose in the tea beverages mentioned above.

The present invention further provides a method for improving (enhancing, increasing) a tea flavor of fermented tea beverage or food by adding sucralose to the fermented tea in the concentration specified above, and a process for preparing a fermented tea beverage or food having an improved (enhanced) tea flavor, comprising the step of adding sucralose in the concentration specified above.

(4). Fruit Juice- or Fruit Pulp-Containing Food

The present invention was accomplished based on the finding that addition of sucralose to a fruit juice- or fruit pulp-containing food brings out a flavor of fruit, and produces a food having an improved fruity flavor and fresh flavor.

Fruit juice-containing foods according to the invention include a wide variety of foods containing fruit juice, such as fruit juices themselves, fruit juice-containing soft drinks prepared by diluting fruit juice with water or syrup, fruit juice-containing mixed beverages, fruit juice-containing carbonated beverages, fruit juice-containing milk beverages, fruit pulp beverages, fruit juice-containing thick syrups and like beverages; fruit juice-containing liqueurs and like alcoholic beverages; jellies and mousses containing fruit juice; ice creams, sherbets and like ice sweets containing fruit juice; and candies, chewing gums and like confections containing fruit juice. The fruit pulp-containing foods include a wide variety of foods containing fruit pulp and foods prepared using fruit pulp as an ingredient, such as fruit purees, fruit porridges, nectars and like fruit pulp beverages; fruit cocktails, cakes, jellies, mousses and like confections containing fruit; ice creams, sherbets and other cold sweets containing fruit; canned or bottled foods containing fruit pulp, fruit sauces, fruit butters, fruit liquors, fruit vinegars and the like.

Any type of fruit can be used for preparing the fruit juice or fruit pulp, without limitation. Examples of fruits include, but not limited to, oranges, grapefruits, lemons, mandarins and other citrus fruits, strawberries, blueberries, brambles and other berries, bananas, pineapples, peaches, grapes, muscats, apples, pears, melons, kiwi fruits, guavas, passion fruits and watermelons.

To obtain the food of the invention having an improved fresh flavor and fruity flavor, the timing, order and other factors of addition of sucralose are not limited as long as the final product contains sucralose. Also, the timing of sucralose is not limited, and sucralose may be used in the form of a solid such as a powder or granules, or in the form of a solution.

The amount of sucralose to be added to the fruit juice- or fruit pulp-containing food is not limited as long as the amount is effective in enhancing (increasing) the fruity flavor or fresh flavor of the food, and can be suitably selected according to the type of food and the type and amount of fruit juice or fruit pulp contained in the food. Specifically, the concentration of sucralose may be, but not limited to, usually 0.00001 to 0.5 wt. %, preferably 0.0001 to 0.1 wt. %, based on the food. Since the sweetness of sucralose is clearly felt when sucralose is contained in a concentration of 0.0006 wt. % or more, a concentration less than 0.0006 wt. % can be employed when a reduced sweetness is desired. Suitable adjustment of the amount is well within the ordinary skill level in the art.

According to the invention, sucralose is added to emphasize a flavor and aroma of fruit juice or fruit pulp contained in a food, thereby giving a food having a highly fruity and fresh flavor.

The present invention provides a novel use of sucralose as a fruity flavor enhancer. The flavor enhancer comprises at least sucralose, and may contain, in addition to sucralose, another sweetener, a flavor, a preservative, a stabilizer or like ingredient, within the range that does not adversely affect the effects of the invention.

The fruity or fresh flavor enhancer of the invention may be in the form of a solid such as a powder or granules, or in the form of a solution. The flavor enhancer in any of these forms is added at a desired stage of preparation of the foods mentioned above. Addition of the flavor enhancer brings out a flavor of fruit juice or fruit pulp contained in a food, so that a fruit juice- or fruit pulp-containing food having an improved fruity or fresh flavor can be prepared.

The timing of addition of the flavor enhancer is not limited. The amount of the flavor enhancer to be added a food is suitably selected based on the concentration of sucralose in the fruit juice- or fruit pulp-containing food of the invention described hereinbefore.

The invention further provides a method for enhancing (increasing) a fruity flavor or fresh flavor of a fruit juice- or fruit pulp-containing food by adding sucralose, for example in the effective amount specified above, to the fruit juice- or fruit pulp-containing food; and a process for preparing a fruit juice- or fruit pulp-containing food having an improved fruity or fresh flavor, comprising the step of adding the effective amount of sucralose.

(5). Milk-Containing Food

The present invention was accomplished based on the finding that addition of sucralose to a food containing a milk ingredient brings out a milk flavor, and produces a food improved in mouthfeel unique to milk.

Milk-containing foods according to the invention include a wide variety of products produced by processing milk or a milk component. Examples include, but not limited to, creams, butters, butter oils, cheeses, ice creams, concentrated milks, concentrated skim milks, condensed milks, fermented milks, lactic acid bacteria beverages, powdered milks, cream powders, whey powders and like milk products, and yogurts, puddings, flour pastes, milky beverages, milk-containing carbonated beverages and like foods prepared using milk as an ingredient.

For preparing the food of the invention having improved milky characteristics, the timing, order and other factors of addition of sucralose are not limited as long as the final product contains sucralose. Also, the method of addition of sucralose is not limited, and sucralose may be used in the form of a solid such as a powder or granules, or in the form of a solution.

The amount of sucralose to be added to a milk-containing food is not limited as long as the amount is effective in enhancing (increasing) milky characteristics (flavor and mouthfeel unique to milk) of the milk-containing food, and can be suitably selected according to the type of food and the amount of the milk or milk component contained in the food. Specifically, the concentration of sucralose may be, but not limited to, 0.00001 to 0.5 wt. %, preferably 0.0001 to 0.5 wt. %, based on the milk-containing food. Since the sweetness of sucralose is clearly felt when sucralose is contained in a concentration of 0.0006 wt. % or more, a concentration less than 0.0006 wt. % can be employed when a reduced sweetness is desired. Suitable adjustment of the concentration is well within the ordinary skill level in the art.

According to the invention, sucralose is added to emphasize a flavor of milk, so that a food having a good flavor and mouthfeel unique to milk can be prepared.

The invention also provides a novel use of sucralose as an enhancer of milky characteristics. The milky characteristic enhancer comprises at least sucralose, and may contain, in addition to sucralose, another sweetener, a flavor, a preservative, a stabilizer or like ingredient, within the range that does not adversely affect the effects of the invention.

The milky characteristic enhancer of the invention may be in the form of a solid such as a powder or granules or in the form of a solution. The enhancer in any of these forms is added at a desired stage of preparation of the milk-containing foods mentioned above. Addition of the milky characteristic enhancer brings out a flavor of milk contained in a food, giving a milk-containing product having improved milky characteristics.

The timing of addition of the milky characteristic enhancer is not limited. The amount of the milky characteristic enhancer can be suitably selected based on the concentration of sucralose in the milk-containing food of the invention described above.

The present invention further provides a method for enhancing (increasing) milky characteristics of a milk-containing food by adding sucralose, for example in the effective amount specified above, to the milk-containing food; and a process for preparing a milk-containing food having enhanced (increased) milky characteristics, comprising the step of adding sucralose in the above specified effective amount.

(6). Confections

The present invention was accomplished based on the finding that addition of sucralose to a confection such as candy, butter cake, chocolate or tableted confectionery brings out a flavor unique to each type of confection. These confections will be described below.

(a) Candy

Candies according to the invention include drops, butterscotch and other hard candies; caramels, nougats, chewing candies, marshmallows and other soft candies; pectin jellies, starch candies, gummy candies, pastels and other jelly candies.

According to the invention, sucralose is added to emphasize a flavor and aroma unique to each type of candy, so that a candy with a good flavor can be prepared.

The candy of the invention can be prepared by any of a variety of conventional processes for preparing candies, as long as the final product contains sucralose. Thus, the timing, order, method and other factors of addition of sucralose are not limited. Also, the form of sucralose to be added is not limited, and may a solid such as a powder or granules, or a solution.

The amount of sucralose to be added to a candy is not limited as long as the amount is effective in enhancing (increasing) the flavor unique to each type of candy, and can be suitably selected according to the type and ingredients of the candy. Specifically, the amount is selected so that the candy contains 0.0005 to 0.5 wt. % of sucralose when eaten, although this range is not limitative.

The sweetness of sucralose is felt when sucralose is contained in a concentration of about 0.001% or more, although depending on individual palate and conditions and type of food. Therefore, when sweetness of sucralose is not desired, sucralose can be used in a concentration of 0.0005 to 0.001 wt. %, so that a candy having a flavor unique the candy and a suppressed sweetness of sucralose can be prepared.

The candy of the invention may contain, in addition to sucralose, another sweetener, a flavor, a preservative, a stabilizer or like ingredient, within the range that does not adversely affect the effects of the invention.

The present invention further provides a novel use of sucralose as a candy flavor enhancer. The flavor enhancer comprises at least sucralose, and may contain, in addition to sucralose, another sweetener, a flavor, a preservative, a stabilizer or like ingredient, within the range that does not adversely affect the effects of the invention.

The invention also provides a method for enhancing (increasing) a flavor of a candy by adding sucralose, for example in the effective amount specified above, to the candy; and a process for preparing a candy having an enhanced (increased) flavor, comprising the step of adding the effective amount of sucralose.

(b) Butter Cake

Butter cakes according to the invention include a wide variety of confections prepared using flour, butter and other ingredients. Examples include shortcakes, rolled cakes and other sponge cakes; pound cakes, fruitcakes and other butter cakes; kasutera (Castella sponge cakes); cream puffs, éclairs and other puff confections; savarins and other fermented confections; apple pies and other pies; unbaked cheesecakes and other cream jelly cakes; and cookies, Danish pastries, pretzels and the like.

According to the invention, sucralose is added to emphasize a flavor and aroma of butter in a cake, so that a cake with a good butter flavor can be prepared.

The timing, order and other factors of addition of sucralose to obtain such a butter cake is not limited, as long as the final cake product contains sucralose. The cake can be prepared by conventional processes for preparing butter cakes. Further, the form of sucralose is not limited, and may be a solid such as a powder or granules, or a solution.

The concentration of sucralose in a butter cake is not limited as long as the amount is effective in enhancing (increasing) a butter flavor, and can be suitably selected according to the type and ingredients of the butter cake. Specifically, the concentration of sucralose may be, but not limited to, 0.00001 to 0.5 wt. %, preferably 0.0001 to 0.5 wt. %, based on the final cake product. Since the sweetness of sucralose is clearly felt when sucralose is contained in a concentration of 0.0006 wt. % or more, a concentration less than 0.0006 wt. % can be employed when a reduced sweetness is desired. Suitable adjustment of the concentration is well within the ordinary skill level in the art.

The invention further provides a novel use of sucralose as a butter flavor enhancer. The butter flavor enhancer comprises at least sucralose, and may contain, in addition to sucralose, another sweetener, a flavor, a preservative, a stabilizer or like ingredient, within the range that does not adversely affect the effects of the invention.

The butter flavor enhancer of the invention may be in the form of a solid such as a powder or granules, or in the form of a solution. The butter flavor enhancer in any of these forms is added at a desired stage of preparation of the cakes mentioned above. Addition of the enhancer brings out a butter flavor of a cake, so that a cake with a good flavor and good taste can be prepared.

The timing of addition of the flavor enhancer is not limited. Also, the concentration of the flavor enhancer in a butter cake varies according to the type, ingredients and butter content of the cake, and cannot be generalized. The concentration may be, for example, 0.00001 to 0.5 wt. %, preferably 0.0001 to 0.5 wt. %, calculated as sucralose, and suitably selected based on these concentrations.

The present invention also provides a method for enhancing (increasing) a butter flavor by adding sucralose, for example in the effective amount specified above, to a butter cake; and a process for preparing a butter cake comprising the step of adding the effective amount of sucralose.

(c) Chocolate

Chocolates according to the invention include a wide variety of confections produced using an ingredient prepared from cacao nibs of cacao beans. Examples of chocolates include not only confections mainly consisting of chocolate, such as bitter chocolates, sweet chocolates, milk chocolates, white chocolates and fruit juice- or fruit pulp-containing chocolates, but also confections having a chocolate portion, such as those comprising fruit, syrup or cookie inside a chocolate such as covering chocolate, coating chocolate, enrobing chocolate or shell-molded chocolate.

According to the invention, sucralose is added to emphasize a flavor and aroma of cacao mass in chocolate, so that a chocolate with a good cacao flavor can be prepared.

The timing, order and other factors of addition of sucralose to obtain such chocolate is not limited as long as the final chocolate product contains sucralose. The chocolate can be prepared by conventional process for preparing chocolate. The form of sucralose to be added is not limited, and may be a solid such as a powder or granules, or a solution.

The amount of sucralose to be added to chocolate is not limited as long as the amount is effective in enhancing (increasing) a chocolate flavor (cacao flavor), and can be suitably selected according to the type and ingredients of the chocolate. Specifically, the concentration of sucralose may be, but not limited to, 0.0001 to 0.5 wt. % based on the final chocolate product. In chocolate, the sweetness of sucralose is felt when sucralose is contained in a concentration of 0.002% or more, although depending on individual palate and conditions and the type of food. Therefore, when sweetness of sucralose is not desired, a concentration of 0.0001 to 0.002 wt. % can be employed, so that the prepared chocolate has a good chocolate flavor with suppressed sweetness of sucralose.

The present invention further provides a novel use of sucralose as a chocolate flavor enhancer. The flavor enhancer comprises at least sucralose, and may contain, in addition to sucralose, another sweetener, a flavor, a preservative, a stabilizer or like ingredient, within the range that does not adversely affect the effects of the invention.

The present invention further provides a method for enhancing (increasing) a chocolate flavor by adding sucralose, for example in the effective amount specified above, to chocolate; and a process for preparing a chocolate with an enhanced (increased) chocolate flavor, comprising the step of adding the effective amount of sucralose.

(d) Chewing Gum

Chewing gums according to the invention are not limited in type or flavor, and include a wide variety of chewing gums such as stick gums, sugar-coated gums, pellet gums and bubble gums.

According to the invention, sucralose is added to emphasize a taste and aroma of an flavor contained in chewing gum, so that a highly palatable chewing gum can be prepared which has good eating and chewing characteristics unique to chewing gum.

The timing, order and other factors of addition of sucralose to obtain such a chewing gum are not limited as long as the final product contains sucralose. The chewing gum can be prepared by conventional process for preparing chewing gum. Also, the form of sucralose to be added is not limited, and may be a solid such as a powder or granules, or a solution.

The concentration of sucralose is not limited as long as the amount is effective in enhancing (increasing) a flavor and chewing characteristics of chewing gum, and can be suitably selected according to the type and ingredients of the chewing gum. Specifically, the concentration of sucralose may be, but not limited to, 0.0001 to 0.5 wt. % in the final product (when chewed). In chewing gum, the sweetness of sucralose is felt when sucralose is contained in a concentration of 0.002 wt. % or more, although depending on individual palate and conditions, and ingredients of the chewing gum. Therefore, when sweetness of sucralose is not desired, a concentration of 0.0001 to 0.002% can be employed, so that a chewing gum can be prepared which has a good flavor, good chewing characteristic and suppressed sweetness of sucralose.

The present invention further provides a novel use of sucralose as a chewing gum flavor enhancer. The flavor enhancer comprises at least sucralose, and may contain, in addition to sucralose, another sweetener, a flavor, a preservative, a stabilizer or like ingredient, within the range that does not adversely affect the effects of the invention.

The present invention also provides a method for enhancing (increasing) a flavor and chewing characteristics of a chewing gum by adding sucralose, for example in the effective amount specified above, to the chewing gum; and a process for preparing a chewing gum with enhanced (increased) flavor and chewing characteristics, comprising the step of adding the effective amount of sucralose.

(e) Tableted Confection

Tableted confections according to the invention are confections prepared by pulverizing or granulating a mixture comprising a main ingredient (such as sugar, glucose, sorbitol, xylitol, maltitol, palatinit, erythritol or like saccharide), flavoring ingredient(s) (such as fruit juice, acidulant, sweetener or flavor) and other ingredients (such as starch, coloring agent, nutrient supplement, foaming agent (carbonates and acid agent)), followed by mechanical compression molding into a desired shape. Tableted confections vary in shape, taste and hardness, and are roughly divided into two types: relatively large tablets with a mild flavor such as lemon or yogurt; and small tablets with a refreshing, cool flavor such as mint or like herb. These types of tableted confections are marketed according to consumers' preferences.

According to the invention, sucralose is added to emphasize a lemon, yogurt or like mild flavor or a herb or like refreshing flavor of a tableted confection, so that a tableted confection with a good flavor can be prepared. Flavors of tableted confections according to the invention include the mild flavor and refreshing flavor described above.

The timing, order and other factors of addition of sucralose to obtain such a tableted confection are not limited as long as the final product contains sucralose. The tableted confection can be prepared by conventional processes for tableted confections. Further, the form of sucralose to be added is not limited and may be a solid such as a powder or granules, or a solution.

The amount of sucralose to be added to a tableted confection is not limited as long as the amount is effective in enhancing (increasing) a flavor or eating characteristics of the tableted confection, and can be suitably selected according to the type and ingredients of the tableted confection. Specifically, the concentration of sucralose may be, but not limited to, 0.0005 to 0.5 wt. % based on the final product (when eaten). In a tableted confection, the sweetness of sucralose is felt when sucralose is contained in a concentration of about 0.005% or more, although depending on individual palate and conditions and the type of tableted confection. Therefore, when sweetness of sucralose is not desired, a concentration of 0.0005 to 0.005 wt. % can be employed, so that a tableted confection can be obtained which has a good flavor and suppressed sweetness of sucralose.

The invention further provides a novel use of sucralose as a flavor enhancer for a tableted confection. The flavor enhancer comprises at least sucralose, and may contain, in addition to sucralose, another sweetener, a flavor, a preservative, a stabilizer or like ingredient, within the range that does not adversely affect the effects of the invention.

The invention also provides a method for enhancing (increasing) a flavor of a tableted confection by adding sucralose, for example in the effective amount specified above, to the tableted confection; and a process for preparing a tableted confection with an enhanced (increased) flavor, comprising the step of adding the effective amount of sucralose.

(7). Processed Food Containing Sucralose

The present invention was accomplished based on the finding that when sucralose is added to sesame, miso, ginger or a food containing any of them, or a smoked food, the flavor unique to each type of processed food is brought out. These processed foods will be described below.

(a) Sesame Food

Sesame has good nutritional value and a unique flavor (aroma), and has been therefore used in a variety of foods including everyday dishes and confections. Various studies have been made on a method for increasing a sesame flavor.

The present invention was accomplished based on the finding that addition of sucralose to sesame or a sesame-containing food brings out a high aroma of sesame, and produces a food with an increased sesame flavor.

Sesame foods according to the invention include a wide variety of foods containing sesame or sesame component(s). The sesame component may be sesame oil. Sesame-containing foods include, but not limited to, sesame dressings, goma-dare (Japanese style sesame sauces) and like sauces; ice creams, yogurts, sherbets and other cold sweets containing sesame; jellies, mousses and other dessert foods containing sesame; senbei, cookies, manju, an (bean paste jam), cakes and other Japanese or Western confections containing sesame, sesame candies and like confections; and goma-dofu (tofu-like food prepared from sesame), sesame-containing noodles, sesame miso, instant sesame dressings, sesame-containing seasonings (such as goma-shio (sesame and salt) or other rice seasonings), sesame oils and the like.

The timing, order and other factors of addition of sucralose to obtain the food of the invention having an increased sesame flavor are not limited, as long as the final product contains sucralose. Also, the method of addition of sucralose is not limited, and sucralose may be added in the form of a solid such as a powder or granules, or a solution.

The amount of sucralose to be added to a sesame food is not limited as long as the amount is effective in enhancing (increasing) a sesame flavor, and can be suitably selected according to the type and ingredients of the sesame food. The concentration of sucralose may be, but not limited to, 0.00001 to 0.5 wt. %, preferably 0.0001 to 0.5 wt. %, based on the sesame food. Since the sweetness of sucralose is clearly felt when sucralose is contained in a concentration of 0.0006 wt. % or more, a concentration less than 0.0006 wt. % can be employed when a reduced sweetness is desired. Suitable adjustment of the amount is well within the ordinary skill level in the art.

The invention also provides a novel use of sucralose as a sesame flavor enhancer. The sesame flavor enhancer comprises at least sucralose, and may contain, in addition to sucralose, another sweetener, a flavor, a preservative, a stabilizer or like ingredient, within the range that does not adversely affect the effects of the invention.

The sesame flavor enhancer of the invention may be in the form of a solid such as a powder or granules, or a solution. The sesame flavor enhancer in any of these forms is added at a desired stage of preparation of the sesame-containing foods mentioned above. Addition of the sesame flavor enhancer brings out a flavor of sesame contained in each food, so that a sesame food with an improved aroma and flavor of sesame can be prepared.

The timing of addition of the sesame flavor enhancer is not limited. The concentration of the sesame flavor enhancer in a sesame-containing food can be suitably selected based on the concentration of sucralose in the sesame food of the invention described above.

The present invention also provides a method for enhancing (increasing) a sesame flavor of a sesame food by adding sucralose, for example in the effective amount specified above, to a sesame food; and a process for preparing a sesame food with an enhanced (increased) sesame flavor, comprising the step of adding the effective amount of sucralose.

(b) Miso Food

Miso is inevitable in Japanese dietary culture, and is used in a variety of foods such as miso soups, hot pot foods, dengaku (food grilled with miso), miso marinades, miso-dressed foods and miso sauces. Not only the taste but also the flavor (aroma) is considered important to savoriness (tastiness) of a miso. Various methods have been studied on improvement of a miso flavor.

The present invention was accomplished based on the finding that addition of sucralose to miso brings out a miso flavor, so that miso with a good flavor can be prepared.

Misos according to the invention include a wide variety of foods named "miso", such as ordinary misos (white and red misos) for use in miso soups, and misos called name-miso, which can be eaten as such. Name-misos include, for example, fermented misos such as kinzanji miso, sakura miso and hishiho miso; and processed name-misos prepared by adding other ingredients, such as tekka miso, yachiyo miso, tai (sea bream) miso, sesame miso, ginger miso, yuzu (*Citrus yuzu*) miso, shigure miso, oyster miso and sansho (Japanese pepper) miso. The miso according to the invention may be prepared using any type of koji (fermented grain) without limitation, and may be rice miso, barley miso, bean miso or the like.

According to the invention, sucralose is added to emphasize a miso flavor, so that a miso with a good flavor can be prepared. In particular, flavor (aroma) of miso, as well as taste of miso, is an important factor for savoriness of foods prepared using miso, such as miso soups and dengaku. Accordingly, the above effects are very beneficial for adding further commercial value to miso.

The present invention also provides a miso food comprising sucralose. Miso foods according to the invention include misos themselves, foods at least partially comprising miso, and foods prepared using miso. Misos according to the invention are not limited to those in ordinary form, i.e., a pasty solid, as long as they include a miso ingredient. Examples of miso-containing foods include, but not limited to, miso soups, instant miso soups, miso sauces, miso dressings, misos for pickles, miso marinades, miso candies, miso an, miso senbei, miso-containing cold sweets and other confections.

The miso food of the invention can be prepared by conventional processes with the exception of using the miso of the invention in place of ordinary miso.

The amount of sucralose to be added to a miso food is not limited as long as the amount is effective in enhancing (increasing) a miso flavor, and can be suitably selected according to the type and ingredients of the miso food. Specifically, the concentration of sucralose in the final miso food product may be, but not limited to, 0.00001 to 0.5 wt. %, preferably 0.0001 to 0.5 wt. %. Since the sweetness of sucralose is clearly felt when sucralose is contained in a concentration of 0.0006 wt. % or more, a concentration less than 0.0006 wt. % can be employed when a reduced sweetness is desired. Suitable adjustment of the amount is well within the ordinary skill level in the art.

The miso of the invention does not need to be one prepared by aging in the presence of sucralose, as long as the final product contains sucralose. Thus, there is no limitation on the timing, order and other factors of addition of sucralose. Also, the form of sucralose to be added is not limited, and may be a solid such as a powder or granules, or a solution.

The present invention further provides a novel use of sucralose as a miso flavor enhancer. The miso flavor enhancer comprises at least sucralose, and may contain, in addition to sucralose, another sweetener, a flavor, a preservative, a stabilizer or like ingredient, within the range that does not adversely affect the effects of the invention.

The miso flavor enhancer of the invention may be in the form of a solid such as a powder or granules, or a solution. The flavor enhancer in any of these forms is added to miso, miso soup, instant miso soup, miso sauce, miso dressing, miso for pickles, miso marinade, miso candy, miso an, miso senbei, a miso-containing cold sweet or like miso-containing food. Addition of the enhancer brings out a miso flavor, so that a miso food with a high aroma can be prepared or obtained.

The timing of addition of the miso flavor enhancer is not limited. The amount of the flavor enhancer to be added to a miso food varies according to the type and miso content of the miso food, and cannot be generalized. For example, in the case of miso, the miso may contain the flavor enhancer in a concentration of 0.00001 to 0.5 wt. %, preferably 0.0001 to 0.5 wt. %, calculated as sucralose. The amount to be added is selected based on these concentrations.

The invention also provides a method for enhancing (increasing) a miso flavor of a miso food by adding the above effective amount of sucralose to the miso food; and a process for preparing a miso food with a enhanced (increased) miso flavor, comprising the step of adding the effective amount of sucralose.

(c) Ginger Food

Flavor and aroma, as well as taste, are important in ginger.

The present invention was accomplished based on the finding that a ginger flavor is emphasized by addition of sucralose to ginger, a ginger-containing food or a ginger processed food (hereinafter referred to generally as "ginger food").

Ginger foods according to the invention include a wide variety of foods prepared using ginger as an ingredient, such as beni-shoga (red pickled ginger), amazu-shoga (sweet pickled ginger) and other ginger pickles, ginger pastes and other ginger processed foods; ginger sauces, ginger-marinated fish meats, ginger candies, ginger-containing Japanese confections, and other ginger-containing foods.

To obtain the ginger food of the invention having an improved ginger flavor, there is no limitation on the timing, order and other factors of addition of sucralose are not limited, as long as the final ginger food product contains sucralose. The method of addition of sucralose is not limited, and sucralose can be added in the form of a solid such as a powder or granules, or a solution.

According to the invention, sucralose is added to emphasize a flavor and aroma of ginger, so that a food with a good ginger flavor can be prepared.

The amount of sucralose to be added to a ginger food is not limited as long as the amount is effective in enhancing (increasing) a ginger flavor, and can be suitably selected according to the type and ingredients of the ginger food. Specifically, the concentration of sucralose may be, but not limited to, 0.00001 to 0.5 wt. %, preferably 0.0005 to 0.5 wt. %, based on the final ginger food product. Since the sweetness of sucralose is clearly felt when sucralose is contained in a concentration of 0.0006 wt. % or more, a concentration less than 0.0006 wt. % can be employed when a reduced sweetness is desired. Suitable adjustment of the concentration is well within the ordinary skill level in the art.

The invention also provides a novel use of sucralose as a ginger flavor enhancer. The ginger flavor enhancer comprises at least sucralose, and may contain, in addition to sucralose, another sweetener, a flavor, a preservative, a stabilizer or like ingredient, within the range that does not adversely affect the effects of the invention.

The ginger flavor enhancer of the invention may be in the form of a solid such as a powder or granules, or a solution. The flavor enhancer in any of these forms is added at a desired stage of preparation of the ginger foods mentioned above. Addition of the flavor enhancer brings out a ginger flavor of the ginger food, so that a ginger food with an enhanced (increased) flavor can be prepared or obtained.

The timing of addition of the ginger flavor enhancer is not limited. The amount of the flavor enhancer to be added to a ginger food can be suitably selected based on the concentration of sucralose specified above.

The invention further provides a method for enhancing (increasing) a ginger flavor of a ginger food by adding the above effective amount of sucralose to a ginger food; and a process for preparing a ginger food with an enhanced (increased) ginger flavor, comprising the step of adding the effective amount of sucralose.

(d) Smoked Product

Smoking, a traditional method for preserving food, has been recently employed to order to give a palatability, rather than preservability, because of the development of packaging materials and cold chains, and variation of consumer needs. Many studies have been made to emphasize smoky characteristics of a smoked product and enhance the flavor and eating characteristics unique to smoked products.

The present invention was accomplished based on the finding that addition of sucralose to a smoked product brings out the flavor (smoke flavor) and taste unique to smoked products. The term "smoky characteristics" as used herein means the flavor (smoke flavor) and taste unique to smoked products.

Smoked products according to the invention include those obtained by drying in smoke (smoke-drying) an animal product such as meat, egg or a milk product, or an aquatic product such as fish, in order to give a unique flavor and preservability with smoke components; and those obtained by adding a smoke flavor in order to give a flavor and other characteristics similar to those given by smoking. The smoked product of the invention is a food treated at least by one of the above smoking or smoke-flavoring processes, and may be a food treated by another process before and/or after smoking or smoke-flavoring, such as canned smoked oil-marinated food prepared by marinating a smoked food.

Examples of smoked processed meat (including chicken) products include bone-in hams, boneless hams, loin hams, shoulder hams, belly hams, Lachsschinken, pressed hams and other hams; sausages, cooked sausages, pressurized heated sausages, semi-dry sausages, dry sausages, unsalted sausages, Bologna sausages, Frankfurter sausages, Vienna sausages, liver sausages, liver pastes, and other sausages, fish sausages and like processed products; carcasses of birds, swine, cattle and other animals; etc. Examples of smoked processed aquatic products include those of salmons, trouts, herrings, eels, oysters, short-necked clams, abalones, scallops, octopuses, cuttlefishes or squids and smelts. These aquatic products may be prepared as, but not limited to, canned smoked oil-marinated foods. Examples of milk products include cheeses.

These products may be cold smoked products prepared by smoke-drying at a low temperature (10 to 30° C.) for a relatively long period to a water content of 40% or less; warm smoked products prepared by smoke-drying at a relatively high temperature (30 to 50° C.) for a short period; hot smoked or roast-smoked products prepared by smoke-drying at 50 to 80° C. or at 80 to 120° C.; liquid-smoked products prepared by treatment with a smoke flavor followed by drying; or electrically smoked products prepared by electrically charging smoke particles to accelerate deposition of the smoke particles to foods. Thus, there is no limitation on the type of treatment. Application of the present invention is particularly advantageous for, among the other products, liquid-smoked products and electrically smoked products, which can be obtained as large-scale products by relatively large batch treatment, but are inferior in the flavor unique to smoked products.

For preparing the smoked product of the invention having enhanced smoky characteristics, the timing, order and other factors of addition of sucralose are not limited as long as the final product contains sucralose. Preferably, sucralose is added so that the food ingredient before smoking (ingredient to be smoked) contains sucralose. Alternatively, when using a smoke flavor, sucralose may be added to the smoke flavor.

The form of sucralose to be added is not limited, and may be a solid such as a powder or granules, or a solution.

The concentration of sucralose in a smoked product (ingredient to be smoked) is not limited as long as it is effective in enhancing (increasing) smoky characteristics of the smoked product, and may be suitably selected according to the type and ingredients of smoked product and the type of smoking treatment. Specifically, the concentration of sucralose may be, but not limited to, 0.0001 to 0.1, based on the final smoked product. Since the sweetness of sucralose is clearly felt when sucralose is contained in a concentration of 0.0006 wt. % or more, a concentration less than 0.0006 wt. % can be employed when a reduced sweetness is desired. Suitable adjustment of the concentration is well within the ordinary skill level in the art.

For preparation of a liquid-smoked product, sucralose can be added to the smoke flavor to obtain a sucralose-containing smoke flavor. In this case, sucralose can be added in an amount of 0.001 to 1 wt. % per 100 wt. % of smoke flavor.

The smoking material, smoking process and smoke flavor (wood vinegar) for preparing the smoked product with enhanced smoky characteristics of the invention may be any of those conventionally employed, and can be selected according to the type of the food and desired taste.

According to the invention, sucralose is added to an ingredient to be smoked, or a smoke flavor used for treatment of an ingredient, to emphasize a flavor (smoke flavor) and taste unique to smoked products, so that a food with a good flavor can be prepared which has eating characteristics unique to smoked products.

The invention also provides a novel use of sucralose as a smoky characteristic enhancer for a smoked product. The smoky characteristic enhancer comprises at least sucralose, and may contain, in addition to sucralose, another sweetener, a flavor, a preservative, a stabilizer or like ingredient, within the range that does not adversely affect the effects of the invention.

The smoky characteristic enhancer of the invention may be in the form of a solid such as a powder or granules, or a solution. The enhancer in any of these forms is added at a desired stage of preparation of the smoked products or smoke flavors mentioned above. Addition of the smoked characteristic enhancer brings out the flavor unique to smoked products, so that a smoked food with enhanced smoky characteristics can be prepared or obtained.

There is no limitation on the timing of the smoked characteristic enhancer of the invention. The concentration of the smoked characteristic enhancer in a smoked product can be suitably selected based on the concentration of sucralose in the smoked product of the invention described above.

The invention also provides a method for enhancing (increasing) smoky characteristics of a smoked product by adding sucralose in the effective amount specified above; and a process for preparing a smoked product with enhanced (increased) smoky characteristics, comprising the step of adding the effective amount of sucralose.

(e) Tobacco

Tobaccos according to the invention include a wide variety of tobaccos such as ordinary cigarettes comprising cut tobacco leaves rolled in paper, leaf tobaccos, cut tobaccos and cigars.

According to the invention, sucralose is added to tobacco leaves or tobacco leaves are impregnated with sucralose, so as to give roundness to the taste of tobacco and produce a tobacco with a good rich flavor.

To obtain the tobacco of the invention having an enhanced quality, the timing, order and other factors of addition of sucralose are not limited, as long as the final tobacco product contains sucralose. Also, the method of addition of sucralose is not limited, and sucralose may be added in the form of a solid such as a powder or granules, or a solution. Specifically, sucralose can be added by a method comprising impregnating dried and processed tobacco leaves (such as cut leaves) with a sucralose solution, drying the leaves again, and wrapping the leaves in paper; or a method comprising admixing a sucralose powder or sucralose granules with cut leaves, and wrapping the mixture in paper. However, these methods are not limitative.

The amount of sucralose to be added to a tobacco is not limited as long as the amount is effective in enhancing (increasing) the quality of the tobacco, and may be suitably selected according to the type and nicotine content of the tobacco, and other factors. Specifically, the concentration of sucralose may be, but not limited to, 0.0001 to 0.1 wt. % based on the tobacco leaves.

The invention further provides a quality enhancer for a tobacco, comprising sucralose, i.e., an high intense sweetener, as an active ingredient. The quality enhancer of the invention comprises at least sucralose, and may contain, in addition to sucralose, another sweetener, a flavor, a preservative, a stabilizer or like ingredient, within the range that does not adversely affect the effects of the invention.

The quality enhancer of the invention may be in the form of a solid such as a powder or granules, or a solution. The quality enhancer in any of these forms is added at a desired stage of preparation of the tobaccos mentioned above. Addition of the tobacco quality enhancer gives roundness to the taste of a tobacco, so that a tobacco with an enhanced quality can be prepared.

The timing of addition of the tobacco quality enhancer is not limited. Also, the concentration of the enhancer in a tobacco can be suitably selected based on the concentration of sucralose in the tobacco of the invention.

The invention further provides a method for enhancing (increasing) the quality of a tobacco by adding the effective amount of sucralose to a tobacco, and a process for preparing a tobacco with an enhanced (increased) quality, comprising the step of adding the effective amount of sucralose.

V. Preservative and Food with Improved Quality of Taste

This aspect of the invention was accomplished based on the findings that addition of sucralose to a preservative to be added to a food improves a taste of the preservative, and that addition of sucralose to a food significantly improves a taste of the food.

The present invention provides:

(1) a food preservative with an improved taste, comprising sucralose; and (2) a food with an improved taste comprising sucralose.

(1) A Food Preservative Comprising Sucralose

Preservatives have been conventionally employed to inhibit putrefaction or deterioration caused by microorganisms, thereby preventing food poisoning and enhance storage stability of foods. However, some preservatives may impair tastes of foods by their own tastes or by combination with some types of foods. Such preservatives, even if having excellent preserving power, have limitations regarding application range and amount to be used.

The present invention was accomplished based on the finding that addition of sucralose to a specific food preservative masks the unpleasant taste specific to the preservative, and produces a preservative having an improved taste and no influence on the palatability (savoriness, taste) of the food containing the preservative.

Specific examples of food preservatives for use in the invention include sodium benzoate, potassium sorbate, propionic acid, sodium propionate, sodium dehydroacetate and other organic acids and their salts; butyl paraoxybenzoate, isobutyl paraoxybenzoate, propyl paraoxybenzoate and like organic acid esters; sodium sulfite, sodium hyposulfite, potassium pyrosulfite, sodium pyrosulfite, sulfur dioxide and like inorganic salts; hinokitiol, Japanese *styrax benzoin* extract, peptin extract and like plant extracts or plant decomposed products; and milt protein extract, E-polylysine glycine, chitosan and like proteins and their decomposed products.

The preservative for use in the invention may be a preservative which has been approved as a food additive by the ministry of health of Japan or other countries and which substantially serves to enhance storage stability of a food when added to the food. Thus, the preservative for use in the invention may be any of specified additives, known additives and general food and drink additives. Preferred examples include sodium acetate, glycine, chitosan, milt protein extract and $\epsilon$-polylysine. These preservatives have sweetness, astringency, harshness or other characteristic tastes, and therefore, when added to a food, influences the taste of the food. These food preservatives can be either singly or in combination.

The concentration of sucralose in the food preservative varies according to the type of the food preservative, and cannot be generalized. Usually, however, sucralose is added in a concentration of 0.001 to 10 parts by weight, preferably 0.005 to 10 parts by weight, per 100 parts by weight of the preservative. Use of the above amount of sucralose in combination of a preservative improves the taste of the preservative by masking or alleviating an unpleasant taste of the preservative. As a result, the preservative does not adversely affect the taste or savoriness of the food containing the preservative, and thus is applicable to a wide variety of foods.

The preservative of the invention comprises the above essential ingredients, and may further contains a sweetener other than sucralose, a flavor, a preservative, a stabilizer or like ingredient, within the range that does not adversely affect the effects of the invention.

The form of the preservative of the invention is not limited, and may be a solution in water or the like, a powder or granules obtained by spray-drying, or tablets prepared from the powder or granules.

The preservative of the invention can be used as mixed with a variety of oral compositions, in particular foods, according to the type of the food preservative used in the preservative of the invention.

The preservative of the invention is applicable to a wide variety of processed foods which need to contain a preservative, according to the type, properties and effects of the food preservative contained therein.

Examples of processed foods include a wide variety of processed foods such as chawan-mushi (steamed egg custard), tamago-dofu (chilled egg custard), custard puddings, custard creams, atsuyaki tamago (thick fried egg) and other egg products; processed animal and aquatic products (such as fish paste products, canned products, salt cured products); flour pastes; pickles vegetables and pickled fish; ready-to-eat dishes; margarines, cheeses, yogurts, butters and other milk products; soy sauces, misos, sauces, ketchups, mayonnaises and other seasonings; carbonated beverages, coffees, soft drinks, milk coffee and other milk beverages, lactic acid bacteria beverages, nutritional beverages, soybean milk beverages and other beverages; candies, gums, tableted confections, gummy candies, snack foods and other confections, jellies, annin dofu, mousses, yogurts and other dessert foods; cakes, cookies, manju and other Japanese and Western confections; ice creams, sherbets and other cold sweets; breads, rice cakes and instant rices, udon, ramen, pastas and other starch foods; instant soups, potages and other soups and instant powdered soups; and tofu, abura-age (fried tofu) including usu-age (thin fried tofu) and atsu-age (thick fried tofu), ganmodoki (tofu-based fried dish), yuba (soybean curd film) and other tofu processed foods.

By addition of the preservative of the invention, the above foods can be prepared as highly preservable foods which are significantly protected from putrefaction or the like caused by growth of microorganisms, without influence on the tastes of the foods. To obtain such a food, the timing, order and other factors of addition of sucralose and a food preservative are not limited, as long as the final product contains sucralose and the food preservative, in particular sodium acetate, glycine, chitosan, milt protein extract or ε-polylysine. Also, the method of addition of these ingredients is not limited, and each of them may be added in the form of a solid such as a powder or granules, or a solution.

For achieving the effects of the invention, the concentration of the preservative of the invention in a food varies according to the type of the food and the type and amount of protein material contained in the food, and cannot be generalized. A person of skill in the art would be able to adjust the amount suitably according to desired preserving effects. Since the sweetness of sucralose is clearly felt when sucralose is contained in a concentration of 0.0006 wt. % or more, a concentration of 0.0006 wt. % or more can be employed when sucralose is intended to serve also as a sweetener. Alternatively, sucralose can be used in a concentration less than 0.0006 wt. % when a reduced sweetness is desired. Suitable adjustment of the amount is well within the ordinary skill level in the art.

According to the invention, sucralose is added so that an unpleasant taste caused by a food preservative can be significantly masked without impairing the preserving effect of the food preservative. Therefore, the preservative of the invention is applicable to a wide variety of foods, as a preservative without influence on tastes of foods.

The invention also provides a novel use of sucralose as a taste improving agent for a food preservative. The taste improving agent comprises at least sucralose, and may contain a sweetener other than sucralose, a flavor, a preservative, a stabilizer or like ingredient, within the range that does not adversely affect the effects of the invention.

The food preservative taste improving agent of the invention may be in the form of a solid such as a powder or granules, or a solution. The agent in any of these forms can be used in combination with any of the food preservatives mentioned above. Addition of the taste improving agent significantly masks unpleasant tastes characteristic of food preservatives, so that the resulting food preservatives are applicable to all types of foods, without limitations caused by the unpleasant tastes characteristics of food preservatives.

The amount of the taste improving agent to be added to a food preservative is suitably selected based on the concentration of sucralose in a food preservative described above.

The invention also provides a method for improving a taste of a food preservative by adding the above effective amount of sucralose to a food preservative, and a process for preparing a food preservative with an improved taste, comprising the step of adding the effective amount of sucralose.

(2) General Foods

The present invention was accomplished based on the finding that addition of sucralose to a food improves a taste of the food, brings out an inherent taste of the food, and alleviates an undesirable taste, to thereby enhance the overall tastiness of the food; and the finding that the above effects can be achieved by use of sucralose within a concentration range within which sucralose does not exhibit its sweetener effect.

To obtain the food with an improved taste of the invention, the timing, order and other factors of addition of sucralose are not limited, as long as the final product contains sucralose. Also, the method for addition of sucralose is not limited, and sucralose may be added in the form of a solid such as a powder or granules, or a solution.

For achieving the effects of the invention, the amount of sucralose to be added to a food varies according to the type of food and other factors, and cannot be generalized. Usually, however, the concentration of sucralose is 0.00001 to 0.5 wt. %, preferably 0.0001 to 0.1 wt. %, based on the food. The sweetness of sucralose is felt when sucralose is contained in a concentration of 0.0006 wt. % or more, in the case of an aqueous solution. Therefore, a concentration of 0.0006 wt. % or more can be employed when sucralose is intended to serve also as a sweetener, and used in a concentration less than 0.0006 wt. % when a reduced sweetness is desired. Suitable adjustment of the amount is well within the ordinary skill level in the art.

According to the invention, a taste of a food is significantly improved, an inherent taste of the food is brought out and enhanced, and an undesirable taste is alleviated, thereby providing a food improved in overall tastiness. Further, according to the invention, undesirable flavors caused by minerals or vitamins contained in the food is masked, and when the food contains a common salt or potassium salt, the food will have a round and high-quality taste, with an enhanced salt flavor, suppressed salty edge and masked bitterness. Especially in a food containing a common salt, a pleasant sweetness is further enhanced, giving a more palatable food.

The food of the invention may contain any other sweeteners in combination with sucralose. Further, any other edible ingredients that enhance flavors of foods, such as vitamin C and flavonoids are also usable.

The food with an improved taste according to the invention may be any type of food. Sucralose may be added to an ingredient of a food, may be added during the production process of a food, or may be sprinkled over a food produced. Alternatively, a food or preparation containing sucralose can be ingested together with another food. Namely, the timing, order and other factors of addition of sucralose to a food are not limited as long as the food is ingested together with sucralose.

Specific examples of foods with an improved taste according to the invention include foods comprising at least one of the following foods; foods prepared using, as an ingredient, at least one of the following foods; and foods comprising at least one of the following foods.

(2-1). Agricultural Foods and Processed Agricultural Foods:

whole brown rice, half-milled rice, 70 percent-milled rice, wholly milled rice, milled rice with embryo, indica type rice, enriched rice, porridge, precooked rice, rice cake, sekihan (rice boiled with red beans), bifun (rice vermicelli), rice koji (fermented rice), soba (buckwheat noodle), corn, popcorn, cornflakes, cornmeal, oats, millet, adlay, Japanese barnyard millet, sorghum, rye, Jerusalem artichoke, potato, sweet potato, Chinese yam, taro, konjac, chestnut, oatmeal, Quaker oatmeal, barley, millet, wheat, starches (such as potato starch, kuzu starch, cornstarch, tapioca, joshinko, shiratamako), starch noodles (such as harusame (thin potato starch noodle) and kuzukiri (arrowroot noodle))

White bread, hardtack, French bread, rye bread, raisin bread, roll, croissant, bread crumbs, kashipan (pastry with filling and flavor), anpan (azuki bean jam-filled bun), cream-filled bun, jam-filled bun, chocolate cream-filled cornet, Danish pastry, pancake, udon, dried udon, somen (fine white wheat noodle), hiyamugi (thin white wheat noodle), Chinese noodle, instant ramen, non-fried noodles, cup noodle, pasta, macaroni, spaghetti, fu (gluten cake), nama-fu (fresh gluten cake), yaki-fu (roasted gluten cake), chikuwa-fu (steamed wheat cake), wheat germ, pickle, cooked beans, natto (fermented soybeans), frozen tofu, tofu, enoki mushroom rice seasoning, processed edible wild plant, seasoned mianma (bamboo shoot), jam, marmalade, peanut butter, peanut cream, canned tomato, salad, canned food ingredient, frozen vegetable, potato processed product, fruits including *akebia*, acerola, avocado, apricot, strawberry, fig, iyokan (*Citrus iyo*), ume (Japanese apricot), olive, orange, kaki (Japanese persimmon), kabosu lime, Chinese quince, kiwi fruit, kumquat, guava, goumi, grapefruit, cherry, pomegranate, sanboukan (*Citrus sulcata*), shekwasha, watermelon, sudachi (*Citrus sudachi*), plum, sour orange, cherimoya, durian, pear, Japanese summer orange, Hyuganatsu (*Citrus tamurana*), loquat, feijoa, nectarine, pineapple, hassaku orange, passion fruit, banana, papaya, loquat, grape, blueberry, pummelo, ponkan mandarin, oriental melon, mango, mangosteen, satsuma mandarin, kiyomi orange, seminole, melon, peach, bayberry, yuzu (*Citrus junos*), western pear, litchi, lime, raspberry, longan, apple, lemon, beans including azuki bean, kidney bean, common pea, cowpea, broad bean, soybean, cooked soybean, chickpea, lima bean, lentil, green gram, tofu (such as silken tofu, regular tofu, soft tofu or packed tofu), roasted tofu, namaage (thick fried tofu), abura-age, ganmodoki, frozen tofu, natto, Tempeh, soybean flour, miso (such as rice miso, barley miso, bean miso, kinzanji-miso), okara (bean curd residue), soybean milk, modified soybean milk, yuba (such as raw yuba or dried yuba), chickpea, almond, hemp seed, cashew nut, pumpkin seed, *ginkgo* nut, chestnut, walnut, poppy seed, coconut, sesame, sesame paste, lotus seed, pistachio, sunflower seed, hazelnut, pecan, macadamia nut, pine seed, peanut, mushrooms including enokidake (*Flammulina velutipes* Sing.), kikurage (Jew's-ear), shiitake (*Lentinus edodes* Sing.), buna-shimeji (*Hypsizigus marmoreus* (Peck) Bigelow), hon-shimeji (*Lyophyllum aggregatum* Kuhner), hatake-shimeji (*Lyophyllum decastes* (Fr.:Fr.) Sing.), nameko (*Kuehneromyces nameko* S, Ito), hatsutake (*Lactarius hatsudake* Tanaka), hiratake (*Pleurotus ostreatus* (Jacq.:Fr.) Kummer), fukurotake (*Volvariella volvacea* (Bull.:Fr.) Sing.), maitake (*Grifola frondosa* S. F. Gray), champignon, matsutake (*Tricholoma matsutake* Sing.)

vegetables including artichoke, chive, ashitaba (*Angelica keiskei*), asparagus, udo (*Aralia cordata*), young soybean pod, osaka shirona (nonheading *brassica* leafy vegetable), saltwort, okra, radish sprout, turnip, pumpkin, brown mustard, cauliflower, kanpyo (dried gourd strip), *chrysanthemum*, cabbage, cucumber, kyona (*Brassica campestris*), Chinese celery, green pea, watercress, arrowhead, kohlrabi, burdock, komatsuna (*Brassica campestris* var, *rapa*), konjac, zasai (Chinese pickle), sweet potato, taro, kidney bean, green pea, lettuce, santosai (Chinese non-heading cabbage), shishi-togarashi (*Capsicum annuum* var *angulosum*), perilla, potato, garland *chrysanthemum*, purple-wan dock shield, ginger, oriental pickling melon, zuiki (taro stem), sugukina (Japanese pickling turnip), zucchini, water dropwort, celeriac, celery, zenmai (*Osmunda japonica*), broad bean, taasai (Chinese flat cabbage), daikon radish, taisai (Chinese white cabbage), takana (broad leaved mustard), bamboo shoot, onion, taranome (*angelica* tree bud), chicory, pak-choy, tsukushi (fern-ally), non-heading *brassica* leafy vegetables, New Zealand spinach, malabar spinach, leopard plant, capsicum, wax gourd, corn, tomato, summey cypress, eggplant, flowering rape, rape, Balsam pear, Chinese chive, carrot, garlic, garlic shoot, Japanese bunching onion, nozawana (*Brassica rapa* L.), Chinese garlic, Chinese cabbage, lotus root, parsley, flowering Chinese chive, chayote, table beet, sweet pepper, hinona (radish-shaped pickling turnip), hiroshima pot-herb mustard, Japanese butterbur, Japanese butterbur sprout, leaf beet, broccoli, dishcloth gourd, spinach, horseradish, mitsuba (Japanese trefoil leaf), myoga (Japanese wild ginger), Brussels sprout, bean sprout, Jaw's marrow, yamagobo (*Cirsium dipsacolepis*), Japanese yam (such as icho-imo, jinenjo or naga-imo), bottle gourd, lily bulb, yomena (*Kalimeris yomena*), mugwort, scallion, radish, leek, rhubarb, lettuce, wakegi onion, Japanese horseradish and bracken; as raw vegetables, salted pickles, rice bran pickles, mustard pickles, shibazuke pickles, vinegar-dressed foods, stewed foods, roasted foods, steamed foods, dried foods, powdered foods or Korean pickles sea weeds including green layer, akamoku (a species of gulfweed), sea oak, spontaneous purpole layer, egonori (*Campylaephora hypnaeoides*), ogonori (*Gracilaria verrucosa*), tangle, suizenji-nori (*Phylloderma sacrum*), ceylon moss, tosakanori (*Meristotheca papulosa*), amanori (*Porphyra* sp.), hijiki (*Hizikia fusiformis*), hitoegusa (*Monostroma nitidum*), funori (*Gloiopeltis* sp.), gulfweed, makusa (*Gelidiium amanshii*), mozuku (*Nemacystus decipiens*), wakame (*Undaria pinnatifida*), shiro-miru and ao-miru (both are species of *Codium fragile*), (2-2). Milk and Oil Products:

Milk, raw milk, processed milk, low fat milk, milk beverage (such as coffee milk beverage or fruit milk beverage), cream, fat-substituted cream, coffee whitener, fermented milk, lactic acid bacteria beverage, yogurt, skim milk powder, formulated milk powder, non-sweetened condensed milk, sweetened condensed milk, cheese (Edam, Emmental, cottage cheese, Camembert, cream cheese, Gouda, Cheddar, Parmesan, blue cheese, Gruyere, mascarpone, mozzarella, Roquefort, pizza cheese, processed cheese, cheese spread, cheese food, processed cheese, natural cheese, cheese spread, cheese fondue, ice cream, ice milk, lacto-ice, soft cream, sherbet, butter, margarine, fat spread, raw cream, coffee cream, bottled cream, cream portion pack, instant creamy powder, infant formulated milk powder, vegetable oils including soybean oil, rapeseed oil, cottonseed oil, sesame oil, safflower oil, corn oil, sunflower oil, coconut oil, olive oil, rice bran oil, oil mixture, animal oils including beef tarrow, lard, shortening, margarine, fat spread, butter, fish oil, whale oil, (2-3). Red Meat, Processed Animal Product and the Like:

duck, boar, rabbit, beef (shoulder, shoulder roast, rib roast, sirloin, rump, fillet, plate, shank, round, outside round, tail) (with or without fat portions), pork, pork leg, quail, horse, frog, wild duck, pheasant, deer, whale, turkey, sparrow, soft shelled turtle, chicken (wing, breast, leg, white breast meat) (with or without skin), skin, pigeon, guinea fowl, copper pheasant, insects, roast pork, bacon, shoulder bacon, ham, sausages (dry sausage, semi-dry sausage, bologna, frankfurter, wienerwurst), liver paste, gelatin, mutton, lamb, goat, eggs (duck egg, pitan (thousand-year-old egg), quail egg, chicken egg), tamago-dofu (chilled egg custard), dashimaki-tamago (rolled omelet), variety meats including tongue, heart, lever, kidney, stomach and intestines, tail, gizzard, corned beef, canned processed meat, grilled meat, roast beef (2-4). Fish Meat and Processed Aquatic Product:

meats and organ meats of fat greenling, akauo (red fish), red rockfish, conger eel, red pandora, horse mackerel, blanquillos, oposum shrimp, sweet fish, angelfish, cuttlefish, squid, sandeel, grunt, butterfly bream, parrot bass, butterfish, sardine, bull trout, Japanese dace, eel, sea urchin, filefish, ray, prawn, shrimp, lobster, pale club, krill, devil stinger, halibut, marbled rock fish, sculpin, marlin, sword fish, bonito, lepidotrigla, crabs (hairy crab, wary crab, king crab, blue crab), barracuda, flatfish, greater amberjack, yellow croaker, sand borer, channel rockfish, blue sprat, kyuuriuo (*Osmerus eperlanus*), caviar, sable fish, red bream, croaker, jellyfish, carp, flathead, gizzard shad, salmon (including roe, egg and mefun (salted salmon guts)), sappa (*Harengula zunasi*), mackerel, shark, halfbeak, crayfish, Spanish mackerel, Pacific saury, dolphin-fish, shishamo (*Spirinchus lanceolatus*), tongue sole, mantis shrimp, yellow jack, Japanese icefish, Japanese seabass, grass carp, sea bream, yellow-striped butterfish, octopus, hairtail, cod (including roe, milt and egg), loach, flying fish, sea cucumber, catfish, nigoi (*Hemibarbus labeo*), rainbow trout, pacific herring (including herring roe), goby, standfish, pike conger, hiramasa (*Seriola lalandi*), bastard halibut, puffer, crusian carp, yellowtail, black bass, gurnard, firefly squid, atka mackerel, sea squirt, mullet, tuna, trouts, butter fish, bluefish, mejina (*Girella*), black rockfish, hake, moroko (*Gnathopogon caerulescens*), cornetfish, lamprey, yamame (*Oncorhynchus*), pond smelt sliced raw fish, fish paste, stewed fish, roast fish, preserved fish boiled in soy, fish boiled in starch syrup, sweet vinegar marinated fish, salted fish, smoked fish, half-dried fish, whole-dried fish, dried sardine, canned water-boiled fish, canned seasoned fish, canned oil-marinated fish, fish flakes, shira-yaki (fish grilled without sauce), kaba-yaki (fish grilled with sweetened sauce), shiokara (salted fish guts), surume (dried squid or cuttlefish), sakiika (torn squid or cuttlefish), smoked fish, niboshi (dried small sardines), shirasu-boshi (dried young sardines), dried young anchovies, tatami-iwashi (anchovy sheet), mirin-boshi (dried fish sweetened with mirin), salted anchovy, half-dried bonito, dried bonito, kakuni (diced and stewed food) of bonito, shellfishes including surf clam, ark shell, razor shell, short-neck clam, abalone, sakhalin surf clam, escargot, oyster, top shell, corb shell, peu shell, vivipara, whelk, ear shell, egg cockle clam, nagarami (snail), ivory shell, hen clam, bateira, hard clam, scallop, sakhalin surf clam, razor clam, trough shell, mussel, mogai (*Anadara*), their adductors, as raw foods, tsukudani, water-boiled foods or boiled and dried foods, (2-5). Confection:

amanatto (sweetened azuki beans), raw yatsuyashi (Japanese traditional sweet) containing azuki bean jam, imagawa-yaki (Japanese muffin containing azuki bean jam), uirou (azuki bean jelly), uguisu-mochi (rice cake sprinkled with green soybean flour), kashiwa-mochi (rice cake wrapped in an oak leaf), kasutera, kanoko (rice cake with azuki beans), karukan (steamed cake made from rice and yam flour), kibi-dango (millet dumpling), gyuuhi (sweet rice flour paste), kiri-zansho (rice cake flavored with Japanese pepper), kingyokuto (Japanese sweet agar jelly), kintsuba (Japanese cake with sweet filling), kusa-mochi (rice flour dumpling mixed with mugwort), kushi-dango (dumplings on a bamboo skewer), sakura-mochi (rice cake wrapped in a pickled cherry leaf), daifuku-mochi (soft rice cake with azuki bean jam), chimaki (cake wrapped in bamboo leaf), chatsu (green tea-containing cake), dora-yaki (bean jam pancake), nerikiri (shaped bean paste), manju (steamed azuki bean jam-filled bun), monaka (bean jam filled wafer), yubeshi (soft rice cake), yokan (jelled azuki bean paste, azuki bean jelly, steamed azuki bean paste), candy, fried sweet potato stick, okoshi (dry cake made of rice or millet and starch syrup), karinto (fried dough cookies), gokabo (stick-shaped confectionery made of rice and soy beans), shiogama (white cake made from rice powder and sugar), hina-arare (small rice crackers of various colors), bolo (small round cookie), matsukaze (cake sprinkled with poppy seeds), bean confections, yatsuhashi, rakugan (pressed dry sweet made from sugar and flour), senbei (rice cracker), rice confections [including arare (small rice crackers), fried senbei, amakara senbei (senbei with sweetened soy sauce) salt senbei], apple pie, custard pudding, cupcake, cream puff, shortcake, jelly, doughnut, bavarois, marron glacé, meat pie, milk pudding, waffle, wafer, cracker, sablé, snack food (such as potato chip, fabricated potato product, potato shoestring and like potato snack food, corn snack food, wheat snack food, rice snack food, etc.), puff pie, biscuit, cookie, Russian cake, caramel, tablet confection, jelly candy, jellybean, China marble, drop, nougat, butterscotch, brittle, marshmallow, chocolate, chocolate confection, chewing gum, Chinese confection [such as geppei (Chinese cake filled with bean jam, egg yolk and dried fruits), Chinese cookie, or Chinese steamed bun], sweet pie, pretzel, semi-baked cake, chocolate cake, candy, menthol candy, throat candy, herb candy, oral refreshment, caramel, gummy candy, nut, bean confection, toy snack, jelly confection, karinto, amanatto, mixed confection, wafer confection, marshmallow, mint tablet confection, (2-6). Seasonings:

sugars (white superior soft sugar, soft brown sugar, brown sugar, wasanbon-toh, granulated sugar, cube sugar, rock candy sugar, coffee sugar, powder sugar), glucose syrup, honey, maple syrup, soy sauces (regular soy sauce, light soy sauce, tamari soy sauce, low sodium soy sauce, reduced sodium soy sauce, dashi (kelp- and bonito flake-based broth) soy sauce, vinegars (grain vinegar, rice vinegar, fruit vinegar, pon-zu (citron vinegar), wine vinegar, processing vinegar), sauces (Worcester sauce, mild rich sauce, rich sauce, sauce for okonomiyaki (pan cake with vegetables, meat or seafood), sauce for yakisoba (fried Chinese noodles), oyster sauce, steak sauce, pepper sauce), dashi mix (powder, liquid, solid), Chinese seasoning, tomato ketchup, chili sauce, hashed roux, pizza sauce, stew roux, curry roux, dressing, dressing seasoning, mayonnaise, mentsuyu (noodle soup), mirin (Japanese sweet rice wine for cooking), mirin-like seasoning, fermented seasoning, flavor seasoning, edible oil, olive oil, sesame oil, miso (fermented soybean paste), tsuyu mix (soup stock), processed tomato product, tare (dipping sauce) for grilled meat, tare for shabu shabu (very thin slice of beef cooked in hot water), tare for sukiyaki (thin slice of beef cooked in a heavy iron pan with various vegetables and tofu), pure curry, consomme, bouillon, nucleic acid-containing seasoning, asazuke-no-moto (seasoning mix for preparing lightly pickled vegetables), ramen soup, udon (thick white wheat noodle) soup, boiled-bone broth, (2-7). Spices:

allspice, onion powder, karashi (Japanese mustard), garlic, curry, clove, pepper, Japanese pepper, cinnamon, ginger, sage, thyme, chili powder, red pepper, nutmeg, paprika, pepper sauce, mustard, Chinese chili oil, horseradish, yeast, sake lees, (2-8). Prepared and Processed Foods:

curry (canned, retort pouched), corn cream soup, cone potage, stew, mix for Ma Po Tofu, meat sauce, spring roll, hot dog rolls, tamago tofu (egg cooked in the form of bean curd), oven toaster food, microwave food, baby food, fried egg (eggroll?), hamburger, chicken nugget, fried potato, shake, fried chicken, bento (packed lunch), daily dishes, snack noodle, raw snack noodle, instant noodle, raw noodle, dried noodle, pasta, retort pouched rice, aseptically packaged steamed rice, zosui (porridge of rice and vegetables), gruel, packaged rice cake, Chinese steamed bun, cereal food, premixed powder (sugar-free), okonomiyaki mix, premixed powder (sweetened), rice vermicelli, nutrient-balanced food (solid), instant curry, canned curry, retort pouched curry, pasta sauce, seasoning mix for a specific dish, mix for sushi, mix for kamameshi (Japanese pilaf cooked in a small pot), mix for donburi (rise-based dishes served in a bowl), mix for oden (Japanese hotchpotch boiled in kelp-based broth seasoned with soy sauce, etc.), ochazuke (topping for steamed rice soaked in hot, green tea), furikake (a mixture of dried fish and/or vegetable flakes for sprinkling on steamed rice), mix for omusubi (rice ball), mix for zosui (porridge of rice and vegetables), pizza sauce, Western sauce, instant stew, retort pouched stew, instant hashed beef, retort pouched hashed beef, mix for fried rice, frozen and chilled foods (thick white wheat noodle, shrimp gratin, shrimp doria, shrimp pilaf, fried prawn, gyoza (fried or boiled dumpling), fried rice, croquette, shaomai (steamed meat dumpling), karaage (fly with flour), pie sheet, hamburger, French fried potato, mixed pizza, mixed vegetable, meatball, mince cutlet, toasted rice ball, cutlet, gratin, tempura (Japanese deep-fried food), okonomiyaki (pan cake with vegetables, meat or seafood), takoyaki (spherical fried batter containing diced pieces of octopus), fried seafood, chawanmushi (steamed egg custard), noodle, cooked rice and pilaf, pizza pie), soups (cooking soup, instant soup, cup soup, retort pouched soup, canned soup, frozen soup, chilled soup, soup with wakame (an edible sea vegetable), Chinese soup, canned soup for vendors, egg soup, instant miso soup), (2-9). Sweeteners:

sugar, fructose, honey, starch sugar, isomerized liquid sugar, maltose, maltitol, trehalose, fructooligosaccharide, maltooligosaccharide, palatinose, reduced palatinose, coupling sugar, aspartame, saccharin, cyclamate, neotame, licorice, sodium glycyrrhizinate, stevia, monellin, thaumatin, acesulfam-K, dulcin, sodium cyclamate, sorbitol, glycocoll, D-tryptophan, L-leucine sodium, trimethylamine oxide, betaine, L-glutamine amide, (2-10). Beverages:

fruit beverages such as natural fruit juice, fruit juice beverage, fruit juice-containing soft drink, honey beverage, diluted beverage, granular fruit-containing beverage, fruit pulp beverage, tomato beverage, vegetable beverage, vegetable-containing mixed fruit beverage, fruit water, and granular fruit-containing soft drink, carbonated beverages such as coke-flavored beverage, clear carbonated beverage, ramune (lemon soda) flavored beverage, low-alcohol fruit juice-containing carbonated beverage, fruit colored carbonated beverage, low fruit juice content carbonated beverage, ginger ale, milk-containing carbonated beverage, wine-like fruit juice-containing carbonated beverage, high fruit juice content carbonated beverage, and fruit juice-containing carbonated beverage, milky beverages such as milk for drinking, pasteurized milk, milk beverage, high fat beverage, low fat beverage, dairy product lactic acid bacteria beverage, lactic acid bacteria beverage, pasteurized dairy product lactic acid bacteria beverage (conc.), pasteurized dairy product lactic acid bacteria beverage (straight), LL milk for drinking, and milk-containing soft drink, refreshment beverages such as green teas (gyokuro (high-quality green tea), maccha (green powdered tea), sen-cha (ordinary green tea), ban-cha (coarse tea), hoji-cha (roasted tea), genmai-cha (a blend of green tea and roasted brown rice), oolong tea, black tea, mate tea, kelp tea, mugi-cha (roasted barley tea), tochu-cha (gutta percha tea), herb tea, galenical component-blended tea, amazake (sweet sake), cocoa, coffee, coffee beverage, shiruko (sweet azuki bean soup with rice cake), non-alcoholic beer, jelly beverage, and Vermont drink, healthy beverages such as dietary drink, isotonic drink, soybean milk, vinegar drink, malt drink, functional drink, vitamin supplement drink, and mineral supplement drink, alcoholic beverages such as seishu (refined sake), namazake (unpasteurized sake), shochu (Japanese distilled spirits; two types, ko and otsu), chu-hai (a mixture of shochu, lime juice and soda water), whisky, brandy, beer, 100% malt beer, dry beer, imported beer, light beer, new spirit, spirit, wine, cocktail, foreign liquor diluted with water, sparkling liquor, plum liquor, white sake, medicinal liqueur, other beverages such as mineral water, sour drink, dietary beverage, tonic water, carbonated water, and near water (soft drink similar to water), (2-11). Desserts chilled pudding, chilled jelly, daily dessert, plain yoghurt, hard yoghurt, soft yoghurt, yoghurt drink, frozen yoghurt, ice cream, high-grade ice cream, assorted ice creams, mini jelly, Western packaged dessert, dessert base (retort pouched), dessert base (powder), Japanese dessert, frozen cake, homemade-type dessert, fruit sherbet, dessert with nata de coco, retort pouched shiruko (sweet azuki bean soup with rice cake), retort pouched zenzai (sweet thick azuki bean soup with rice cake), dry jelly, (2-12). Other Foods:
oral drugs, oral quasi-drugs, dog foods, cat foods.

The present invention provides new use of sucralose as a taste improver for improving the taste of foods. The taste improver comprises at least sucralose and may further contain other sweeteners than sucralose, flavors, preservatives, stabilizers and like other components, unless they lessen the effects of the present invention.

Further, the present invention provides a method for improving the taste of foods, which comprises incorporating the effective amount of sucralose into the aforementioned various foods, and a process for producing taste-improved foods, which comprises incorporating said effective amount of sucralose into the foods.

VI. Flavor Compositions with Improved Flavors

Flavors such as menthol and spearmint are incorporated into chewing gums, candies and like confectionery products, mouthwash solutions and dentifrices to provide cool refreshing flavor. However, most of the products provide cool flavor and aspirated air refreshment for the first several minutes, after which such effects decline with time, thus failing to provide cool flavor and aspirated air refreshment for a long time. There has been an attempt to enhance cooling effect and aspirated air refreshing effect by increasing the amount of flavor to be used. However, if the amount of menthol exceeds 3%, methanol itself brings out bitterness and there arise problems of acridity and bitterness derived from the flavor component contained in the flavor. Therefore, such products are particularly unsuitable for oral use. Especially in the case of gums, a flavor, if used in a large amount, causes essential oil to plasticize the gum base, whereby texture (eating characteristics) and consistency will change, thus being undesirable.

The present invention has been accomplished based on the finding that addition of sucralose to a flavor component such as menthol or carvone enhances flavors (aroma, cool flavor, refreshing flavor) of the flavor component, so that even a low amount of the flavor component can provide a flavor composition with improved flavor.

Menthols usable in the present invention include l-menthol, d-menthol and d,l-menthol. Preferred is l-menthol. Carvones usable in the present invention include l-carvone, d-carvone and d,l-carvone. Preferred is l-carvone. As menthol or carvone of the invention, l-menthol or l-carvone may be used as it is or an essential oil containing each component such as peppermint, Japanese mint or spearmint may be used. The flavor components may be used singly or in combination of two or more.

The flavor composition according to the present invention may be any of the compositions containing menthol or carvone (spearmint). Preferred are compositions prepared by incorporating menthol or carvone (or spearmint) with the purpose of providing enhanced cool flavor and refreshing flavor, based on the flavor unique to the flavor component.

Such flavor compositions include, for example, confections such as chewing gums and like gums, hard or soft candies, gummi and like candies, and chocolates; beverages such as herb teas; alcoholic beverages such as liqueurs; cleaning or refreshing compositions for oral cavity such as mouth washes, dental cream toothpastes, liquid toothpastes, mouthwashes, dental rinses, mouth sprays and gingival massage; drugs such as antibacterial disinfectants for oral cavity or throat, oral liquids, nasal drops, oral ointments and oral pasta; quasi-drugs and cosmetics such as lip creams, cosmetic preparations, body powders, body shampoos, hair shampoos and rinses.

Preferred are oral compositions such as the above-mentioned chewing gums, candies, beverages, chocolates and like foods; mouth washes, toothpastes, mouthwashes, mouth sprays or like compositions for oral cavity; antibacterial disinfectants for oral cavity or throat, oral liquids, nasal drops and like drugs; and lip creams and like cosmetics.

For preparation of a variety of compositions of the invention, insofar as the final products comprise sucralose and either menthol or carvone, the timing and order of addition of these components are not critical. The method for adding these components is not critical, either. Sucralose may be used in the form of a solid such as a powder or granules, or in the form of a solution.

The amount of sucralose to be added to the flavor composition is not particularly limited, insofar as it is effective in enhancing flavors (cool flavor, refreshing flavor, etc.) of the flavor component contained in the flavor composition. The amount may be suitably selected depending on the kind of flavor composition and the kind and amount of flavor component contained therein. Although not restricted, the amount of sucralose may be suitably selected from, for example, 0.00001 to 0.2% by weight, preferably 0.0001 to 0.05% by weight, based on 100% by weight of the flavor composition. The sweetness of sucralose itself becomes prominent in a concentration of about 0.0006% by weight or higher. Accordingly, when a low sweetness is desired, sucralose may be used below the above concentration. Such amount can optionally be adjusted by a person of skill in the art within the ordinary skill level in the art.

According to the present invention, addition of sucralose enhances flavor of menthol, carvone or the like contained in the composition, and thus provides flavor compositions with significantly improved cool flavor and refreshing flavor unique to the flavor. Accordingly, even a reduced amount of the flavor component can provide the contemplated long-term cool flavor and refreshing flavor, so that comfortable use can be ensured without the necessity of using a large amount of the flavor component which would cause disadvantages (e.g., acridity, bitterness). Sucralose, which is a non-cariogenic low-calory sweetener, functions also as a sweetener or a taste modifier in confections such as chewing gums and candies, and compositions for oral cavity such as mouthwashes and mouth sprays, thus being valuable in this respect, also.

The flavor composition of the present invention may contain other optional components usually used in this type of composition, unless they lessen the effects of the present invention. The optional components may be suitably selected depending on the type and form of the composition.

The present invention provides new use of sucralose as a flavor enhancer for enhancing cool flavor of the flavor component such as menthol or carvone. The enhancer comprises at least sucralose and may further contain other sweeteners than sucralose, flavors, preservatives, stabilizers and like other components, unless they lessen the effects of the present invention.

The enhancer of the present invention may be in the form of a solid such as a powder or granules, or in the form of a solution. The enhancer is added in any of these forms to the above-mentioned various compositions at any stage in the preparation process. The addition of the enhancer can enhance flavors of menthol and mints contained in the compositions, especially oral compositions such as foods, mouthwash solutions and like compositions for oral cavity, so that flavor compositions with improved cool flavor and refreshing flavor after use can be prepared or obtained.

The timing of addition of the enhancer is not particularly limited. The amount of the enhancer to be added to the composition can be suitably selected based on the aforementioned amount of sucralose to be added to the flavor composition of the invention or the amount of sucralose to be added to menthol or the like.

Further, the present invention provides a method for enhancing flavor of flavor compositions, which comprises incorporating the effective amount of sucralose into the aforementioned various flavor compositions, and a process for producing flavor compositions with improved flavors, which comprises incorporating said effective amount of sucralose into the flavor compositions.

EXAMPLES

The following examples illustrate the several aspects I~VI of the present invention in further detail. It should, however, be understood that the metes and bounds of the invention are by no means defined by these examples. In the following examples, all parts or percents (%) are parts by weight and % by weight, respectively, unless otherwise specified. Furthermore, the formulating ratios of various ingredients shown for each formulation are in terms of parts by weight unless otherwise indicated. In each formulation, the * mark denotes the product of SAN-EI GEN F.F.I., INC.

Example 1

Sweetening Compositions

Example (I-1-1) Fructose-Containing Sweetening Composition

To aliquots of a 10% aqueous solution of fructose (room temperature) was added sucralose at final concentrations of 0%, 0.0002%, 0.0004% and 0.0006%, and the resulting compositions were evaluated for the quality of sweetness. As a result, whereas a mild impact of sweetness followed by a sharp cut-off was noted at 0% sucralose, addition of sucralose resulted in the development of sucrose-like notes of sweetness with a body, ameliorating the sweetness of fructose. At formulating levels up to 0.0004%, sucralose caused substantially no potentiation of sweetness intensity but imparted a feeling of body.

Example (I-1-2) Fructose-Containing Sweetening Composition

To aliquots of a 10% aqueous solution of inverted sugar (fructose content 50%)(room temperature) was added sucralose at final concentrations of 0%, 0.0002%, 0.0004% and 0.0006%, and the resulting compositions were evaluated for the quality of sweetness. As a result, whereas a mild impact of sweetness followed by a sharp cut-off was noted at 0% sucralose, addition of sucralose resulted in the development of sucrose-like notes of sweetness with a body, ameliorating the sweetness of the fructose contained in the inverted sugar.

Example (I-1-3) Fructose-Containing Sweetening Composition

To aliquots of a 10% aqueous solution of a commercial honey (containing fructose)(room temperature) was added sucralose at final concentrations of 0%, 0.0002%, 0.0004% and 0.0006%, and the resulting compositions were evaluated for the quality of sweetness. As a result, whereas a mild impact of sweetness followed by a clear cut-off was noted at 0% sucralose, addition of sucralose resulted in the development of sucrose-like notes of sweetness with a body, ameliorating the sweetness of the fructose occurring in the honey.

Example (I-1-4) Fructose-Containing Sweetening Composition

| | |
|---|---|
| Fructose | 100.00 |
| Sucralose | 0.01 |

The above two ingredients were evenly blended in powdery state in a tank using an air jet to prepare a sweetening composition.

Example (I-1-5) Fructose-Containing Sweetening Composition

A spray dryer was charged with 100 parts by weight of fructose powder and an aqueous solution containing 1 part by weight of sucralose was sprayed against the powder to prepare a sweetening composition Example (I-1-6) Fructose-Containing Sweetening Composition

| | |
|---|---|
| Fructose | 50.000 |
| Sucralose | 0.002 |
| Water | Balance |
| Total | 100.000 |

The aqueous solution prepared according to the above recipe was freeze-dried to give a sweetening composition.

Example (I-1-7) Fructose-Containing Sweetening Composition

| | |
|---|---|
| Inverted sugar (fructose content 50%) | 100.00 |
| Sucralose | 0.02 |

The above two ingredients were evenly blended in powdery state in a tank using an air jet to prepare a sweetening composition.

Example (I-1-8) Fructose-Containing Sweetening Composition

| | |
|---|---|
| Fructose/glucose syrup | 100.00 |
| Sucralose | 0.01 |

The above two ingredients were evenly blended to prepare a liquid sweetening composition.

Example (I-1-9) Cocoa Milk Drink

| | |
|---|---|
| Cow's milk | 10.00 (kg) |
| Skim milk powder | 3.50 |
| Fructose | 5.50 |
| Sucralose | 0.00066 |
| Cocoa powder | 1.00 |
| Emulsifier | 0.45 |

| Flavor | 0.08 |
| Water | Balance |
| Total | 100.00 L |

The cocoa milk drink according to the above recipe gave a sucrose-like sweetness sensation with a body, thus being superior to a sucralose-free control cocoa milk drink.

Example (I-1-10) Sour Milk Drink

| Skim milk powder | 1.50 (kg) |
| Fructose | 2.50 |
| Sucralose | 0.000825 |
| Strawberry conc. juice | 0.22 |
| Sodium citrate | 0.32 |
| Emulsifier | 0.40 |
| Flavor | 0.12 |
| Water | Balance |
| Total | 100.00 L |

The sour milk drink (strawberry flavor) according to the above recipe gave a sucrose-like sweetness sensation with a body, thus being superior to a sucralose-free control sour milk drink.

Example (I-1-11) Powdered Green Tea-Milk Drink

| Cow's milk | 10.00 (kg) |
| Skim milk powder | 3.50 |
| Fructose | 5.80 |
| Sucralose | 0.00066 |
| Powdered green tea | 0.90 |
| Emulsifier | 0.48 |
| Flavor | 0.27 |
| Color additive | 0.03 |
| Water | Balance |
| Total | 100.00 L |

The powdered green tea-milk drink according to the above recipe gave a sucrose-like sweetness sensation with a body, thus being superior to a sucralose-free control powdered green tea-milk drink.

Example (I-1-12) Soft Drink

| Fructose | 3.700 (kg) |
| Fructose/glucose syrup | 8.000 |
| Sucralose | 0.000495 |
| DL-malic acid | 0.070 |
| Sodium citrate | 0.030 |
| Emulsifier | 0.052 |
| Flavor | 0.220 |
| Water | Balance |
| Total | 100.000 L |

The soft drink (apple flavor, juice-free) according to the above recipe gave a sucrose-like sweetness sensation with a body, thus being superior to a sucralose-free control soft drink.

Example (I-1-13) Banana Puree

To aliquots of a banana puree was added sucralose at final concentrations of %0%, 0.0002%, 0.0004% and 0.0006%, and the quality of sweetness of each composition was evaluated. As a result, a sucrose-like body developed in the sweetness on addition of sucralose so that a more delicious banana puree could be prepared as compared with control (sucralose 0%).

Example (I-1-14) Peach Juice

To aliquots of a peach juice was added sucralose at final concentrations of %0%, 0.0002%, 0.0004% and 0.0006%, and the quality of sweetness of each composition was evaluated. As a result, sweetness with a body developed on addition of sucralose to the juice so that a more delicious peach juice could be prepared as compared with control (peach juice).

Example (I-1-15) Ice Cream

| A: | Raw cream (milk fat 45%) | 8.8 |
| | Unsalted butter | 5.0 |
| | Starch syrup | 16.0 |
| | Water | 56.0 |
| B: | Skim milk powder | 6.5 |
| | Trehalose | 7.0 |
| | Sucralose | 0.0085 |
| | Stabilizer preparation | 0.3 |
| | (guar gum, locust bean gum, carrageenan) | |
| | Emulsifier preparation | 0.2 |
| | (glycerin fatty acid ester, sucrose fatty acid ester) | |

Ingredients A were blended, followed by addition of all ingredients B, and the whole was heated at 80° C. for 10 minutes and, then, made up to 100 parts with water. This mixture was homogenized with a homogenizer (150 kg/cm$^2$) and aged at 5° C. overnight. Then, 0.15 part of a flavor was added and the whole mixture was frozen (overrun 90%). As a result, an ice cream melting quickly in the mouth producing a milky palate-flattering sensation was obtained.

Example (I-1-16) Tare (Sauce) for Broiled Eel

| A: | Water | 10.0 |
| | D-sorbitol | 10.0 |
| | Thickener preparation | 0.3 |
| | (xanthan gum, guar gum) | |
| B: | Koikuchi soy | 38.0 |
| | Mirin | 20.0 |
| | Umami (ambrosian) essence | 2.0 |
| | Common salt | 1.8 |
| | Sodium L-glutamate | 1.45 |
| | Sodium inosinate | 0.025 |
| | Sodium guanylate | 0.025 |
| | Trehalose | 15.0 |
| | Sucralose | 0.01 |
| C: | Caramel color | 0.5 |
| | Onion color | 0.1 |
| | Flavor | 0.5 |

Ingredients A were blended and heated at 80° C. for 10 minutes. This was followed by addition of all ingredients B and the mixture was heated at 80° C. for 10 minutes. Then, components C were further added and the whole mixture was made up to 100 parts with water. This mixture was filled into a pouch and retort-sterilized at 120° C. for 20 minutes to prepare a tare (sauce) for broiled eel with good gloss and body.

Example (I-1-17) Dashimaki Egg

| Whole egg | 63.5 |
| Soup stock | 2.0 |
| Common salt | 0.2 |

| | | |
|---|---|---|
| Modified starch | 2.0 | |
| Gelling agent (gellan gum) | 0.3 | |
| Trehalose | 1.5 | |
| Fish soy condiment | 0.5 | |
| Sucralose | 0.0005 | |
| Water | Balance | |
| Total | 100.00 | |

According to the above recipe, dashimaki egg was made in the routine manner. The finished dashimaki egg was freezing-resistant and had an appetizing flavor.

Example (I-1-18) Hard Candy

| | | |
|---|---|---|
| A: | Starch syrup | 80.0 |
| | Sugar | 60.0 |
| | Trehalose | 60.0 |
| | Water | 40.0 |
| B: | Citric acid | 2.0 |
| | Sucralose | 0.05 |
| | Flavor | 0.5 |
| | Color | 0.1 |

Ingredients A were blended and concentrated by boiling at 150° C. After cooling to 140° C., all ingredients B were added and the mixture was poured into molds and allowed to solidify. As a result, hard candies easy to bite into pieces and having a refreshing flavor were obtained.

Example (I-1-19) Hard Candy

| | |
|---|---|
| Trehalose | 70.00 (g) |
| Starch syrup (water content 25%) | 40.00 |
| Water | 20.00 |
| Sucralose (20% aq. solution) | 0.38 |

According to the above recipe, all ingredients were blended and concentrated slowly up to 150° C. (total weight 100 g). After cooling to 140° C. and following addition of a color and a flavor where necessary, the mixture was poured into molds and allowed to solidify to give hard candies according to the invention. As control, 70 g of granulated sugar was used in lieu of said trehalose and sucralose to make hard candies in otherwise the same manner as above. Comparison of the hard candies of the invention with the control candies showed that whereas the hard candies according to the invention was transparent and had a rich flavor with non-cloying sweetness as well as the crispness easy to crush by biting, the control candies were slightly brown-colored and had a faintly bitter taste mingled with a heavy note of sweetness. In addition, the hard candies of the invention were less hygroscopic and could enjoy a longer shelf-life.

Example (I-1-20) Orange Juice Drink

| | |
|---|---|
| Fructose/glucose syrup | 2.50 |
| Beet oligosaccharide | 0.026 |
| Sucralose | 0.0065 |
| Valencia orange juice 1/5, conc. | 4.40 |
| Citric acid | 0.026 |
| Trisodium citrate | 0.0025 |
| L-ascorbic acid | 0.01 |

The above ingredients were blended and heated up to 93° C., followed by addition of 0.1 part of a flavor, and the mixture was made up to 100 parts with water and filled into a bottle. The orange juice drink thus obtained had a savory sweetness without a lingering aftertaste.

Example (I-1-21) Licorice Extract-Containing Ketchup

| | | |
|---|---|---|
| A: | Water | 34.00 |
| | Common salt | 2.50 |
| | Licorice extract | 0.03 |
| | Sucralose | 0.01 |
| B: | Tomato paste | 40.00 |
| | Wine vinegar | 18.00 |
| | Glucose/fructose syrup | 5.00 |
| | Spice | 0.20 |

Ingredients A were blended and dissolved by heating, followed by addition of all ingredients B and mixing. The whole mixture was diluted with water to make 100 parts and filled into a container, which was then pasteurized at 80° C. for 30 minutes to give a ketchup. This ketchup had a sweetness with a good body and was very palatable.

Example (I-1-22) Licorice Extract-Containing Snack

| <Snack seasoning> | |
|---|---|
| Common salt | 14.00 |
| Tricalcium phosphate | 3.00 |
| Disodium succinate | 0.20 |
| Sodium L-glutamate | 7.00 |
| Powdered soy | 3.00 |
| Yeast extract | 1.50 |
| Onion powder | 1.50 |
| Paprika powder | 1.50 |
| Garlic powder | 6.00 |
| Red pepper powder | 0.50 |
| Chicken consommé | 21.00 |
| Beef consommé | 4.00 |
| Stevia | 0.60 |
| Glucose | 13.03 |
| Spice | 0.10 |
| Corn starch | 23.00 |
| Licorice extract | 0.06 |
| Sucralose | 0.003 |

A snack seasoning of the above formulation was sprinkled over a snack batter. As a result, a snack with the salty edge further rounded off and an increased savor was obtained.

Example (I-1-23) Canned Coffee

| | |
|---|---|
| Coffee extract | 30.00 |
| Cow's milk | 25.00 |
| Emulsifier | 0.10 |
| Sodium bicarbonate | 0.12 |
| Enzymatic digest of stevia | 0.01 |
| Sucralose | 0.005 |
| L-rhamnose | 0.01 |
| Water | Balance |
| Total | 100.00 |

According to the above recipe, all ingredients were mixed, heated to dissolve and homogenized with a homogenizer (150 kg/cm$^2$) This was followed by addition of 0.05 weight part of a flavor and the mixture was filled into cans and retort-sterilized at 121° C. for 20 minutes. The canned coffee thus obtained had a sumptuous flavor of increased body without an unpleasant after-taste.

Example (I-1-24) Orange Juice-Containing Drink

In orange juice, 0.0098 part of enzyme-treated stevia, 0.00325 part of sucralose and 0.008 part of L-rhamnose were formulated to prepare a fruit drink in the routine manner. The resulting orange juice-containing drink had an exquisite taste with delicate sweetness without an unpleasant after-taste.

Example (I-1-25)

Sucralose and thaumatin were caused to coexist in the following ways and the quality of sweetness was evaluated.
1) Sucralose 0.014%
2) Thaumatin 0.0004%
3) Sucralose 0.0139%+thaumatin 0.000018%
4) Sucralose 0.0133%+thaumatin 0.000084%

Compared with the single-component sweetener 1) or 2), the combination sweeteners 3) and 4) produced sweet sensations of increased body, with the sweetness of the latter 4) being particularly pervasive in nature.

Example (I-1-26) Apple Juice-Containing Drink

| Apple clear juice, 1/5 conc. | 4.40 (kg) |
| --- | --- |
| Sucralose | 0.0137 |
| Thaumatin | 0.000084 |
| Citric acid | 0.15 |
| Flavor | 0.12 |
| Water | Balance |
| Total | 100.00 L |

An apple juice-containing drink was prepared according to the above recipe. Compared with the control drink prepared by adding either 0.014 kg of sucralose alone or 0.004 kg of thaumatin alone, each the sweetness equivalent of the above sucralose plus thaumatin, this apple juice-containing drink had an intensified apple juice note and a markedly increased body.

Example (I-1-27) Non-Sugar Coffee

| Coffee extract | 3.75 (kg) |
| --- | --- |
| Cow's milk | 10.00 |
| Sucralose | 0.00825 |
| Thaumatin | 0.00004 |
| Purified coconut oil | 0.50 |
| Emulsifier | 0.10 |
| Flavor | 0.12 |
| Water | Balance |
| Total | 100.00 L |

Example (I-1-28) Apple Pie Filling

| A: | Apple | 200.00 |
| --- | --- | --- |
| B: | Maltose | 150.00 |
| | Sucralose | 0.10 |
| | Thaumatin | 0.01 |
| | Water | 100.00 |
| C: | Lemon juice (straight) | 10.00 |
| D: | Walnut | 60.00 |
| | Raisins | 60.00 |
| | Apple flavor | 0.20 |

To apples cut to the maiden-hair pattern were added the above ingredients B and the mixture was boiled. In the course, ingredient C was added and the boiling was continued until the apple became translucent (final Bx 76°). After cooling, the mixture was combined with ingredients D to make an apple pie filling.

Example (I-1-29) Poundcake

| A: | Unsalted butter | 100.00 |
| --- | --- | --- |
| B: | Reducing maltose syrup | 100.00 |
| | Sucralose | 0.03 |
| | Enzymatic digest of stevia | 0.03 |
| | Thaumatin | 0.0025 |
| C: | Whole egg | 100.00 |
| | Flavor | 0.22 |
| D: | Soft flour | 120.00 |
| | Swelling agent (San Over O-62)* | 1.50 |

A universal stirring mixer was charged with ingredient A, followed by whipping to give a white mass of creamy consistency. Under mixing at 126 rpm, a mixture of ingredients B was added in 3 portions, each over 5 minutes. Then, a mixture of ingredients C was added in small portions, over 3 minutes at 126 rpm and over 3 minutes at 216 rpm. Then, a sieved mixture of powdery ingredients D was gently mixed in, and the resulting batter was put in poundcake molds and baked in an oven at 160° C. for 50 minutes to give a poundcake.

Example (I-2-1) Gluconate-Containing Sweetening Composition (1) A sucralose-containing syrup with a solid content of 0.005% was formulated with potassium gluconate at the levels indicated in Table 1 to prepare sweetener solutions. A panel of 20 tasters was asked to ingest the solutions and evaluate the quality of sweetness of each. The results are shown in Table 1.

TABLE 1

| Level of K gluconate (%) | No. of panelists who answered that the quality of sweetness was improved | Global evaluation | Comment |
| --- | --- | --- | --- |
| 0 | — | — | Sweetness slightly lingering |
| 0.1 | 16/20 | ⊚ | Sharp cut-off of sweetness Overall bodying effect |

TABLE 1-continued

| Level of K gluconate (%) | No. of panelists who answered that the quality of sweetness was improved | Global evaluation | Comment |
| --- | --- | --- | --- |
| 0.25 | 18/20 | ◉ | Sharp cut-off of sweetness<br>Bodying effect |
| 0.5 | 18/20 | ◉ | Sharp cut-off of sweetness<br>Bodying effect<br>Disappearance of insipidness (soppy mouth-feel) |
| 1 | 14/20 | ○ | Fairly prominent bodying effect<br>Disappearance of unpleasant aftertaste |
| 3 | 6/20 | Δ | A hint of potassium gluconate taste<br>Faint chemical odor |

(2) A sucralose-containing syrup with 0.005% solids was formulated with sodium gluconate at the levels indicated in Table 2 to prepare sweetener solutions. Each solution was evaluated for the quality of sweetness in the same manner as in (1) above. The results are shown in Table 2.

TABLE 2

| Level of Na gluconate (%) | No. of panelists who answered that the quality of sweetness was improved | Global evaluation | Comment |
| --- | --- | --- | --- |
| 0 | — | — | Sweetness slightly lingering |
| 0.1 | 19/20 | ◉ | Sharp cut-off of sweetness<br>Overall bodying effect |
| 0.25 | 18/20 | ◉ | Sharp cut-off of sweetness<br>Bodying effect |
| 0.5 | 9/20 | ○ | Sharp cut-off of sweetness<br>Bodying effect<br>Disappearance of insipidness (soppy mouth-feel) |
| 1 | 7/20 | Δ | Sweetness was improved quality-wise but a hint of sodium gluconate taste noticeable |
| 3 | 4/20 | Δ | Sweetness was improved quality-wise but saltiness intensified |

The above results indicate that blending a gluconate with sucralose corrects for the inherent flavor drawback (degree of sweetness, quality of sweetness) of sucralose to some extent and, hence, leads to a synergistic improvement in overall flavor. Thus, the spectrum of substrate foods which had been restricted by the lingering sweetness and lack of body of sucralose can now be broadened so that this sweetener can now be utilized with advantage in the whole gumut of foods and beverages inclusive of carbonated drinks, fruit drinks, coffee, nonalcoholic beverages, milk drinks, tea drinks, bakery foods, noodles and vermicelli, confections, pickles, sauces, farm and animal products, and fish products.

Example (I-2-2) Gymnemic Acid-Containing Sweetening Composition

An aqueous solution containing 0.005% of sucralose was formulated with gymnemic acid at the levels indicated in Table 3 and a panel of 20 tasters was asked to evaluate the quality and degree of sweetness of each sample. The results are also shown in Table 3. In the table, ppb denotes $10^{-7}$ weight %.

TABLE 3

| Level of gymnemic acid (ppb) | No. of panelists who answered that the quality of sweetness was improved | Global evaluation | Comment |
| --- | --- | --- | --- |
| 0 | — | — | Refreshing, sumptuous, non-lingering sweetness |
| 2.5 | 13/20 | ○ | Decreased insipidness |
| 25 | 18/20 | ◉ | Bodying effect<br>Disappearance of insipidness |

TABLE 3-continued

| Level of gymnemic acid (ppb) | No. of panelists who answered that the quality of sweetness was improved | Global evaluation | Comment |
|---|---|---|---|
| 250 | 19/20 | ⊚ | Body increased as a whole Fair bodying effect on sweetness |
| 2500 | 17/20 | ⊚ | Fair bodying effect Added breadth in sweetness |
| 25000 | 11/20 | ○ | Bodying effect; however, the top sweetness is attenuated |

It will be apparent from the above results that formulation of gymnemic acid adds body and thickness to the sweetness of sucralose.

Example (I-2-3) Gymnemic Acid-Containing Chewing Gum

Forty (40) parts of gum base, 53 parts of reducing maltose, 0.09 part of sucralose and 0.0005 part of gymnemic acid were heated and mixed. To the mixture were added a flavor and a color to give a chewing gum having a sweetness with a body throughout.

Example (I-2-4) Whey Mineral-Containing Sweetening Composition

To a 0.005% solution of sucralose in water was added whey mineral at the levels indicated in Table 4 and a panel of 20 experts was asked to evaluate the quality and degree of sweetness of each formulation. The results are also shown in Table 4.

TABLE 4

| Level of whey mineral | No. of panelists who answered that the quality of sweetness was improved | Global evaluation | Comment |
|---|---|---|---|
| 0 | — | — | Sweetness clear and refreshing but a little lingering |
| 0.1 | 16/20 | ⊚ | Sweetness increased in breadth Sweetness in after-taste is decreased |
| 0.2 | 19/20 | ⊚ | Good after-taste Improved month-feel |
| 0.3 | 12/20 | ○ | Good after-taste A hint of mineral taste |
| 0.5 | 6/20 | Δ | A note of minerals in the taste |

It is clear from the above results that formulating whey mineral with sucralose not only adds body and thickness to the sweetness of sucralose but also mitigates the lingering taste, with the result that a sweetener having an improved palatability can be produced.

Example (I-2-5) Whey Mineral-Containing Sport Drink

| | |
|---|---|
| Whey minerals | 1.00 |
| Vitamin mixture | 0.25 |
| Citric acid | 0.125 |
| Sodium L-ascorbate | 0.05 |
| Lemon clear juice | 0.50 |
| Sucralose | 0.02 |
| Water | Balance |
| Total | 100.00 |

Ingredients were admixed according to the above recipe and heated to 93° C. Then, 0.15 part of a flavor was added and the whole was filled into a bottle to provide a sport drink. The drink thus obtained was a sport drink enriched in minerals and having a full-bodied taste.

Example (I-3-1) A Preparation Composition with Satisfactory Physical Characteristics One-hundred (100) parts of the following sample (soybean polysaccharide, trehalose, maltodextrin, erythritol or maltitol) and 2 parts of sucralose were taken in a dish and held in an incubator at 40° C. and 80% RH for 24 hours. Each preparation was then examined.

<Samples>

Soybean polysaccharide (SM700, product of SAN-EI GEN F.F.I. Co.)

Trehalose (Trehalose Micro, product of Hayashibara Shoji Co.)

Maltodextrin (Max 2000, product of Matsutani Chemical Co.)

Erythritol (Erythritol, product of Nikken Chemicals)

Maltitol (Resis, product of Towa Kasei Kogyo K.K.)

The results are shown in Table 5.

TABLE 5

| Sample | Condition |
|---|---|
| Soybean polysaccharide + sucralose | Flocculent and easily collapsible with fingers Very acceptable |
| Trehalose + sucralose | Solidified as a whole, barely collapsible by fingers Shrunken away from the edge of the dish |

TABLE 5-continued

| Sample | Condition |
|---|---|
| Maltodextrin + sucralose | Resembling a water-soaked rice cake, water, with a film formed on the surface Solidified as a whole |
| Erythritol + sucralose | Water liberated. Solidified as a whole |
| Maltitol + sucralose | An appreciable amount of water liberated |

It will be apparent from the above results that the combination use of sucralose and soybean polysaccharide results in a significant correction for the incidence of deliquescence and caking.

Further, a fruit milk was prepared in the routine manner except that the above preparation consisting of 100 parts of soybean polysaccharide and 2 parts of sucralose was added. As a result, a fruit milk having a mellow, bodied sweetness without forming a sediment was obtained.

Example II

Foods with a Masked Unpleasant Smell and Unpleasant Taste

Example (II-1-1) Correction for the Unpleasant After-Taste of DHA

To an aqueous solution of the DHA 5% preparation, sucralose was added at the levels indicated in Table 6 and a panel of 20 tasters was asked to evaluate the taste of each formulation (the concentration of DHA in the final solution: 0.015%). The results are also shown in Table 6.

TABLE 6

| Level of sucralose (%) | Panelists who affirmed the masking effect | Global evaluation | Comment |
|---|---|---|---|
| 0 | — | — | Fishy odor Fishy odor is carried over |
| 0.0001 | 6/20 | Δ | Fishy odor remains a little |
| 0.0002 | 10/20 | ○ | Fishy odor is reduced but a faint oily flavor is felt |
| 0.0003 | 17/20 | ◎ | Lingering fishy odor is decreased Improved as a whole |
| 0.0004 | 9/20 | ○ | Lingering fishy odor is decreased |
| 0.0005 | 4/20 | ○ | Fishy odor is decreased Some sweetening occurs |

The above results indicate that the combined use of DHA and sucralose results in a significant masking of the DHA-specific fishy smell lingering after ingestion, thus making the after-taste pleasant.

Examples (II-1-2(1))

Masking of Protein Odor: Soybean Protein

A 0.5% aqueous solution of soybean protein was prepared, sucralose was then added to the solution at the levels indicated below in Table 7, and a panel of 20 tasters was asked to ingest and evaluate each formulation for the protein odor (soybean flavor) derived from the soybean protein.

TABLE 7

| Level of sucralose (%) | Panelists who affirmed the masking effect | Global evaluation | Comment |
|---|---|---|---|
| 0 | — | — | Soybean flavor; mealy odor |
| 0.0001 | 17/20 | ◎ | Mealiness eliminated; toothsome |
| 0.0003 | 19/20 | ◎ | Protein odor eliminated; toothsome |
| 0.0005 | 14/20 | ○ | Toothsome but a slight expression of sweetness noted |
| 0.001 | 4/20 | Δ | Toothsome but an expression of sweetness noted |

It is clear from the above results that formulating sucralose results in a significant masking of the protein odor (soybean flavor) originating from soybean protein.

Example (II-1-2(2))

Masking of Protein Odor: Casein

To a mixture consisting of 0.5% of casein sodium and 99.5% of water was added sucralose at the levels indicated below in Table 8 and a panel of 20 tasters was asked to ingest and evaluate each formulation for the casein odor (gluey flavor) derived from the casein.

TABLE 8

| Level of sucralose (%) | Panelists who affirmed the masking effect | Global evaluation | Comment |
|---|---|---|---|
| 0 | — | — | Mealy odor |
| 0.00010 | 16/20 | ◎ | Nasty protein taste mitigated A bodying effect on taste |
| 0.00025 | 18/20 | ◎ | Nasty protein taste mitigated Mealiness eliminated |
| 0.00050 | 5/20 | Δ | A bodying effect but some expression of sweetness |
| 0.00100 | 4/20 | Δ | An appreciable bodying effect but carry-overs of taste and sweetness are noted |

It became clear that by formulating sucralose, the off-flavor (gluey flavor) originating from the casein in milk protein can be masked to a significant extent. It is, therefore, considered possible to expand the scope of application of casein which has heretofore been delimited by said gluey flavor, suggesting that casein can now be used not only in foods such as imitation cheese, coffee whitener, bakery products, etc. but also broadly in the field of pharmaceutical additives.

Example (II-1-2(3))

Masking of Protein Odor: Whey Protein

A 0.5% solution of whey protein in water was prepared, sucralose was added at the levels indicated in Table 9, and a panel of 20 tasters was asked to ingest and evaluate each formulation for the protein odor (milk flavor) originating from the whey.

TABLE 9

| Level of sucralose (%) | panelists who affirmed the masking effect | Global evaluation | Comment |
|---|---|---|---|
| 0 | — | — | Milk flavor is noticeable |
| 0.0001 | 7/20 | Δ | Milk flavor is slightly reduced |
| 0.00025 | 17/20 | ◎ | Overall thickening of taste |
| 0.0005 | 9/20 | ○ | Overall thickening of taste |
| 0.001 | 6/20 | Δ | Slight milk flavor |

As a result, it was found that by formulating sucralose, the odor originating from the whey protein in milk protein can be masked to a significant extent.

Example (II-1-2(4))

Masking of Protein Odor: Egg White Protein

A 0.5% of aqueous solution of egg white protein was prepared, sucralose was added to the solution at the levels indicated below in Table 10, and a panel of 20 tasters was asked to ingest and evaluate each formulation for the protein odor (sulfur odor, raw egg odor, etc.) originating from the egg white.

TABLE 10

| Level of sucralose (%) | Panelists who affirmed the masking effect | Global evaluation | Comment |
| --- | --- | --- | --- |
| 0 | — | — | Sulfur odor |
| 0.0001 | 4/20 | Δ | Little change |
| 0.00025 | 17/20 | ◎ | Odor reduced |
| 0.0005 | 12/20 | ○ | Raw egg odor reduced |
| 0.001 | 5/20 | Δ | Sweetness intermingled; Little masking effect |

It was, thus, found that by formulating sucralose, the odor derived from the egg white protein can be masked to a significant extent.

Example (II-1-2(5))

Masking of Protein Odor: Wheat Protein

A mixture of 0.5% wheat protein and 99.5% water was prepared and sucralose was added at the levels shown below in Table 11. A panel of 20 tasters was asked to ingest the formulations and evaluate each for the protein odor originating from wheat.

TABLE 11

| Level of sucralose (%) | Panelists who affirmed the masking effect | Global evaluation | Comment |
| --- | --- | --- | --- |
| 0 | — | — | Mealy odor |
| 0.0001 | 12/20 | ○ | Mealy odor somewhat reduced |
| 0.00025 | 18/20 | ◎ | Mealy odor masked |
| 0.0005 | 10/20 | ○ | Slight sweetness expressed |
| 0.001 | 3/20 | Δ | Sweetness outvies mealy odor |

It was, therefore, clear that by formulating sucralose, the odor of wheat protein can be significantly masked.

Example (II-1-2(6))

Masking of Protein Odor: Soybean Peptide

| Granulated sugar | 3.5 (%) |
| --- | --- |
| Glucose | 2.5 |
| Soybean peptide | 3.0 |
| Tartaric acid | 0.5 |
| Sodium hydrogen carbonate | 0.3 |
| Citric acid, anhydrous | 0.1 |
| Powdered flavor | 0.07 |
| Color powder | 0.02 |
| Sucralose | 0.01 |

According to the above recipe, all ingredients were blended to give a powder beverage. The drink obtained by adding 90% of water to 10% of the powder beverage was a flavorful drink with little bitterness and free of soybean odor.

Example (II-1-3(1)) Masking of Collagen Odor

To a 1 weight % solution of collagen (gelatin hydrolysate) in water was added sucralose at the levels indicated below in Table 12 and a panel of 20 tasters was asked to evaluate each formulation for collagen odor.

TABLE 12

| Level of sucralose (%) | Panelists who affirmed the masking effect on collagen odor | Global evaluation | Comment |
| --- | --- | --- | --- |
| 0 | — | — | Repulsive gelatin-like odor |
| 0.0005 | 12/20 | ○ | Repulsive odor somewhat masked |
| 0.001 | 20/20 | ◎ | Repulsive odor disappeared; easy to ingest |
| 0.005 | 13/20 | ○ | Collagen taste diluted |
| 0.01 | 3/20 | Δ | Sweetness is intense |

As a result, it was found that by formulating sucralose, the characteristic offensive odor and loathsome taste of collagen can be masked to a significant extent.

Example (II-1-3 (2)) Masking of Collagen Odor

To collagen (gelatin hydrolysate: 3 weight %, water: 97 weight %) was added sucralose at the levels indicated below in Table 13 and a panel of 20 tasters was asked to evaluate samples for collagen odor.

TABLE 13

| Level of sucralose (%) | Panelists who affirmed the masking effect on collagen odor | Global evaluation | Comment |
| --- | --- | --- | --- |
| 0 | — | — | Unpleasant gelatinous odor Mealy |
| 0.0005 | 8/20 | ○ | Unpleasant odor somewhat masked |
| 0.001 | 20/20 | ◎ | Loathsome taste mitigated Odor masked |
| 0.005 | 15/20 | ○ | Odor masked |
| 0.01 | 4/20 | Δ | Intense sweetness |

As a result, it was found that by formulating sucralose, the characteristic unpleasant odor and loathsome taste of collagen can be masked to a significant extent.

Example (II-1-4)

Mitigation of Soybean Odor: Sterile-Packed Soybean Curd

| Soy milk | 99.70 |
| --- | --- |
| Magnesium chloride | 0.20 |
| Potassium sorbate | 0.10 |
| Sucralose | 0.0005 |

Ingredients were blended according to the above recipe, filled into a container, and heated at 90° C. for 15 minutes. On quenching, a sterile-packed soybean curd with a significantly masked soybean odor was obtained.

Example (II-1-5) Mitigation of Natto Odor: Natto

Material soybeans were soaked in 100 parts of water containing 0.002 part of sucralose for 20 hours and then processed into natto in the routine manner. As a result, a natto with reduced natto odor could be obtained.

Example (II-1-6) Masking of the Grassy Smell of Vegetables

To a commercial vegetable juice (containing 20 weight % of a mixed juice of carrot, parsley, spinach, green pepper, tomato and celery) was added sucralose at the levels indicated below in Table 14 and a panel of 20 tasters was asked to evaluate each formulation for the grassy smell of vegetables.

TABLE 14

| Level of sucralose (%) | Panelists who affirmed the masking effect | Global evaluation | Comment |
|---|---|---|---|
| 0 | — | — | Grassy on the whole, with the smell of celery outstanding |
| 0.0001 | 9/20 | Δ | Grassy smell disappeared but the smell of green pepper persisted |
| 0.0002 | 14/20 | ○ | Made somewhat insipid but grassy smell decreased |
| 0.0003 | 17/20 | ⊙ | Grassy smell decreased |
| 0.0004 | 19/20 | ⊙ | Grassy smell decreased |
| 0.0005 | 10/20 | Δ | No grassy smell but some sweetening effect |

Example (II-1-7(1)) Masking of the Repugnant Odor/Taste of Vitamins

| <sport drink> | |
|---|---|
| Fructose/glucose syrup | 2.50 |
| Vitamin mixture | 0.25 |
| (trisodium citrate, potassium chloride, calcium lactate, calcium pantothenate, magnesium sulfate) | |
| Citric acid | 0.12 |
| Vitamin C | 0.10 |
| Sucralose | 0.008 |
| Water | Balance |
| Total | 200.00 |

Ingredients were blended according to the above recipe and heated up to 93° C., at which temperature 0.2 part of a flavor was added. The mixture was filled into a bottle to give a sport drink. This drink was a highly savorous drink with the vitamin smell masked significantly.

Example (II-1-7(2)) Masking of the Repugnant Odor/Taste of Vitamins

Thiamine nitrate (product of Takeda Chemical Industries) was dissolved in pure water to make a 0.1% solution and sucralose was added at final concentrations of 2.5 ppm~50 ppm to prepare test samples (Table 15). A panel of 10 experts was asked to take each sample in the mouth and give a rating number in the order of intensity of repugnancy. Thus, the smaller the rating number is, the greater is the intensity of repugnancy. Furthermore, based on the results, each panelist was asked to score the repugnant taste of each sample with the score of the most repugnant sample being taken as 100. Table 15 shows the average results.

TABLE 15

| | Level of sucralose (ppm) | | | | |
|---|---|---|---|---|---|
| | 0 | 2.5 | 5 | 25 | 50 |
| Intensity rating of repugnancy | 1.4 | 2.2 | 2.8 | 3.8 | 4.8 |
| Score of repugnancy | 96.0 | 88.0 | 83.8 | 61.0 | 51.0 |

It is clear from the above results that the repugnant taste, such as bitterness, of thiamine nitrate could be significantly masked with sucralose. This effect was particularly pronounced at 2.5 ppm and higher levels, specifically over the range from 2.5 ppm to 50 ppm, of sucralose.

Example (II-1-8) Masking of Fish Odor: Squid Dainty

| Koikuchi soy | 20.00 |
|---|---|
| Usukuchi soy | 10.00 |
| Fish/shellfish-derived condiment | 5.00 |
| Mirin | 10.00 |
| Vinegar | 2.00 |
| Sugar | 28.00 |
| Common salt | 1.00 |
| Sodium L-glutamate | 2.00 |
| Umami (ambrosian) essence | 1.40 |
| Disodium succinate | 0.20 |
| Garlic powder | 0.05 |
| Sucralose | 0.017 |

Ingredients were blended according to the above recipe and heated up to 85° C., at which temperature 0.01 part of a flavor was added. The mixture was made up to 100 parts with water to make a seasoning liquor for a squid dainty. Separately, squid was boiled at 80° C. for 3 minutes, stretched thin, and colored with a coloring solution composed of 0.1 part of annatto color and 99.9 parts of water to give an ingredient squid for a squid dainty. The above seasoning liquor and ingredient squid were soaked together in a ratio of 2:1 overnight and, then, dried at 60° C. for 1.5 hours. It was further dipped in the seasoning liquor and dried at 60° C. for 15 minutes. As a result, a squid dainty free of fishy odor was obtained.

Example (II-1-9) Masking of Flour Odor: Wrapping for Buns

| Soft flour | 500.0 |
|---|---|
| Common salt | 6.0 |
| Baking powder | 2.5 |
| Xanthan gum | 1.0 |
| Trehalose | 60.0 |
| Dried yeast | 7.5 |

Ingredients were blended according to the above recipe and stirred together with 200 parts of lukewarm water (35~40° C.) and 0.073 part of sucralose. After the soft flour had absorbed water, 15 parts of lard was added and kneaded in, followed by 10 minutes of standing. The batter thus obtained was divided into small portions and, after filling with a bean jam, allowed to ferment in a tea dryer (40° C., 50% RH) for 40~50 minutes and, then, steamed at 100° C. for 20 minutes. As a result, a wrapping for a bean-jam bun with the mealy odor masked could be obtained.

Example (II-1-10) Masking of Meat Odor: Hamburger Steak

| | |
|---|---|
| Ground pork/beef | 45.0 |
| Pork | 9.0 |
| Onion sauté | 12.0 |
| Whole egg | 5.0 |
| Granulated soybean protein | 9.0 |
| Casein sodium | 5.0 |
| Carrageenan | 1.5 |
| Locust bean gum | 0.5 |
| Spice | 0.3 |
| Yeast extract | 0.2 |
| Common salt | 1.0 |
| Sucralose | 0.002 |
| Water-soluble diet fiber | 1.0 |
| Water | Balance |
| Total | 100.0 |

Ingredients were blended according to the above recipe, punched to shape, and roasted at 170° C. for 5 minutes on each side to give a hamburger steak. This hamburger steak was a savory food without a nasty animal meat odor.

Example (II-1-11) Masking of Retort Odor: Retort Chinese-Style Donburi

| | |
|---|---|
| <Soup> | |
| Usukuchi soy sauce | 72.00 |
| Sake | 46.00 |
| Common salt | 4.00 |
| Sodium L-glutamate | 1.30 |
| Nucleotide condiment | 0.07 |
| Chicken extract powder | 1.00 |
| Sucralose | 0.0112 |
| Water | 209.00 |
| <Solid ingredients> | |
| Pork | 200 |
| Squid | 120 |
| Shrimp | 80 |
| *Lentinula edodes* | 70 |
| Boiled bamboo shoots | 160 |
| Carrots | 60 |
| Onions | 240 |

Pork, squid and shrimp were lightly fried with 50 parts of lard in advance. Separately, 54 parts of lard was taken in a pan and *Lentinula edodes*, boiled bamboo shoots, carrots and onions were fried. Thereafter, the pork and others fried in advance were added and the condiment was also added. When the mixture had begun to boil, 16 parts of potato starch dissolved in a small quantity of water was added. The food thus prepared was dispensed into aluminum pouches and retort-sterilized at 120° C. for 20 minutes. As a result, a good-tasting food with the metallic retort odor masked significantly could be obtained.

Example (II-1-12) Masking of can Odor: Canned Mandarin Orange

| | |
|---|---|
| <Syrup> | |
| Sugar | 10.00 |
| Fructose/glucose syrup | 10.00 |
| Citric acid | 0.25 |
| Trisodium citrate | 0.10 |
| Sucralose | 0.003 |
| Water | Balance |
| Total | 100.00 |

Ingredients were blended according to the above recipe and heated at 80° C. for 10 minutes, followed by addition of 0.25 part of a flavor to give a syrup. The syrup and the mandarin orange pulp as peeled and pretreated in the routine manner were filled into cans and, after clinching, pasteurized at 85° C. for 30 minutes. The canned fruit thus obtained had been well masked of the canned food odor. Moreover, the emanation of a canned food odor remained to be well inhibited even after 1 year of storage.

Example (II-2-1(1)) Crude Drug Composition

Pulvis swertiae (Japanese green gentian powder) was dissolved in water to give a 0.03% solution and sucralose was then formulated at levels of 2.5 ppm (0.00025%)~50 ppm (0.005%) to prepare test samples (Table 16). A panel of 10 tasters was asked to take each sample in the mouth and give a rating number according to the intensity of distastefulness, such as bitterness and loathsomeness. The rating schedule was that the smaller the rating number was, the higher was the intensity of distastefulness. Furthermore, based on the results, each panelist was asked to evaluate the repulsiveness (degree of distastefulness) of each sample, with the evaluation given to the most repulsive sample being taken as 100. The results were averaged to arrive at the final evaluation. The results are shown in Table 16.

TABLE 16

| | Level of sucralose (ppm) | | | | |
|---|---|---|---|---|---|
| | 0 | 2.5 | 5 | 25 | 50 |
| Intensity rating of repugnancy | 2.2 | 1.8 | 2.2 | 4.0 | 4.8 |
| Score of repugnancy | 96.0 | 93.0 | 90.8 | 69.6 | 61.0 |

It was clear from these results that the peculiar acrimonious taste of the green gentian powder can be significantly masked by the addition of sucralose. This effect was significant at the sucralose level of 10 ppm and up, particularly at not less than 25 ppm, especially between 25 ppm and 50 ppm.

Example (II-2-1(2)) Crude Drug Composition

Saponin (derived from the plant Glycosides) was dissolved in water to make a 0.016% solution and sucralose was then formulated at levels of 2.5 ppm~50 ppm to prepare test samples (Table 17). A panel of 10 tasters was asked to take each sample in the mouth and, as in the above Example (II-2-1(1)), give ratings according to the intensity of repulsiveness and final evaluations. The results are presented in Table 17.

TABLE 17

| | Level of sucralose (ppm) | | | | |
|---|---|---|---|---|---|
| | 0 | 2.5 | 5 | 25 | 50 |
| Intensity rating of repugnancy | 2.2 | 2.0 | 1.8 | 4.2 | 4.8 |
| Score of repugnancy | 86.0 | 89.0 | 92.4 | 66.4 | 60.0 |

It is clear from these results that the bitterness of saponin, which is a chief source of the repugnant taste of the crude drug, can be significantly masked by the addition of sucralose. This effect was particularly pronounced at the sucralose level of 10 ppm and up, with significance at not less than 25 ppm, especially at 25 ppm~50 ppm.

Example (II-2-2 (1)) Masking of the Bitterness of Peptides: Soybean

|   | peptide-containing drink | |
|---|---|---|
| A: | Oligosaccharide | 7.00 |
|   | Water | 75.00 |
| B: | Magnesium sulfate | 0.10 |
|   | Potassium chloride | 0.10 |
|   | Potassium phosphate | 0.10 |
|   | Common salt | 0.10 |
| C: | Soybean peptide | 5.00 |
|   | Dextrin | 10.00 |
|   | Sucralose | 0.012 |
| D: | Rice bran oil | 2.30 |
|   | Lecithin | 0.10 |

In a mixture of ingredients A, all ingredients B were dissolved. Then, all ingredients C were added and dissolved. After the mixture was heated to 60° C., ingredients D were added and using a Homo-mixer, the whole mixture was emulsified at 10000 rpm for 10 minutes. To the resulting emulsion was added 0.1 part of a flavor, and following addition of water to make 100 parts, the mixture was further homogenized using a homogenizer (150 kg/cm$^2$) and filled into cans. The filled cans were retort-sterilized at 121° C. for 20 minutes. The beverage thus obtained gave no noticeable bitter sensation suggestive of the peptide.

Example (II-2-2(2)) Masking of the Bitterness of Peptides: Soybean

| peptide-containing drink | |
|---|---|
| Granulated sugar | 1.255 |
| Glucose | 2.500 |
| Soybean peptide | 5.000 |
| Tartaric acid | 0.500 |
| Sodium hydrogen carbonate | 0.300 |
| Citric acid, anhydrous | 0.100 |
| Flavor powder | 0.300 |
| Color powder | 0.030 |
| Sucralose | 0.015 |

According to the above recipe, ingredients were blended to give a powder beverage. The drink obtained by adding 90 parts of water to 10 parts of the above powder beverage was a savory drink with suppressed bitterness and free of soybean odor.

Example III

Performance Food Composition

Example (III-1-1(1)) Tare (Sauce) for Yakiniku (Grilled Beef)

| A: | Water | 62.00 |
|---|---|---|
|   | Guar gum | 0.30 |
| B: | Koikuchi soy sauce | 15.00 |
|   | Cooking wine | 5.00 |

-continued

| | | |
|---|---|---|
| | Ginger paste | 1.00 |
| | Garlic paste | 1.50 |
| | Tomato paste | 9.00 |
| | Onion extract | 3.00 |
| | Amino acid condiment | 2.50 |
| | Sucralose | 0.008 |

Ingredients A were blended and heated at 80° C. for 10 minutes. Then, all ingredients B were added and the whole mixture was heated at 80° C. for 5 minutes and, then, made up to 100 parts with water. The mixture was filled into containers and pasteurized at 90° C. for 30 minutes to prepare a tare (dressing) for yakiniku. The tare was least stodgy with a good mouth-feel, thus being very palatable. As control, a tare for yakiniku was prepared using 4 parts of sugar, which is equivalent in sweetness to 0.008 part of sucralose, in otherwise the same manner. However, the control tare had a heavy mouth-feel.

Example (III-1-1(2)) Soft Yogurt

| A: | Water | 35.00 |
|---|---|---|
|   | Skim milk powder | 9.00 |
|   | Unsalted butter | 5.25 |
| B: | Water | 47.00 |
|   | Locust bean gum | 0.30 |
|   | Sucralose | 0.026 |

Ingredients A were blended and dissolved by heating at 50° C. This solution was added to a mixture of ingredients B as prepared by 10 minutes of heating at 80° C. and the whole was made up to 97 parts with water. This mixture was homogenized with a homogenizer (150 kg/cm$^2$), pasteurized at 90° C. for 5 minutes, and supplemented with 0.15 part of a flavor. After cooling to 40° C., 3 parts of starter yogurt was added and the mixture was filled into containers and allowed to ferment in an incubator at 40° C. for 6 hours to give a soft yogurt according to the invention. Compared with a control soft yogurt prepared by using 13 parts of sugar, which is equivalent in sweetness to 0.026 parts of sucralose, in lieu of sucralose, the product was a yogurt having a sumptuous, non-cloying mouth-feel.

Example (III-1-2(1)) White Peach Jelly

| Water | 80.00 |
|---|---|
| Sucralose | 0.024 |
| κ-Carrageenan | 0.60 |
| White peach puree | 20.00 |
| Water | Balance |
| Total | 100.00 |

According to the above recipe, water, sucralose and κ-carrageenan were blended and heated at 80° C. for 10 minutes. To this was added white peach puree, and the whole mixture was made up to 100 parts with water. Then, 0.18 part of citric acid and 0.1 part of a flavor were added, and the mixture was filled into vessels and cooled. As a result, a highly palatable jelly with full lusciousness and light texture was obtained. A control jelly prepared by using 12 parts of sugar, which is equivalent in sweetness to 0.024 part of sucralose, in lieu of sucralose was a jelly having a heavy mouth-feel.

Example (III-1-2(2)) Grapefruit Jelly

| A: | Water | 80.00 |
|---|---|---|
|  | Sucralose | 0.03 |
|  | Gellan gum | 0.25 |
| B: | Crushed grapefruit pulp | 20.00 |
|  | Calcium lactate | 0.10 |
|  | Citric acid | 0.20 |
|  | Flavor | 0.10 |

Ingredients A were blended and heated at 80° C. for 10 minutes. Then, components B were added and the whole was made up to 100 parts with water, filled into vessels and cooled. As a result, a plump, juicy jelly rich in fruity feeling could be obtained. As a control, a jelly was prepared by using 15 parts of sugar, which is equivalent in sweetness to 0.03 part of sucralose, in lieu of sucralose. This jelly was deficient in a fruit juice note and had a heavy mouth-feel, lacking in freshness.

Example (III-1-2(3)) Cream Coffee Jelly

| <Coffee jelly> | | |
|---|---|---|
| A: | Water | 60.00 |
|  | Reducing starch syrup | 10.00 |
| B: | Xylitol | 5.00 |
|  | κ-Carrageenan | 0.50 |
|  | Agar | 0.20 |
|  | Loctust bean gum | 0.20 |
| C: | Coffee extract | 7.00 |
|  | Sucralose | 0.005 |
| D: | Coffee flavor | 0.15 |

While ingredients A were blended by stirring, ingredients B were added at 80° C. and dissolved by further stirring for 10 minutes. Then, ingredients C dissolved in a small quantity of water in advance and ingredient D were added to the above mixture and the whole was made up to 100 parts with water. The mixture was poured into cups and cooled. On top of the resulting coffee jelly was layered 5 parts of raw cream to prepare a raw cream-containing coffee jelly. As a control, a similar coffee jelly was prepared by using 3.3 parts of sugar, which is equivalent in sweetness to 0.005 part of sucralose, in lieu of sucralose. Compared with the control coffee jelly, the coffee jelly according to the invention was superior in the palatability with a body, readiness to melt in the mouth, and no carry-overs of the taste. Furthermore, the flavor and texture of the coffee jelly component and the rich creamy flavaor and texture of the raw cream component were synergistically potentiated to give a delicious raw cream-containing coffee jelly featuring a natural blend of flavors of coffee and raw cream.

Example (III-1-2(4)) Strawberry Milk Jelly

| <Whipped cream topping> | | |
|---|---|---|
| A: | Purified coconut oil | 30.00 |
|  | Emulsifier | 0.25 |
| B: | Skim milk powder | 3.30 |
|  | Sucralose | 0.0058 |
|  | Reducing starch syrup | 20.00 |
|  | Lactitol | 8.00 |
|  | Stabilizer | 0.70 |

Ingredients B were mixed together with water at 80° C. for 10 minutes and, then, cooled to 70° C. To this mixture was added 1 part of a 10% aqueous solution of sodium metaphosphate, followed by stirring, and 0.02 part of a flavor was added. The whole was made up to 100 parts with water. Using a Homo-mixer, a mixture of ingredients A liquefied at 70° C. in advance was gradually added and blended at 8000 rpm for 2 minutes. Then, using a homogenizer, the whole mixture was homogenized at a pressure of 60~80 kg/cm$^2$ quenched, and allowed to stand in the refrigerator overnight. The composition thus obtained was whipped (OR: 80~90%) to give a whipped topping cream.

| <Gel component> | | |
|---|---|---|
| A: | Water | 60.00 |
|  | Reducing starch syrup | 14.00 |
| B: | Sucralose | 0.0006 |
|  | Xylitol | 5.00 |
|  | Gelatin | 0.90 |
| C: | Strawberry puree | 5.00 |
|  | Strawberry juice, ¼ conc. | 5.00 |
|  | Citric acid | 0.10 |

While ingredients A were stirred to mix, ingredients B were added and dissolved at 80° C. with stirring for 10 minutes. Then, ingredients C dissolved in a small quantity of water in advance were added and the whole mixture was made up to 100 parts with water. This mixture was filled into cups, pasteurized at 85° C. for 30 minutes, and cooled to solidify, whereupon a strawberry jelly was obtained. To 100 volume parts of this strawberry jelly, 10 volume parts of the whipped topping cream prepared above was added as a topping to give a strawberry milk jelly.

Similarly, a strawberry jelly was prepared using 15 parts of sugar in lieu of 0.0006 part of sucralose in otherwise the same manner in the gel component preparation stage and this gel component was topped with 10 volume parts of the same whipped topping cream as above to prepare a strawberry milk jelly.

Formulation of sucralose in the cream layer resulted in an improvement in the creamy texture (smoothness and body) of whipped cream and the combination of this cream with said strawberry jelly resulted in a harmonious potentiation of the fruit juice flavor of the strawberry jelly and the creamy tone of the whipped cream to thereby provide a delicious strawberry milk jelly. On the other hand, a whipped topping cream prepared by using 0.02 part of a stevia extract, which is equivalent in sweetness, in lieu of sucralose was lacking in creamy texture and failed to emphasize the fruit juice flavor of strawberry jelly.

Example (III-1-3(1)) Separate-Type Dressing

| Salad oil | 60.00 (%) |
|---|---|
| Vinegar (acidity 10%) | 2.40 |
| Glucose/fructose syrup | 2.40 |
| Common salt | 1.20 |
| Malic acid | 2.00 |
| Condiment | 0.40 |
| Sucralose | 0.01 |
| Water | Balance |
| Total | 100.00% |

According to the above recipe, sucralose powder was dissolved in water and the remaining ingredients other than salad oil were added and dissolved. To this solution was added salad oil to thereby prepare a separate-type dressing. This dressing could be readily converted to a stable emulsion by mere shaking in use and was plain and palatable. In contrast, a sucralose-free control dressing was poor in emulsion stability after shaking.

Example (III-1-3(2)) Emulsified Soy Sauce

| Salad oil | 40.00 (%) |
|---|---|
| Koikuchi soy sauce | 58.98 |
| Gum arabic | 1.00 |
| Sucralose | 0.02 |
| Total | 100.00% |

According to the above recipe, gum arabic and sucralose were dispersed in soy sauce and cooked by heating at 85° C. Then, with salad oil being added, the mixture was emulsified with a Homo-mixer (15000 rpm). The soy emulsion thus obtained was smooth-looking and had good fluidity as well as a delicate and savory mouth-feel. In contrast, the sucralose-free soy (control, containing 59% of koikuchi soy sauce) had a slightly rough texture.

Example (III-1-3(3)) Emulsified Dressing

| Salad oil | 35.00 (%) |
|---|---|
| Vinegar (acidity 10%) | 10.00 |
| Sugar | 5.00 |
| Common salt | 4.00 |
| Xanthan gum | 0.30 |
| Sucralose | 0.01 |
| Water | Balance |
| Total | 100.00% |

According to the above recipe, sugar, gum xanthan and sucralose were admixed in powdery state and dissolved in water. Then, common salt and vinegar were added and dissolved. With salad oil being added gradually, the mixture was emulsified using a Homo-mixer (15000 rpm). The resulting dressing had a smooth texture, a delicate mouth-feel, and a good taste. In contrast, the sucralose-free dressing (control) not only had a slightly rough texture but was less smooth in mouth-feel. Moreover, the control dressing underwent rapid phase separation just as did commercial separate-type dressings.

Example (III-2-1(1)) Kamaboko

| Frozen fish paste | 50.00 |
|---|---|
| Potato starch | 8.00 |
| Common salt | 1.50 |
| Mirin | 1.00 |
| Condiment | 0.30 |
| Preservative | 0.50 |
| Sucralose | 0.0035 |
| Iced water | 39.00 |

According to the above recipe, a kamaboko was prepared in the routine manner. The finished kamoboko had a firm, non-viscous texture and a good taste.

Example (III-2-1(2)) Warabi-Mochi

In 100 parts of water was dissolved 20 parts of rice starch. To this solution were added 40 parts of sweet potato starch and 0.01 part of sucralose. After mixing, 100 parts of water was further added, and the whole was heated over a moderate fire while it was kneaded with a wooden spatula. The kneading was continued until transparency and glutinous consistency had developed throughout. This was poured into a flat-bottom container, cooled and cut to give the objective warabi-mochi. This warabi-mochi had a delicately resilient texture, exquisite quick-to-melt mouth-feel, and sweetness impact with a good body.

Example (III-2-1(3)) Custard Cream

A pan with a handle was charged with 65 parts of water, 20 parts of unsalted margarine, 5 parts of starch syrup and 3 parts of whole egg. Then, 4 parts of corn starch, 6 parts of modified starch, 2 parts of whey protein and 0.05 part of sucralose were added. The whole was heated on a direct fire with constant stirring until it had boiled down to 100 parts. It was then cooled on cold water under stirring to 40° C., filled into a container and cooled. The resulting custard cream had a full-bodied flavor and texture with good emulsion stability and body.

Example IV

Foods with Improved Flavors

Example (IV-1-1) Ume Fizz

| White liquor | 15.00 (kg) |
|---|---|
| Citric acid (crystals)* | 0.35 |
| Sucralose | 0.015 |
| Clear ume juice, 1/5 conc. | 0.10 |
| Color* | 0.02 |
| Flavor* | 0.20 |
| Water | Balance |
| Total | 50.00 L |

According to the above recipe, citric acid, sucralose, and clear ume (Japanese apricot) juice 1/5 conc. were added to water and heated up to 90° C. with stirring. It was then cooled to 40° C. and white liquor, a color and a flavor were added, followed by cooling to 5° C. to give a syrup. This syrup, 100 ml, was taken in a container and made up to 200 ml with carbonated water. It was then pasteurized by heating at 70° C. for 20 minutes to give a ume fizz. This ume fizz had the harsh taste of alcohol masked and had a pleasing sweetness and a mellow ume liqueur flavor.

Example (IV-1-2)) Campari-Style Orange Drink

| Orange juice, 1/5 conc. | 5.00 (kg) |
|---|---|
| Citric acid (crystals)* | 0.10 |
| Sucralose | 0.0125 |
| 95% Ethanol | 5.00 |
| Color* | 0.05 |
| Flavor* | 0.40 |
| Water | Balance |
| Total | 100.00 L |

According to the above recipe, sucralose, orange juice 1/5 conc. and citric acid were added to water and dissolved with stirring. When the temperature had reached 93° C., a color, a flavor and alcohol were added and the whole was filled into a container to give a campari-style orange juice. This campari-style orange juice had a delicious sweetness, with the acid taste of alcohol masked, thus being a beverage enlivened with the spicy bitter tastes of bitter orange, spices and herbs.

Example (IV-1-3)) Carbonated Fruit/Wine Drink

| <Syrup> | |
|---|---|
| Fructose/glucose syrup | 20.00 (kg) |
| Lemon juice | 3.00 |
| White grape juice, 1/5 conc. | 1.50 |
| Lime juice, 1/5 conc. | 1.00 |
| Apple juice, 1/5 conc. | 1.50 |
| Sucralose | 0.0006 |
| Thaumatin | 0.10 |
| Citric acid (crystals) | 0.20 |
| Color (Homogen 1249)* | 0.10 |
| Flavor* | 0.80 |
| Meiken Chateau wine | 80.00 |
| Water | Balance |
| Total | 100.00 L |

According to the above recipe, sucralose, fruit juices, citric acid, fructose/glucose syrup and thaumatin were added to water and dissolved with stirring. When the temperature had reached 93° C., a color, a flavor and chateau wine were added, followed by mixing to give a syrup. A 100 ml of this syrup was taken in a container and made up to 200 ml with carbonated water to give a fruit juice-containing carbonated wine drink. Compared with the control sucralose-free carbonated drink, this fruit juice-containing carbonated wine drink had been intensified in the mellow flavor and refreshing astringency of wine.

Example (IV-1-4)) Shouchu-and-Oolong Tea

| Shouchu | 23.00 (kg) |
|---|---|
| Reducing starch syrup | 3.00 |
| (PO-20: Towa Kasei Kogyo K.K.) | |
| Oolong tea extract* | 2.50 |
| Sucralose | 0.0003 |
| Flavor* | 0.10 |
| Water | Balance |
| Total | 100.00 L |

According to the above recipe, reducing starch syrup and sucralose were dissolved in oolong tea extract, followed by addition of shochu (white liquor) and flavor. The mixture was filled into a container and retort-sterilized at 121° C. for 4 minutes to give a shochu-and-oolong tea. Compared with a sucralose-free shochu-and-oolong tea, this product had been intensified in the characteristic mellow flavor of oolong tea, with the harsh taste of alcohol masked.

Example (IV-2-1) Sugarless Coffee

| Coffee extract | 27.00 (kg) |
|---|---|
| (Colombia L = 18, Brix = 2.3°) | |
| Cow's milk | 10.00 |
| Sucralose | 0.0065 |
| Emulsifier (Homogen 1249)* | 0.10 |
| Flavor* | 0.10 |
| Water | Balance |
| Total | 100.00 L |

According to the above recipe, cow's milk was added to water and stirred at 60° C. for 30 minutes. After cooling to room temperature, sucralose and emulsifier were added and dissolved by stirring at 60° C. for 10 minutes. The solution was cooled to room temperature. Then, coffee extract was added and the mixture was adjusted to pH 6.8 with sodium hydrogen carbonate and heated to 75° C. Then, using a homogenizer, the mixture was homogenized at 150 kg/cm$^2$ and the flavor was added. The mixture was filled into a container and retort-sterilized at 121° C. for 20 minutes to give a sugarless coffee. This coffee had an enriched mellow coffee flavor with a clear sweetness cut-off.

Example (IV-2-2) Sugarless Coffee

| Coffee extract (C-100)* | 3.75 (kg) |
|---|---|
| Erythritol | 2.00 |
| Sucralose | 0.0036 |
| Flavor* | 0.10 |
| Water | Balance |
| Total | 100.00 L |

According to the above recipe, erythritol and sucralose were added to water and dissolved by stirring at 80° C. for 10 minutes. After cooling to room temperature, coffee extract was added and the mixture was heated to 70° C. Then, the flavor was added and the mixture was filled into a container. The container was retort-sterilized at 121° C. for 4 minutes to give a sugarless coffee. This sugarless coffee had a straight sweetness and an aroma characteristic of freshly milled coffee beans.

Example (IV-2-3) Sugarless Milk Tea

| Cow's milk | 7.00 (kg) |
|---|---|
| Whole milk powder | 0.25 |
| Sucralose | 0.0063 |
| Black tea extract* | 35.00 |
| (3 parts of leaf tea extracted with 100 parts of water) | |
| Emulsifier (Homogen 870)* | 0.05 |
| Flavor* | 0.10 |
| Water | Balance |
| Total | 100.00 L |

According to the above recipe, cow's milk and whole milk powder were added to water and the mixture was stirred at 60° C. for 30 minutes and, then, cooled to room temperature. Separately, sucralose and emulsifier were added to water and dissolved by stirring at 80° C. for 10 minutes. The mixture was then cooled to room temperature. After the two solutions were combined, black tea extract was added and the mixture was adjusted to pH 6.7 with sodium hydrogen carbonate and heated to 75° C. Then, using a homogenizer, the mixture was homogenized at 150 kg/cm$^2$ and the flavor was added. The mixture was filled into a container and retort-sterilized at 121° C. for 20 minutes to give a sugarless milk tea. The resulting sugarless milk tea was a mild milk tea outstanding in black tea leaf flavor and milk flavor.

Example (IV-2-4) Sugarless Lemon Tea

| Black tea extract* | 6.00 (kg) |
|---|---|
| Maltose syrup powder | 3.00 |
| (Amalty MR, Towa Kasei Kogyo K.K.) | |
| Sucralose | 0.005 |
| Clear lemon juice | 0.50 |

-continued

| | |
|---|---|
| L-ascorbic acid | 0.02 |
| Flavor* | 0.10 |
| Water | Balance |
| Total | 100.00 L |

According to the above recipe, all the ingredients but the flavor were added to water and dissolved by heating with constant stirring. When the temperature had reached 93° C., the flavor was added and the mixture was filled into a retort pouch and sterilized at 121° C. for 20 minutes to give a sugarless lemon tea. This sugarless lemon tea had a potentiated floral tea flavor in good harmony with the regaling flavor of lemon.

Example (IV-2-5) Oolong Tea

| | |
|---|---|
| Oolong tea extract* | 3.00 (kg) |
| Sodium L-ascorbate acid | 0.01 |
| Sucralose | 0.0003 |
| Flavor* | 0.20 |
| Water | Balance |
| Total | 100.00 L |

According to the above recipe, all ingredients were added to water, stirred to mix, filled into a container and retort-sterilized at 121° C. for 4 minutes to give an oolong tea. Compared with a sucralose-free control tea, the above oolong tea had an improved balance between leaf flavor and airy bitterness.

Example (IV-2-6) Low-Sugar Shiruko

| | |
|---|---|
| Namaan | 10.00 (kg) |
| (Hashimoto Shokuryo Kogyo K.K.) | |
| Sugar alcohol | 6.50 |
| (Towa Kasei Kogyo K.K., PO-20) | |
| Sucralose | 0.04 |
| Common salt | 0.10 |
| Emulsifier (Homogen 1158)* | 0.60 |
| Emulsifier (Homogen 870)* | 0.05 |
| Flavor* | 0.10 |
| Water | Balance |
| Total | 100.00 L |

According to the above recipe, all ingredients other than raw bean jam and flavor were added to water and stirred at 80° C. for 10 minutes. The mixture was then mechanically homogenized at 150 kg/cm² and the raw bean jam and flavor were added. The whole was filled into a vessel and retort-sterilized at 125° C. for 30 minutes to give a low-sugar shiruko (sweetened bean soup). This low-sugar shiruko represented a superb blend of the characteristic flavor of strained bean jam with a bodied sweetness.

Example (IV-2-7) Sugarless Vitamin Drink

| | |
|---|---|
| <Syrup> | |
| Sucralose | 0.039 (kg) |
| Citric acid (crystals) | 0.20 |

-continued

| | |
|---|---|
| <Syrup> | |
| L-ascorbic acid | 0.30 |
| Vitamin mixture (V Mix 24920)* | 0.06 |
| Flavor* | 0.10 |
| Water | Balance |
| Total | 50.00 L |

According to the above recipe, all ingredients but flavor were added to water and dissolved by heating with constant stirring. When the temperature had reached 93° C., the flavor was added, followed by cooling to room temperature to give a syrup. A 50 ml portion of this syrup was poured into a container and made up to 120 ml with carbonated water to give a sugarless vitamin-containing drink. This sugarless vitamin-containing drink was a nourishing drink having a pleasing sweetness, with the repulsive odor of vitamins masked.

Example (IV-2-8) Mint-Flavored Sparkling Water

| | |
|---|---|
| <Syrup> | |
| Sucralose | 0.0003 (kg) |
| Sugar | 0.60 |
| Citric acid (crystals) | 0.01 |
| Common salt | 0.012 |
| Calcium lactate | 0.008 |
| Potassium chloride | 0.005 |
| Peppermint extract* | 0.03 |
| Peppermint flavor* | 0.20 |
| Water | Balance |
| Total | 100.00 L |

According to the above recipe, all ingredients but peppermint extract and peppermint flavor were added to water and dissolved by heating with stirring. When the temperature had reached 93° C., peppermint extract and peppermint flavor were added, followed by cooling to room temperature to give a syrup. A 150 ml portion of this syrup was poured into a container and made up to 200 ml with carbonated water to give a mint-flavored sparkling water. Compared with the sucralose-free control, this mint-flavored sparkling water represented an improved balance between the refreshing flavor of mint and the sparkling impact of carbonated water.

Example (IV-2-9) Orange-Flavored Carbonated Drink (Juice-Free)

| | |
|---|---|
| <Syrup> | |
| Sucralose | 0.0085 (kg) |
| Xylitol | 5.00 |
| DL-malic acid | 0.07 |
| Citric acid (crystals) | 0.03 |
| Color* | 0.05 |
| Flavor* | 0.10 |
| Water | Balance |
| Total | 45.00 L |

According to the above recipe, all ingredients but flavor were added to water and dissolved by heating with stirring.

When the temperature had reached 93° C., the flavor was added, followed by cooling to room temperature to prepare a syrup. A 90 ml portion of this syrup was filled into a container and made up to 200 ml with carbonated water to give a carbonated juice-free orange drink. This carbonated drink was good-tasting with an intensified toothsome sweetness and a fresh orange-juice note.

Example (IV-2-10) Sugarless Cola Drink

| <Syrup> | |
| --- | --- |
| Sucralose | 0.02 (kg) |
| Citric acid (crystals) | 0.07 |
| Phosphoric acid | 0.05 |
| Caramel color* | 0.20 |
| Flavor (cola flavor)* | 0.10 |
| Caffeine | 0.10 |
| Water | Balance |
| Total | 40.00 L |

According to the above recipe, all ingredients but flavor were added to water and dissolved by heating with stirring. When the temperature had reached 93° C., the flavor was added, followed by cooling to room temperature to prepare a syrup. A 80 ml portion of this syrup was filled into a container and made up to 200 ml with carbonated water to give a sugarless cola drink. This sugarless cola drink had a sweetness with a sharp cut-off and an adequate body, being a cola drink representing a fortification of the refreshing impact inherent in cola beverages.

Example (IV-2-11) Carbonated Apple Juice

| <Syrup> | |
| --- | --- |
| Sucralose | 0.0006 (kg) |
| Fructose/glucose syrup | 5.00 |
| Apple juice, 1/5 conc. | 11.00 |
| Citric acid (crystals) | 0.10 |
| Flavor* | 0.05 |
| Flavor* | 0.10 |
| Water | Balance |
| Total | 65.00 L |

According to the above recipe, all ingredients but flavor were added to water and dissolved by heating with stirring. When the temperature had reached 93° C., the flavor was added, followed by cooling to room temperature to prepare a syrup. A 130 ml portion of this syrup was filled into a container, made up to 200 ml with carbonated water, and pasteurized at 70° C. for 20 minutes to give a carbonated apple drink. Compared with the sucralose-free control, this carbonated drink was a carbonated apple drink with an intensified fresh apple-juice note as well as an exquisite sweetness.

Example (IV-2-12) Carbonated Grape Juice

| <Syrup> | |
| --- | --- |
| Sucralose | 0.014 (kg) |
| Clear grape juice, 1/5 conc. | 4.40 |
| Citric acid (crystals) | 0.25 |
| Color* | 0.05 |
| Flavor* | 0.20 |
| Water | Balance |
| Total | 45.00 L |

According to the above recipe, sucralose, clear grape juice 1/5 conc., and citric acid were added to water and dissolved by heating with stirring. When the temperature had reached 93° C., the color and flavor were added, followed by cooling to room temperature to prepare a syrup. A 90 ml portion of this syrup was filled into a container, made up to 200 ml with carbonated water, and pasteurized by heating at 70° C. for 20 minutes to give a grape juice-containing carbonated drink. This drink was a grape juice-containing drink with the refreshing grape-juice note intensified as well as savory sweetness.

Example (IV-2-13) Apple Juice Drink

| | |
| --- | --- |
| Apple juice, 1/5 conc. | 22.00 (kg) |
| Sucralose | 0.0006 |
| Flavor | 0.05 |
| Water | Balance |
| Total | 100.00 kg |

According to the above recipe, all ingredients were mixed and dissolved. Then, the solution was hot-packed at 93° C. to give an apple juice. Compared with the sucralose-free control, this apple juice was a 100% fruit juice drink having a fresh fruit-juice note despite its being a reconstituted juice.

Example (IV-2-14) Orange Juice Drink

| | |
| --- | --- |
| Sucralose | 0.008 |
| Concentrated Valencia orange juice (Brix = 55°, product of Ehime JA) | 4.40 |
| Citric acid (crystals) | 0.16 |
| Vitamin C* | 0.03 |
| Native gellan gum* | 0.025 |
| Pectin* | 0.0025 |
| Orange flavor* | 0.25 |
| Water | Balance |
| Total | 100.00 |

According to the above recipe, native gellan gum and pectin were added to water in the first place and the mixture was agitated at 80° C. for 10 minutes. Then, the remaining ingredients other than flavor were added and the whole was heated to 93° C. with stirring. Then, the orange flavor was added and the mixture was stirred to homogeneity and filled into a container to give an orange juice-containing drink. The Valencia orange juice conc. (Brix 55°) was treated with hesperinase beforehand to remove hesperidin.

Example (IV-2-15) Low-Calorie Fruit Drink

| | |
| --- | --- |
| Mixed citrus juice, 1/5 conc. (product of Ehime JA) | 4.40 (kg) |

| | |
|---|---|
| -continued | |
| Citric acid (crystals)* | 0.18 |
| L-ascorbic acid | 0.03 |
| Sucralose | 0.009 |
| Gellan gum | 0.024 |
| Flavor* | 0.10 |
| Water | Balance |
| Total | 100.00 L |

According to the above recipe, gellan gum was added to water and dissolved by heating at 80° C. with stirring for 10 minutes. Then, the remaining ingredients other than flavor were added and the whole mixture was heated to 93° C. Then, the flavor was added and the whole was filled into a container to give a fruit juice-containing low-calorie drink. This drink was an orange-flavored fruit juice-containing drink with a fortified fruit-juice note as well as savory sweetness.

Example (IV-2-16) Sugarless Near-Water

| | |
|---|---|
| Sucralose | 0.008 (kg) |
| Polydextrose | 2.20 |
| (Lites, Culter Food Science, Ltd.) | |
| Clear grapefruit juice, 1/5 conc. | 0.44 |
| Citric acid (crystals)* | 0.053 |
| Trisodium citrate | 0.015 |
| L-ascorbic acid | 0.03 |
| Calcium lactate | 0.06 |
| Potassium chloride | 0.01 |
| Dibenzoylthiamine HCl | 0.0002 |
| Pyridoxin HCl | 0.00015 |
| Nicotinamide | 0.0015 |
| Flavor* | 0.10 |
| Water | Balance |
| Total | 100.00 L |

According to the above recipe, all ingredients other than flavor were added to water and dissolved by heating with stirring. After the temperature had reached 93° C., the flavor was added and the whole was filled into a container to give a sugarless near-water. This sugarless near-water was a fresh grapefruit-flavored near-water having a sweetness with a clear cut-off.

Example (IV-2-17) Whey Mineral-Containing Sport Drink

| | |
|---|---|
| Whey minerals | 1.00 |
| Vitamin mixture | 0.25 |
| Citric acid | 0.125 |
| Sodium L-ascorbate | 0.05 |
| Clear lemon juice | 0.50 |
| Sucralose | 0.02 |
| Water | Balance |
| Total | 100.00 |

According to the above recipe, all ingredients were blended and heated up to 93° C. Then, 0.15 part of a flavor was added and the whole was filled into a bottle to give a sport drink. This sport drink was a mineral-enriched drink with a good taste having a body.

Example (IV-2-18) Powdered Green Tea-Milk Drink

| | |
|---|---|
| Cow's milk | 10.00 (kg) |
| Skim milk powder | 3.50 |
| Sugar | 7.00 |
| Sucralose | 0.0006 |
| Powdered green tea (K.K. Itouen:RS-20) | 0.50 |
| Emulsifier (Homogen CC-3)* | 0.70 |
| Color* | 0.03 |
| Flavor* | 0.20 |
| Water | Balance |
| Total | 100.00 L |

According to the above recipe, the emulsifier was added to water and the mixture was stirred at 80° C. for 10 minutes. Separately, skim milk powder was added to water and dissolved by heating to 70° C. under agitation. The solution was then cooled to room temperature to give an 8% aqueous solution. The above two solutions were combined and cow's milk, sugar, sucralose, and powdered green tea were added. The mixture was adjusted to pH 6.8 with sodium hydrogen carbonate, heated to 70° C., and homogenized with a homogenizer at 150 kg/cm². Then, the color and flavor were added and the whole was filled into a container. The filled container was retort-sterilized at 121° C. for 20 minutes to give a powdered green tea-milk drink. Compared with the sucralose-free control, this milk drink was a powdered green tea-containing beverage with a good balance between powdered green tea flavor and milk flavor.

Example (IV-2-19) Fruit-Flavored Milk

A fruit-flavored milk was prepared by adding 0.5 part of a preparation composed of 100 parts of soybean polysaccharide (SM700)* and 2 parts of sucralose. The resulting fruit-flavored milk had a rounded sweetness with a body and gave no sediment.

Example (IV-2-20) Sugarless Drink Yogurt

| | |
|---|---|
| Fermented milk (SNF 20%)* | 40.00 (kg) |
| Sucralose | 0.013 |
| Pectin | 0.20 |
| Water-soluble soybean polysaccharide (SSHC)* | 0.20 |
| Flavor* | 0.20 |
| Water | Balance |
| Total | 100.00 L |

According to the above recipe, sucralose, pectin and SSHC were poured in water and, then, fermented milk was added with stirring. The flavor was then added and the whole was adjusted to pH 4.2 with 50% lactic acid and homogenized with a homogenizer at 150 kg/cm². The homogenate was filled into a container to give a sugarless drink yogurt. This was a drink yogurt with a prominent yogurt fermentation flavor and a body.

Example (IV-2-21) Low-Calorie Pasteurized Lactic Acid

| | |
|---|---|
| Sucralose | 0.012 (kg) |
| Water-soluble soybean polysaccharide (SSHC)* | 0.40 |
| Fermented milk (SNF 20%) | 15.00 |
| Flavor* | 0.10 |
| Water | Balance |
| Total | 100.00 L |

According to the above recipe, sucralose and SSHC were added to water and dissolved by heating at 80° C. for 10 minutes. After cooling to room temperature, fermented milk was added and the mixture was adjusted to pH 3.8 with 50% lactic acid and heated up to 75° C. The mixture was then homogenized by means of a homogenizer at 150 kg/cm$^2$ and further heated to 93° C. Then, the flavor was added and the mixture was filled into a container to provide a low-calorie pasteurized lactic acid bacteria drink. This drink was a pasteurized lactic acid bacteria drink with a good balance between fermentation flavor and sumptuous milky sweetness.

Example (IV-2-22) Pasteurized Lactic Acid Bacteria Drink

A commercial concentrated lactic acid bacteria drink was diluted 4-fold with water, followed by addition of 0.02% of sucralose and 0.15% of soybean polysaccharide. The mixture was heated to 93° C. and filled into a bottle. A drink (control) prepared by adding 10% of sugar as the sweetness equivalent of the above sucralose had a heavy mouth-feel with an unpleasant sensation on swallowing but the drink of the invention was a savory drink giving a delightful sensation on swallowing without the sedimentation drawback.

Example (IV-2-23) Low Calorie Sour Milk Drink

| Sucralose | 0.0006 (kg) |
| --- | --- |
| Sugar | 5.00 |
| Fructose/glucose syrup (75%) | 5.00 |
| Water-soluble soybean polysaccharide (SSHC)* | 0.40 |
| Skim milk powder | 3.50 |
| Citric acid (crystals) | 0.45 |
| Flavor* | 0.10 |
| Water | Balance |
| Total | 100.00 L |

According to the above recipe, sucralose and all other ingredients but skim milk powder and flavor were added to water and dissolved by heating at 80° C. with stirring for 10 minutes. The solution was cooled to room temperature. Then, skim milk powder dissolved in water with stirring in advance was added and the mixture was stirred and adjusted to pH 3.9 with 50% lactic acid. The mixture was heated to 75° C., homogenized with a homogenizer at 150 kg/cm$^2$, and further heated up to 93° C. Then, the flavor was added and the whole was filled into a container to give a low-calorie sour milk drink. Compared with the sucralose-free control, the low-calorie sour milk drink thus obtained was a sour milk drink with an enhanced milky flavor.

Example (IV-2-24) Strawberry Milk Drink

| Skim milk powder | 2.80 (kg) |
| --- | --- |
| Whole milk powder | 3.00 |
| Sucralose | 0.02 |
| Emulsifier (Homogen 870)* | 0.06 |
| Color* | 0.05 |
| Flavor* | 0.10 |
| Water | Balance |
| Total | 100.00 L |

According to the above recipe, sucralose, skim milk powder, whole milk powder and emulsifier were added to water and dissolved by heating at 80° C. with stirring for 10 minutes. The solution was homogenized with a homogenizer at 150 kg/cm$^2$ supplemented with the color and flavor, filled into a container. This was pasteurized by heating at 85° C. for 30 minutes to give a strawberry milk drink. This milk drink was a fruity strawberry milk drink with a superb blend of strawberry flavor and milk flavor.

Example (IV-2-25) Calcium-Enriched Nonfat Milk

| <Formula> | |
| --- | --- |
| Skim milk powder | 12.00 (kg) |
| Egg calcium | 1.00 |
| Sucralose | 0.00035 |
| Emulsifier (Homogen 1319)* | 0.40 |
| Flavor* | 0.10 |
| Water | Balance |
| Total | 100.00 L |

Example (IV-2-26) Cream Soda

| <Syrup> | |
| --- | --- |
| Sweetened nonfat condensed milk | 3.00 (kg) |
| Citric acid (crystals)* | 0.04 |
| Sucralose | 0.025 |
| Color* | 0.60 |
| Flavor* | 0.10 |
| Water | Balance |
| Total | 40.00 L |

A syrup prepared according to the above recipe in the routine manner was taken in containers, 80 ml per container, made up to 200 ml/container with carbonated water and pasteurized at 70° C. for 20 minutes to give a cream soda. The cream soda thus obtained was a cream soda (milk-containing carbonated drink) intensified in the sparkling impact of carbonated water and the flavor of milk in good balance.

Example (IV-3-1) Powdered Green Tea-Milk Drink

| Cow's milk | 10.00 |
| --- | --- |
| Skim milk powder | 3.50 |
| Emulsifier preparation | 0.70 |
| (microcrystalline cellulose, sucrose fatty acid ester) | |
| Sucralose | 0.01 |
| Water | 85.00 |

A mixture of the above ingredients was heated at 80° C. for 10 minutes. Then, 0.05 part of sodium hydrogen carbonate, 0.5 part of powdered green tea, 0.03 part of a color preparation (safflower color, *gardenia* color), and 0.2 part of a flavor were added and the whole was made up to 100 parts with water. This dilution was homogenized with a homogenizer (150 kg/cm$^2$), filled into cans, and retort-sterilized at 121° C. for 20 minutes to give a drink having a sumptuous flavor of powdered green tea.

Example (IV-3-2) Sugarless Straight Tea

| Black tea extract | 20.00 |
| --- | --- |
| (Darjeeling tea, 40-fold extract) | |

-continued

|   |   |
|---|---|
| Erythritol | 3.00 |
| Sucralose | 0.003 |
| Flavor | 0.05 |
| Water | Balance |
| Total | 100.00 |

According to the above recipe, all ingredients were evenly admixed and the mixture was filled into cans and retort-sterilized at 121° C. for 20 minutes to give a drink with a sumptuous flavor of black tea.

Example (IV-4-1) Apple Juice-Containing Drink

|   |   |
|---|---|
| Clear apple juice, 1/5 conc. | 2.20 |
| Citric acid | 0.10 |
| Vitamin C | 0.05 |
| Sucralose | 0.014 |
| Oligosaccharide | 1.00 |
| Water-soluble diet fiber | 8.00 |
| Reducing maltose syrup | 1.50 |
| Water | Balance |
| Total | 100.00 |

According to the above recipe, all ingredients were blended and heated to 93° C., at which temperature 0.1 part of an emulsified color and 0.12 part of a flavor were added. The mixture was filled into a bottle to give a drink having a fresh flavor of apple juice.

Example (IV-5-1) Hard Yogurt

| | | |
|---|---|---|
| A: | Skim milk powder | 9.00 |
| | Unsalted butter | 5.00 |
| | Water | 34.00 |
| B: | Sugar | 6.50 |
| | Sucralose | 0.016 |
| | Gelatinizer preparation (gelatin, agar) | 0.60 |
| | Water | 45.00 |

Ingredients A were admixed and dissolved by heating at 50° C. On the other hand, ingredients B were admixed and heated at 90° C. for 10 minutes. The two solutions were combined and made up to 97 parts with water. Then, at 70° C., the dilution was homogenized at 150 kg/cm² and 0.15 part of a flavor was added. After cooling to 40° C., 3 parts of starter yogurt was added and the fermentation was carried out to pH 4.6 at 40° C. to give a hard yogurt. This hard yogurt had an improved taste with a marked enhancement in milk flavor.

Example (IV-5-2) Whipped Cream

|   |   |
|---|---|
| 1. Coconut oil (mp 35° C.) | 27.00 |
| 2. Glycerin fatty acid ester | 0.10 |
| 3. Lecithin | 0.15 |
| 4. Skim milk powder | 3.30 |
| 5. Sucralose | 0.012 |
| 6. Reducing starch sugar | 25.00 |
| 7. Emulsifier (Homogen 1009)* | 0.70 |
| 8. Sodium metaphosphate, 10% sol. | 1.00 |
| 9. Water | Balance |
| Total | 100.00 |

Of the above recipe, ingredients 1~3 were melted together at about 70° C. in advance and ingredients 4 and 5 were mixed into the melt. Then, a solution of ingredient 6 in hot water at 75° C. was added under gentle stirring. When the temperature had reached 75° C., ingredient 7 was added and dissolved by heating at 75° C. with stirring for 10 minutes. Thereafter, ingredient 8 was added and the whole was made up to 100 parts with water. The resulting mixture was homogenized with a homogenizer (pressure: 1st stage 40 kg/cm², 2nd stage 0 kg/cm²) and the homogenate was fed at that pressure to a sterilizer, where it was sterilized at 120° C. for about 3 seconds. After cooling to 7° C., the mixture was incubated for aging (ripening) at 5° C. for 12 hours. The mixture was whipped to 120% overrun to give a whipped cream.

Example (IV-5-3) Coffee Whitener

|   |   |
|---|---|
| 1. Purified coconut oil | 36.00 |
| 2. Casein sodium | 4.50 |
| 3. Skim milk powder | 5.00 |
| 4. Sucralose | 0.001 |
| 5. Trisodium citrate | 0.20 |
| 6. Sucrose fatty acid ester | 0.40 |
| 7. Lecithin | 0.05 |
| 8. Milk flavor | 0.10 |
| 9. Water | Balance |
| Total | 100.00 |

Ingredients 2~6 were added to water and dissolved by heating at 75° C. with stirring for 10 minutes. Then, a solution of ingredient 7 in ingredient 1 was added in small portions and a preliminary mixing was performed for 10 minutes. Ingredient 8 was then added and the whole was made up to 100 parts with water. The mixture was homogenized at a homogenizer pressure of 100 kg/cm², then quenched to 10° C. or below, and filled into a container to give a coffee whitener.

Example (IV-6-1) Hard Candy

|   |   |
|---|---|
| Lactitol | 70.00 (g) |
| Starch syrup (water content 25%) | 40.00 |
| Water | 20.00 |
| Sucralose (20% aq. sol.) | 0.42 |

According to the above recipe, all ingredients were mixed together and concentrated mildly to 150° C. (total weight 100 g). Then, the mixture was cooled to 130° C., and after addition of a color and a flavor where necessary, it was poured into molds and solidified to give candies according to the invention. As control, using 70 g of granulated sugar in lieu of said lactitol and sucralose, hard candies were prepared in otherwise the same manner. Comparison of the hard candies of the invention with the control hard candies showed that whereas the former were hard candies having a rich texture with a note of transparency and a clear-cut sweetness, the latter control candies were hard candies which were somewhat brown in color and had a heavy sweetness with a hint of bitterness.

Example (IV-6-2) Ginger Candy

| A: | Reducing lactose | 60.00 |
| --- | --- | --- |
|  | Reducing maltose syrup | 56.00 |
|  | Water | 30.00 |
| B: | Ginger paste | 1.50 |
|  | Sucralose | 0.03 |
|  | Flavor | 0.075 |

The above ingredients A were admixed and concentrated to 155° C. After cooling to 110° C., ingredients B were added and the whole was molded to give ginger candies with a stimulating ginger flavor.

Example (IV-6-3) Throat Soothing Herb Candy

| A: | Lactitol (monohydrate) | 60.00 |
| --- | --- | --- |
|  | Reducing maltose syrup (75% solids) | 56.00 |
|  | Water | 20.00 |
| B | Sucralose | 0.045 |
|  | Herb extract mixture | 0.60 |
|  | Peppermint flavor | 0.20 |
|  | Caramel color (liquid) | 0.20 |

The above ingredients A were admixed and concentrated to 190° C. After cooling to 140° C., ingredients B were added and the whole was molded and cooled to give throat-soothing herb candies. The throat-soothing herb candies thus obtained had a delicious sweetness and a superb blend of herb and mint flavors.

Example (IV-6-4) Lemon Gummy Candy

| Acid gelatin (250 Bloom) | 7.00 |
| --- | --- |
| Water | 12.00 |
| Reducing starch syrup | 80.00 |
| (Towa Kasei Kogyo K.K., PO-60) |  |
| Reducing starch syrup | 20.00 |
| (Towa Kasei Kogyo K.K., Amameal) |  |
| Lemon juice, 1/4 conc. | 1.25 |
| Citric acid (crystals) | 1.00 |
| Sucralose | 0.02 |
| Color | 0.02 |
| Flavor | 0.02 |

According to the above recipe, gelatin was added to 11 parts of water and dissolved by heating at 80° C. to prepare an aqueous gelatin solution. To this solution was added 78 weight parts of a boiled concentrate of reducing starch syrup (PO-60) and reducing starch syrup (Amameal). Further, a mixed solution prepared by dissolving lemon juice 1/4 conc., citric acid and sucralose in 1 part of water at 80° C. was added and the color and flavor were further added. The whole was poured into starch molds and dried to a moisture content of 16% to give lemon gummy candies. Though sugarless, the resulting lemon gummy candies had a toothsome sweetness and a potentiated fresh lemon flavor with a satisfactory flavor release profile.

Example (IV-6-5) Caramel

| Sugar | 18.00 |
| --- | --- |
| Starch syrup | 45.00 |
| Sweetened condensed milk | 45.00 |
| Vegetable fat/oil | 3.50 |
| Lecithin | 0.20 |
| Sucralose | 0.0006 |
| Flavor (caramel flavor) | 0.10 |
| Fondant | 5.00 |
| Water | 5.00 |

According to the above recipe, all ingredients but fondant and flavor were admixed, dissolved at 60° C., and concentrated to 125° C. After cooling to 70° C., fondant and flavor were added and the mixture was aged at 50° C. for 5 hours and then molded to give caramels. Compared with the sucralose-free control, the above caramels had an improved mellow caramel flavor.

Example (IV-6-6) Pretzel

| <Dough> | |
| --- | --- |
| Hard flour | 100.00 |
| Unsalted butter | 25.00 |
| Sugar | 7.50 |
| Common salt | 2.00 |
| Baking powder | 1.35 |
| Soybean diet fiber | 0.80 |
| Sucrose fatty acid ester | 0.30 |
| Sucralose | 0.018 |
| Flavor | 0.20 |

Using a universal stirring mixer, all the above ingredients were admixed at 105 rpm for 3 minutes. To the mixture was added 40 parts of water and the whole was kneaded at 105 rpm for 6 minutes to prepare a batter. The batter was wrapped in wrapping film and allowed to sit at room temperature for 30 minutes. The batter was spread to a thickness of 3 mm and cut to 5 mm W×12 cm. The cuttings were baked in an oven at 180° C. for 25 minutes and sprinkled with 3 parts of salad oil, 0.2 part of butter flavor, and 0.45 part of common salt, all based on 100 parts of the batter. As a result, pretzels having an improved taste full of flavor and butter-like mouth-feel could be obtained.

Example (IV-6-7) Mint Tablet (Tablet Confectionery)

| Sorbitol | 94.00 |
| --- | --- |
| Peppermint flavor | 5.00 |
| Sucralose | 0.15 |
| Sucrose fatty acid ester | 1.00 |

According to the above recipe, mint tablets were prepared in the routine manner. The resulting mint tablets had a savory sweetness with an enhanced pleasing spicy flavor of mint.

Example (IV-6-8) Yogurt Tablet (Tablet Confectionery)

| Trehalose (granulated) | 92.60 |
| --- | --- |
| Fermented milk powder | 5.00 |
| Sucralose | 0.08 |
| Citric acid (anhydrous) | 1.00 |
| Yogurt flavor | 0.20 |
| Sucrose fatty acid ester | 1.50 |

According to the above recipe, yogurt tablets were prepared in the routine manner. The trehalose was used as granulated with guar gum beforehand in the conventional manner. The yogurt tablets thus obtained had a savorous sweetness and an enhanced fresh yogurt flavor.

Example (IV-6-9) Lemon Tablet (Tablet Confectionery)

| | |
|---|---|
| Sugar (granulated) | 93.50 |
| Powdered lemon juice | 2.00 |
| Sucrose fatty acid ester | 1.00 |
| Citric acid (anhydrous) | 0.50 |
| L-ascorbic acid | 3.00 |
| Sucralose | 0.001 |

According to the above recipe, lemon tablets were prepared in the routine manner. The sugar was used as granulated with guar gum beforehand in the conventional manner. Compared with a sucralose-free control, the lemon tablets obtained above had a good taste with an improved balance between sweetness and sourness with the unsavory taste of vitamin C have been masked.

Example (IV-6-10) Mint Gum

| | |
|---|---|
| Sucralose | 0.13 (kg) |
| Gum base | 25.00 |
| Lactitol (Nikken Chemicals) | 67.20 |
| Sugar alcohol | 5.00 |
| (PO-20: Towa Kasei Kogyo K.K.) | |
| Glycerin | 0.50 |
| Peppermint oil* | 1.50 |
| Mint flavor* | 0.50 |
| Color* | 0.20 |

According to the above recipe, ingredients were kneaded into the gum base and molded to give a mint gum. This mint gum was a chewing gum having a savory sweetness and an adequate intensity of refreshing mint sensation.

Example (IV-6-11) Apple Bubble Gum

| | |
|---|---|
| Sucralose | 0.084 (kg) |
| Gum base | 30.00 |
| Palatinit (Mitsui Sugar) | 70.00 |
| Glycerin | 0.50 |
| Citric acid (crystals)* | 1.00 |
| Flavor (apple flavor)* | 0.80 |

According to the above recipe, ingredients were kneaded into the gum base and molded in the routine manner to give a bubble gum. This bubble gum was an apple-flavored chewing gum having a savorous sweetness and giving a fruity fresh sensation.

Example (IV-6-12) Strawberry Gum

| | |
|---|---|
| Sucralose | 0.001 (kg) |
| Gum base | 23.00 |
| Sugar | 62.00 |
| Starch syrup | 5.00 |
| Citric acid (crystals)* | 1.20 |
| Strawberry flavor* | 0.20 |
| Red cabbage color* | 0.20 |

According to the above recipe, ingredients were kneaded into the gum base and molded in the routine manner to give a strawberry gum. This gum was a chewing gum having a savorous sweetness and a rich nectarous strawberry flavor.

Example (IV-6-13) Chocolate

| | |
|---|---|
| Cacao mass | 40.00 |
| Cacao butter | 10.00 |
| Reducing lactose | 50.00 |
| Lecithin | 0.40 |
| Vanillin | 0.05 |
| Sucralose | 0.03 |

According to the above recipe, a chocolate was prepared in the routine manner. The resulting chocolate was a very toothsome chocolate having a savorous sweetness and an enhanced chocolate flavor (cacao flavor).

Example (IV-6-14) Strawberry-Flavored Chocolate

| | |
|---|---|
| Cacao butter | 25.00 |
| Hard butter | 7.00 |
| Whole milk powder | 27.00 |
| Sugar | 41.00 |
| Lecithin | 0.30 |
| Strawberry flavor | 0.20 |
| Vanillin | 0.02 |
| Beet red preparation | 0.50 |
| Sucralose | 0.001 |

According to the above recipe, a strawberry-flavored chocolate was prepared in the routine manner. This chocolate was a toothsome strawberry-flavored chocolate with the milk and strawberry flavors intensified in good balance as compared with the sucralose-free control.

Example (IV-7-1) Tare (Sauce) for Yakiniku

| | |
|---|---|
| Sucralose | 0.008 (kg) |
| Reducing starch syrup | 20.00 |
| (Amameal: Towa Kasei Kogyo K.K.) | |
| Trehalose | 0.50 |
| (Trehaose: Hayashibara K.K.) | |
| Koikuchi soy sauce | 24.00 |
| Mirin | 4.00 |
| Apple puree | 19.00 |
| Garlic paste | 4.50 |
| Ginger paste | 4.50 |
| Sesame oil | 0.10 |
| Xanthan gum* | 0.50 |
| Red pepper powder | 0.10 |
| Black pepper powder | 0.05 |
| Condiment (Sanlike Aji Extract)* | 3.00 |
| Condiment (Sanlike Beef Extract)* | 1.00 |
| Condiment (Sanlike Amino Base Super N)* | 0.20 |
| Citric acid (crystals) | 0.20 |
| Parched sesame | 0.40 |
| Water | Balance |
| Total | 100.00 kg |

According to the above recipe, a tare for yakiniku was prepared by the established procedure. The resulting tare had an increased impact of sweetness and saltiness with a prominent soy flavor.

Example (IV-7-2) Tomato Ketchup

| | |
|---|---|
| Sucralose | 0.019 (kg) |
| Tomato paste | 40.00 |
| Wine vinegar | 18.00 |
| Fructose/glucose syrup | 5.00 |
| Common salt | 2.50 |
| Onion powder | 0.10 |
| Garlic powder | 0.07 |
| Cinnamon powder | 0.02 |
| Clove powder | 0.01 |
| Water | Balance |
| Total | 100.00 kg |

According to the above recipe, a tomato ketchup was prepared by the established procedure. This product was a ketchup having an intensified tomato flavor with the acrid sourness of wine vinegar masked. When this product was poured on a hamburger steak, the savoriness of meat was enhanced to make the steak more appetizing.

Example (IV-7-3) Tsuyu (Soup)

| | |
|---|---|
| Sucralose | 0.011 (kg) |
| Koikuchi soy | 26.00 |
| Usukuchi soy | 10.00 |
| Fish soy (Marinaji P. MGC Marinaji) | 5.00 |
| Mirin | 10.00 |
| Sodium L-glutamate | 3.00 |
| Condiment (Yamasa IG: Yamasa Corporation) | 0.10 |
| Condiment (Sanlike) | 6.00 |
| Common salt | 0.60 |
| Water | Balance |
| Total | 100.00 kg |

According to the above recipe, a condiment soup was prepared in the routine manner. When this soup was diluted 3-fold and used as a sōmen soup, the flavors of soy and soup were emphasized so that the sōmen could be eaten with greater satisfaction. When the soup was diluted 1.5-fold and used as a tempura dip soup, the tastes of ingredients of the tempura were improved so that the tempura could be relished with greater gratification.

Example (IV-7-4) Soy Sauce

Usukuchi soy was diluted 10-fold with hot water and sucralose was added at the level of 0.0004%. Compared with sucralose-free control, the saltiness of the soy was milder and, at the same time, the characteristic savory flavor of the soy became the more prominent. When koikuchi soy was supplemented with 0.0005% sucralose and added to unseasoned grilled saury, the taste of the saury was enlivened to make it more palatable.

Example (IV-7-5) Dressing

| | |
|---|---|
| <Water phase> | |
| Sucralose | 0.009 (kg) |
| Koikuchi soy | 20.00 |
| Vinegar (acidity 10%) | 8.50 |
| Fish soy (Marinaji M-15, MGC Marinaji) | 3.00 |
| Lemon juice | 2.00 |
| Common salt | 2.00 |
| Sodium L-glutamate | 0.20 |
| Red pepper powder | 0.05 |
| Condiment (Sanlike Aji Beef)* | 0.20 |
| Condiment (Sanlike Chinese Base)* | 0.30 |
| Condiment (Sanlike Pork)* | 0.50 |
| Parched sesame | 0.30 |
| Xanthan gum* | 0.10 |
| Water | Balance |
| Total | 100.00 kg |
| <Oil phase> | |
| Sesame oil | 20.00 (kg) |
| Corn salad oil | 79.00 |
| Seasoning flavor (Chinese seasoning oil)* | 1.00 |
| Total | 100.00 kg |

According to the above recipe, a dressing was prepared in the routine manner. The ratio of the water layer to the oil layer was set to 140:60, by weight The resulting dressing had the tart edge of vinegar blunted and the flavors of sesame and soy intensified.

Example (IV-7-6) Miso

A miso containing 0.0075% of sucralose and a bonito stock (seasoning) were used to prepare a miso soup. Compared with sucralose-free control, this soup had the pungency of salt rounded off, with an enhancement in the flavors of miso and stock in good balance so that it could be relished with gusto.

Example (IV-7-7) Retort Curry

| | |
|---|---|
| Sucralose | 0.0008 (kg) |
| Onions (minced) | 7.00 |
| Unsalted butter | 4.50 |
| Garlic paste | 0.60 |
| Ginger paste | 0.50 |
| Wheat flour | 4.50 |
| Fruit chutney | 3.00 |
| Tomato paste | 0.50 |
| Curry powder | 1.80 |
| Common salt | 0.55 |
| Sodium L-glutamate | 0.48 |
| Nucleotide condiment* | 0.015 |
| Condiment (Sanlike demiglace)* | 1.00 |
| Condiment (Sanlike Pork)* | 0.50 |
| Condiment (Sanlike Bouillon)* | 1.00 |
| Potato | 7.00 |
| Carrot | 5.00 |
| Beef | 10.00 |
| Water | Balance |
| Total | 100.00 kg |

According to the above recipe, a retort curry was prepared. Thus, onions, garlic paste, and ginger paste were fried with unsalted buffer, and with wheat flour added, the mixture was further fried. Then, the remaining materials other than potato, carrot and beef were added and fried and the heating was continued with stirring until a sufficient viscosity had developed. Then, potato, carrot and beef were added and the mixture was retort-sterilized at 121° C. for 20 minutes to give a retort curry. This retort curry had a prominent spicy flavor with a body.

Example (IV-7-8) Sausage

| <Meat> | |
| --- | --- |
| Pork (hock) (minced, 5 mm) | 70 (kg) |
| Lard (minced, 5 mm) | 10 |
| Iced water | 20 |
| Total | 100 kg |
| <Auxiliary ingredients> | |
| Sucralose | 0.0017 (kg) |
| Common salt | 1.70 |
| Sodium nitrite | 0.012 |
| Polyphosphate | 0.30 |
| Sodium L-ascorbate | 0.08 |
| Casein sodium | 1.00 |
| White pepper powder | 0.10 |
| Potassium sorbate | 0.20 |
| Condiment (Sanlike Amino Base Super)* | 0.30 |
| Condiment (Sanlike Spice Mix AR-1)* | 0.50 |

According to the above recipe, a sausage was prepared in the routine manner. This sausage had a strong meat flavor with a body.

Example (IV-7-9) Ume-Zuke

Desalted umeboshi (salted and dried ume) was immersed in 2.5 times its weight of a condiment liquor of the following composition for 20 days to prepare a ume-zuke. This ume-zuke had the sourness and saltiness sufficiently mellowed and was delicious with a prominent ume flavor.

| <Condiment liquor> | |
| --- | --- |
| Sucralose | 0.005 (kg) |
| Reducing starch syrup (SE-600, Nikken Chemicals) | 9.00 |
| Erythritol (Nikken Chemicals) | 1.00 |
| Fish soy (Marinaji M-15, MGC Marinaji) | 0.50 |
| Condiment (Sanlike Umami Super N)* | 1.00 |
| Condiment (Sanlike Amino Base Super N)* | 1.00 |
| Common salt | 9.60 |
| Vinegar | 6.00 |
| Citric acid (crystals) | 2.00 |
| Salted mirin | 1.00 |
| Color | 0.30 |
| Water | Balance |
| Total | 100.00 kg |

Example (IV-7-10) Sweet-Pickled Ginger

| Common salt | 7.00 (kg) |
| --- | --- |
| Vinegar (acidity 10%) | 4.80 |
| Lactic acid (50%) | 1.00 |
| Citric acid (crystals) | 1.20 |
| D-sorbitol (70%) | 8.50 |
| Sodium L-glutamate | 1.10 |
| Condiment (Sanlike Aji Beef)* | 0.50 |
| Sucralose | 0.01 |
| Water | Balance |
| Total | 100.00 kg |

According to the above recipe, raw materials were blended, dissolved and boiled. After cooling to room temperature, the mixture was made up to 100 kg to give a pickling liquor. Separately, 80 kg of ginger root was sliced, bleached in hot water for 1 minute, and cooled in cold water. These slices were soaked in the above pickling liquor to prepare a sweetened pickle. This sweetened ginger pickle fully retained the stimulating savor of ginger and yet had the sourness rounded off to make it more palatable.

Example (IV-7-11) Fried Kamaboko

| Sucralose | 0.0036 (kg) |
| --- | --- |
| Ground fish paste | 50.00 |
| Common salt | 1.50 |
| Condiment (Sanlike Amino base Super N)* | 0.30 |
| Glycine | 0.50 |
| Sodium acetate (anhydrous) | 0.30 |
| Potato starch | 8.00 |
| Mirin | 1.00 |
| Iced water | Balance |
| Total | 100.00 kg |

According to the above recipe, a fried kamaboko was prepared in the routine manner. Thus, minced fish meat was ground and salted with common salt, and the remaining raw materials were added. The mixture was fine-milled into a paste. The paste was deaerated in a deaerating bag, set in a mold, and allowed to sit for the development of elasticity at 40° C. for 1 hour. The molded paste was fried in oil at 170° C. for 3 minutes to give a fried kamaboko. This was a delicious fried kamoboko having the savory taste characteristic of kamaboko and an appetizing fry flavor intensified and the unpleasant fishy odor masked.

Example (IV-7-12) Fried Potato Snack

The fried potato (sliced) prepared by the routine procedure was dusted with 4% of a beef consomme seasoning containing 0.01% of sucralose and ingested. Compared with sucralose-free control, the appetizing flavor of fried potato and the full-bodied flavor of beef consomme were accentuated so that the product could be relished with greater gratification.

Example (IV-7-13) Sesame Dressing for Shabushabu

| Sesame paste | 13.00 |
| --- | --- |
| Usukuchi soy | 12.00 |
| Vinegar | 11.00 |
| Garlic powder | 0.10 |
| Ginger powder | 0.10 |
| White pepper | 0.10 |
| Chicken extract | 3.00 |
| Yeast extract | 3.00 |
| Sesame oil | 1.00 |
| Fructose/glucose syrup | 8.00 |
| Mirin | 15.00 |
| White miso | 10.00 |
| Thickener preparation (xanthan gum, pectin) | 3.50 |
| Sucralose | 0.018 |
| Flavor | 0.15 |
| Water | Balance |
| Total | 100.00 |

According to the above recipe, all ingredients were blended and heated to 80° C. with stirring to give a goma-dare (sesame-containing dip soup) for shabushabu. This goma-dare had an enhanced sesame flavor and was very delicious.

Example (IV-7-14) Tare for Yakiniku (Miso Type)

| | |
|---|---|
| Koikuchi soy sauce | 25.00 |
| Miso | 14.00 |
| D-sorbitol | 12.00 |
| Common salt | 3.20 |
| Garlic powder | 3.30 |
| Garlic paste | 2.00 |
| Beef extract | 1.00 |
| Parched sesame | 0.50 |
| Sodium L-glutamate | 0.50 |
| Ginger paste | 0.40 |
| Amino acid condiment | 0.70 |
| Nucleotide condiment | 0.01 |
| Sucralose | 0.016 |
| Water | Balance |
| Total | 100.00 |

According to the above recipe, all ingredients were blended and heated to 80° C. to give a tare for yakiniku (e.g. grilled beef). This was a delicious tare with an outstanding miso flavor.

Example (IV-7-15) Miso-Dare for Gohei-Mochi

| | |
|---|---|
| White miso | 150.00 |
| Red miso | 50.00 |
| Egg yolk | 19.00 |
| Sake | 100.00 |
| Mirin | 32.00 |
| Reducing starch hydrolysate | 36.00 |
| Sucralose | 0.045 |

According to the above recipe, all ingredients were heated with stirring until the total weight had become 320 parts on evaporation of water to give a miso-dare. Separately, boiled rice kneaded and molded on a wooden grill was coated with the above miso-dare and lightly baked. As a result, a Gohei-mochi with an appetizing miso flavor was obtained.

Example (IV-7-16) Smoked Sausage

| | |
|---|---|
| Meat | |
| Minced pork (hock) | 85.00 |
| Iced water | 7.00 |
| Cow's milk | 3.00 |
| Whole egg | 4.00 |
| Condiment | |
| Common salt | 24.00 |
| Amino acid condiment | 3.20 |
| Spice | 8.65 |
| Minced onion | 16.00 |
| Potato starch | 48.00 |
| Sucralose | 0.15 |

The meat material prepared according to the above recipe and a seasoning liquor were blended in a ratio of 16:1, mixed on a mixer, and filled into sheep gut casings. The filled casings were dried at 50° C. for 30 minutes and smoked at 60° C. for 30 minutes. Then, these sausages were boiled at 78° C. for about 30 minutes until the center of the sausage had become about 70° C. As a result, a sausage with a pleasing smoke flavor could be obtained.

Example (IV-7-17) Tobacco

A commercial cigarette was unwrapped and 100 parts of the tobacco was sprayed with 5 parts of an aqueous solution composed of 0.04 part of sucralose and 99.96 parts of water. After drying at 60° C. for 50 minutes, the tobacco was wrapped again and a puff test was made to evaluate its flavor. As a result, the cigarette was found to have acquired a more mellow flavor.

Example V

Preservative and Food with Improved Quality of Taste

Example (V-1-1)

Preservative with an Improved Quality of Taste: Thick

| eggroll | |
|---|---|
| Whole egg | 70.00 |
| Starch | 2.00 |
| Stock | 2.00 |
| Sugar | 0.60 |
| Common salt | 0.40 |
| Preservative (Sodium acetate preparation) | 1.00 |
| Sucralose | 0.001 |
| Water | Balance |
| Total | 100.00 |

The above formulation was baked on a mild fire to a degree short of charring to make a thick eggroll. This eggroll had the taste of the preservative preparation masked and was delicious.

Example (V-1-2)

Preservative with an Improved Quality of Taste: Custard Cream

| | |
|---|---|
| Water | 50.00 |
| Carrageenan | 0.40 |
| Gelatin | 0.50 |
| Corn starch | 4.00 |
| Corn syrup solids | 3.00 |
| Granulated sugar | 10.00 |
| Glucose | 7.00 |
| Skim milk powder | 4.00 |
| Whole egg | 3.50 |
| Isomerized glucose syrup | 7.00 |
| Sweetened nonfat condensed milk | 3.00 |
| Unsalted butter | 6.50 |
| Preservative (glycine preparation) | 0.70 |
| Sucralose | 0.008 |

The above formulation was heated on a water bath with stirring. After cooling to 60° C., 0.1 part of a flavor and 0.02 part of carotene color were added. The resulting custard cream had the unpleasant flavor of the preservative preparation (glycine preparation) masked.

Example (V-2-1)

Caffeine Tablets with an Improved Quality of Taste

In the production of caffeine tablets containing 90 mg of caffeine per tablet by the established pharmaceutical procedure, sucralose was formulated in a proportion of 0.3% without addition of any other sweetener. As a result, tablets with the bitter taste of caffeine masked and an improved taste facilitating its ingestion could be obtained.

Example (V-2-2)

Masking of Retort Odor: Retort Chinese-Style Donburi

| Soup | |
|---|---|
| Usukuchi soy sauce | 72.00 |
| Sake | 46.00 |
| Common salt | 4.00 |
| Sodium L-glutamate | 1.30 |
| Nucleotide condiment | 0.07 |
| Chicken extract powder | 1.00 |
| Sucralose | 0.0112 |
| Water | 209.00 |
| Solid ingredients | |
| Pork | 200.00 |
| Squid | 120.00 |
| Shrimp | 80.00 |
| Lentinula edodes | 70.00 |
| Boiled bamboo shoots | 160.00 |
| Carrots | 60.00 |
| Onions | 240.00 |

Pork, squid and shrimp were fried briefly on a strong fire with 50 parts of lard in advance. Separately, 54 parts of lard was taken in a pan and *Lentinula edodes*, boiled bamboo shoots, carrots and onions were fried. Thereafter, the pork and others fried in advance were added and the soup was also added. When the mixture had begun to boil, 16 parts of potato starch dissolved in a small quantity of water was added. The food thus obtained was dispensed into aluminum pouches and retort-sterilized at 120° C. for 20 minutes. As a result, a good-tasting food with the metallic retort odor masked significantly could be obtained.

Example (V-2-3) Canned Mandarin Orange

| Syrup | |
|---|---|
| Sugar | 10.00 |
| Fructose/glycose syrup | 10.00 |
| Citric acid | 0.25 |
| Trisodium citrate | 0.10 |
| Sucralose | 0.003 |
| Water | Balance |
| Total | 100.00 |

Ingredients were blended according to the above recipe and heated at 80° C. for 10 minutes, followed by addition of 0.25 part of a flavor to give a syrup. The syrup and the mandarin orange pulp as peeled and pretreated in the routine manner were filled into cans and, after clinching, pasteurized at 85° C. for 30 minutes. The canned fruit thus obtained had been well masked of the canned food odor. Moreover, the emanation of a canned food odor remained to be well inhibited even after 1 year of storage.

Example (V-2-4) Squid Dainty

| Koikuchi soy sauce | 20.00 |
|---|---|
| Usukuchi soy sauce | 10.00 |
| Fish/shellfish-derived condiment | 5.00 |
| Mirin | 10.00 |
| Vinegar | 2.00 |
| Sugar | 28.00 |
| Common salt | 1.00 |

-continued

| Sodium L-glutamate | 2.00 |
|---|---|
| Umami extract | 1.40 |
| Disodium succinate | 0.20 |
| Garlic powder | 0.05 |
| Sucralose | 0.017 |

Ingredients were blended according to the above recipe and heated up to 85° C., at which temperature 0.01 part of a flavor was added. The mixture was made up to 100 parts with water to make a seasoning liquor for a squid dainty. Separately, squid was boiled at 80° C. for 3 minutes, stretched thin, and colored with a coloring solution composed of 0.1 part of annatto color and 99.9 parts of water to give a squid for a squid dainty. The above seasoning liquor and ingredient squid were soaked together in a ratio of 2:1 overnight and dried at 60° C. for 1.5 hours. It was further dipped in the seasoning liquor and dried at 60° C. for 15 minutes. As a result, a squid dainty with the fishy smell of squid masked and an improved flavorsome taste of squid could be obtained.

Example (V-2-5) White Bread

| Sponge | |
|---|---|
| Hard flour | 70.00 (kg) |
| Yeast food | 0.10 |
| Live yeast | 2.00 |
| Sucralose | 0.006 |
| Water | 40.00 |
| Dough | |
| Hard flour | 30.00 |
| Sugar | 3.00 |
| Common salt | 2.00 |
| Skim milk powder | 2.00 |
| Shortening | 5.00 |
| Water | 25.00 |

According to the above recipe, white bread was prepared in the routine manner (70% sponge system). Baking was carried out at 220° C. for 40 minutes. Compared with sucralose-free control, the white bread obtained was delicious with the characteristic savory flavor of bread potentiated.

Example (V-2-6) Pretzel

| Dough | |
|---|---|
| Hard flour | 100.00 |
| Unsalted butter | 25.00 |
| Sugar | 7.50 |
| Common salt | 2.00 |
| Baking powder | 1.35 |
| Soybean diet fiber | 0.80 |
| Sucrose fatty acid ester | 0.30 |
| Sucralose | 0.018 |
| Flavor | 0.20 |

Using a universal stirring mixer, the above ingredients were mixed at 105 rpm for 3 minutes. This was diluted with 40 parts of water and further mixed at 105 rpm for 6 minutes to prepare a batter. The batter was wrapped in wrapping film and allowed to sit at room temperature for 30 minutes. This batter was spread in a thickness of 3 mm and cut to 5 mm W×12 cm L. The cuttings were baked in an oven at 180° C. for 25 minutes. The baked cuttings were sprinkled with 3 parts of salad oil, 0.2 part of butter flavor and 0.45 part of common salt, all based on 100 parts of the batter. As a result, pretzels having a sumptuous butter-like flavor with an improved quality of taste could be obtained.

Example (V-2-7) Cookie

| A: | Unsalted margarine | 24.00 |
|---|---|---|
| B: | Egg yolk | 4.70 |
|  | Trehalose | 22.00 |
|  | Sucralose | 0.02 |
|  | Flavor | 0.20 |
|  | Lemon juice | 0.10 |
| C: | Soft flour | 48.50 |
|  | Common salt | 0.20 |
|  | Baking powder | 0.30 |

The above ingredient A was kneaded to a creamy consistency and ingredients B were added and mixed. Then, a mixture of ingredients C was added in 3 portions and gently mixed. The batter was aged in the refrigerator for 1 hour, punched, and baked in an oven at 160° C. for 35 minutes. Compared with sucralose-free control, the resulting cookies had a crisp texture and an improved flavor, reflecting improvements in the quality of taste.

Example (V-2-8) Cookie

| A: | Uncolored margarine | 50.00 |
|---|---|---|
|  | Flavor | 0.55 |
| B: | Reducing maltose powder | 45.00 |
| C: | Egg yolk | 10.00 |
|  | Xylose preparation (San Polymer KC-18)* | 0.80 |
| D: | Soft flour | 100.00 |
|  | Swelling agent (San Over O-62)* | 0.60 |
|  | Soybean polysaccharide (SM-700)* | 0.50 |
|  | Sucralose | 0.02 |
|  | Stevia extract | 0.075 |

Ingredients A were respectively weighed into the bowl of a universal stirring mixer and using a beater, the contents were kneaded at 126 rpm for 90 minutes. Then, ingredient B was added and the whole was kneaded at 126 rpm for 3 minutes. With the beating continued, a mixture of ingredients C was added in small portions and the whole was beaten for 5 minutes. Then, components D were added and loosely mixed in and the whole was aged in the refrigerator for 30 minutes. The resulting batter was spread in a thickness of 5 mm, molded, and baked in an oven at 170° C. for both the top and bottom fires for 13~15 minutes to give cookies.

Example (V-2-9) Wrapping for Buns

| A: | Soft flour | 500.00 |
|---|---|---|
|  | Common salt | 6.00 |
|  | Baking powder | 2.50 |
|  | Xanthan gum | 1.00 |
|  | Trehalose | 60.00 |
|  | Dried yeast | 7.50 |
| B: | Lukewarm water (35–40° C.) | 200.00 |
|  | Sucralose | 0.073 |
| C: | Lard | 15.00 |

Ingredients A were blended and stirred together with all ingredients B. After soft flour had absorbed water, ingredient C was added and kneaded in, followed by 10 minutes of standing. The batter was divided into small portions and, after filling with a bean jam, allowed to ferment in a tea dryer (40° C., 50% RH) for 40~50 minutes and, then, steamed at 100° C. for 20 minutes. Compared with sucralose-free control, the wrapping thus obtained had the mealy odor masked and the bean jam bun was a delicious refreshment with an improved quality of taste.

Example (V-2-10) Flour paste

| A: | Soft flour | 3.00 |
|---|---|---|
|  | Corn starch | 3.00 |
|  | Gelling agent (Gelup FLP)* | 0.20 |
|  | Sucralose | 0.0087 |
|  | Saccharin sodium | 0.002 |
|  | Flavor | 0.50 |
|  | Aging inhibitor (San-Keeper NO. 283)* | 0.80 |
| B: | Reducing maltose syrup | 25.73 |
|  | Cow's milk | 62.54 |
|  | Margarine | 7.50 |
|  | Sugar alcohol | 10.70 |
|  | β-Carotene | 0.06 |
| C: | Flavor | 0.10 |

Ingredients 1~5, 7 and 8 were mixed in powdery state. On the other hand, ingredients 6 and 9~12 were placed in a pan and the above powdery mixture was added with stirring. Under constant stirring to avoid charring, the mixture was boiled down to 100 weight parts on a gas burner. Then, ingredient 13 was added and the whole was stirred, with the bottom of the pan kept immersed in tap water. After cooling to 50° C., the mixture was filled into a vessel to give a flour paste.

Example VI

Flavor Compositions with Improved Flavors

Example (VI-1-1) Flavor Composition

To aliquots of a 0.1% aqueous solution of spearmint oil (carvone content 60%) was added sucralose at the levels indicated in Table 18. A panel of 20 experts was asked to ingest samples and evaluate each for refreshing sensation and flavor. The results are also shown in Table 18.

TABLE 18

| Level of sucralose (%) | Panelists who answered that mint flavor was enhanced | Global evaluation | Comment |
|---|---|---|---|
| 0 | — | — | Adequate refreshing mint flavor |
| 0.0003 | 11/20 | ○ | Same enhancement of mint flavor |
| 0.0005 | 16/20 | ⊙ | Enhancement of mint flavor Good mouth-feel |
| 0.001 | 20/20 | ⊙ | Enhancement of refreshing sensation and mint flavor Bodying effect expressed |
| 0.005 | 14/20 | ○ | Mint flavor enhanced but sweetness which develops is a little annoying |

Example (VI-1-2) Flavor Composition

To a 0.005% solution of 1-menthol in water was added sucralose at the levels indicated in Table 19 and a panel of 20 experts was asked to ingest samples and evaluate each for refreshing sensation and flavor. The results are also shown in Table 19.

TABLE 19

| Level of sucralose (%) | Panelists who answered that mint flavor was enhanced | Global evaluation | Comment |
| --- | --- | --- | --- |
| 0 | — | — | Adequate refreshing sensation of menthol |
| 0.0003 | 19/20 | ⊚ | Enhancement of menthol flavor Earlier expression of flavor |
| 0.0005 | 20/20 | ⊚ | Enhancement of menthol flavor Good mouth-feel |
| 0.001 | 12/20 | ○ | Enhancement of refreshing sensation and menthol flavor Slight overall heaviness |
| 0.005 | 5/20 | Δ | Sweetness is a little annoying |

Example (VI-1-3) Dental Rinse

| | |
| --- | --- |
| Ethanol | 10.00 |
| Sorbitol | 15.00 |
| Cetylpyridinium chloride | 0.05 |
| Polyoxyethylene-hydrogenated castor oil (60 E.O) | 1.20 |
| 1-Menthol | 0.50 |
| Citric acid | 0.30 |
| Sodium citrate | 0.15 |
| Peppermint oil (1-menthol 40%) | 0.10 |
| Sucralose | 0.06 |
| Anethole | 0.02 |
| Food Blue | 0.001 |
| Purified water | Balance |
| Total | 100.00 |

INDUSTRIAL APPLICABILITY

The present invention provides novel uses for sucralose. These uses are relevant to the application of the invention not only in the field of foods but also in the pharmaceutical and cosmetic field.

In accordance with the invention, there can be provided sweeteners (sweetening compositions) having an excellent quality of sweetness. There can also be provided, in accordance with the invention, food compositions rendered easier to ingest through the masking of the unpleasing odors or tastes of various ingredients. Furthermore, in accordance with the invention, food compositions can be provided with the desired physical functions such as viscosity, gelatinization, emulsifiability, etc. expediently without affecting the taste of foods. In addition, the invention provides foods either improved or enhanced in texture, taste and flavor.

The invention claimed is:

1. A sweetener composition comprising sucralose and at least one member selected from the group consisting of potassium gluconate and sodium gluconate in an amount of 20–100 parts by weight, per part by weight of sucralose.

2. A food composition containing the composition of claim 1.

3. A method of improving the sweetness of a sucralose-containing sweetener, the method comprising adding in an amount of 20–100 parts by weight, per part by weight of sucralose, to the sweetener containing sucralose, at least one member selected from the group consisting of potassium gluconate and sodium gluconate.

* * * * *